US 6,661,947 B2
United States Patent — Shirai
Date of Patent: Dec. 9, 2003

(54) OPTICAL TRANSMITTING APPARATUS AND OPTICAL REPEATING APPARATUS

(75) Inventor: Katsuhiro Shirai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/096,414

(22) Filed: Mar. 13, 2002

(65) Prior Publication Data

US 2002/0126952 A1 Sep. 12, 2002

Related U.S. Application Data

(63) Continuation of application No. PCT/JP99/06056, filed on Oct. 29, 1999.

(51) Int. Cl.$^7$ .............................. G02B 6/28; H01S 3/00; H01S 3/09
(52) U.S. Cl. .................. 385/24; 385/42; 359/341.1; 372/69
(58) Field of Search .............................. 385/24, 42, 39, 385/27; 359/337, 337.11, 341.1; 372/6, 69

(56) References Cited

U.S. PATENT DOCUMENTS 4,899,043 A  2/1990  Mochizuki et al. ......... 250/227
5,778,117 A  7/1998  Inoue et al. .................. 385/24

FOREIGN PATENT DOCUMENTS

| JP | 64-27329 | 1/1989 | ............ H04B/9/00 |
| JP | 3-13018 | 1/1991 | |
| JP | 4-137833 | 5/1992 | |
| JP | 6-177837 | 6/1994 | |
| JP | 9-261187 | 3/1997 | |
| JP | 9-113941 | 5/1997 | |
| JP | 9-200144 | 7/1997 | |
| JP | 9-200145 | 7/1997 | |

Primary Examiner—Phan T. H. Palmer
(74) Attorney, Agent, or Firm—Staas & Halsey LLP

(57) ABSTRACT

In an optical amplifying technique using remote pumping, an optical transmitting apparatus and an optical repeating apparatus are provided. An optical repeating apparatus comprises a first optical transmitting unit, a first loopback unit, a second optical transmitting unit, a second loopback unit, and four optical couplers, wherein transmission light and reception light are transmitted through one optical fiber cable, whereby the installation cost and maintenance cost of the optical cable are decreased. Disconnect of the optical cable is detected by a monitoring function using pumping light and residual pumping light, whereby reliability and safety of the system are remarkably improved. Additionally, adjustment of the optical output level of the repeating station can be most suitably set according to an actual transmission distance.

42 Claims, 47 Drawing Sheets

OPTICAL TRANSMITTING APPARATUS AND OPTICAL REPEATING APPARATUS

This is a continuation of PCT/JP99/06056, filed Oct. 29, 1999.

TECHNICAL FIELD

The present invention relates to an optically amplified transmission apparatus and a repeater of a remote pumping type in an optical two-way transmission system, for example. Particularly, the present invention relates to an optical transmitting apparatus and an optical repeating apparatus suitable for use in a system which can transmit transmission-reception light and pumping light through optical fiber cables in one system, remotely control the output level of a pumping source, fulfil an optical level controlling function, a disconnect detecting function and an automatic restoring function for an optical cable among the stations.

BACKGROUND ART

Long distant transmission using optical fiber cables (hereinafter referred as optical cables, occasionally) is performed in order to transmit a large volume of data at a high speed, in recent years. In the long distance transmission, a transmission loss generates in an optical cable. For this, the optically amplified transmission system transmits transmission light and reception light through different optical cables in order to compensate it.

The optically amplified transmission system can remotely control an amplification level of an optical amplifier in the optical repeater. When the optical cables are installed undersea, for example, it is possible to remotely adjust the amplification level using an optical cable instead the administrator adjusts the amplification level by hands. Concretely, this adjustment is carried out by inputting pumping light to the optical amplifier, which is called the optical pumping system. In the optical pumping system, the pumping light of a transmission path terminal station is transmitted to an optical repeater, the transmitted pumping light and transmission light are multiplexed in the optical repeater, whereby optical repeating is performed.

In order to perform the optical repeating, a different optical cable from optical cables through which the transmission light and the pumping light are transmitted is installed, and these optical cables are prepared for each repeater to transmit optical signals. These repeaters are connected by the optical cables.

When a fault occurs in the optical cable and the optical cable is cut, it is necessary to specify the cut position and restore it. Detection of cut of an optical cable is called disconnect detection of an optical cable. The disconnect detecting function is dispensable.

FIG. 47 is a diagram showing an example of the optically amplified transmission system using the remote pumping optically amplifying system. An optically amplified transmission system 90 shown in FIG. 47 is described in Japanese Patent Laid-Open Publication No. 9-113941 in which a technique is disclosed, which can further extend a transmission distance of optical signals using an optically amplifying system which can do remote pumping.

The optically amplified transmission system 90 shown in FIG. 47 comprises a transmitting station (transmitting terminal) 90a, a receiving station (receiving terminal) 90b, a plurality (three, for example) of repeating stations 90c, and a plurality (three, for example) of repeating stations 90d between them. Optical cables in two systems are used for transmission and reception.

The transmitting station 90a comprises a transmitting unit 91a and a receiving unit 91b. The receiving station 90b comprises a transmitting unit 91d and a receiving unit 91c, as well. The transmitting unit 91a and the receiving unit 91d comprise a signal light source 92a and a plurality of pumping sources 92b. Each of the transmitting station 90a and the receiving station 90b prepares the pumping sources 92b in different systems from that of the signal light source in order to perform remote pumping, whereby pumping light is transmitted from a terminal station to a repeater through an optical cable differing from an optical cable for transmission-reception light between the transmitting station 90a and the receiving station 90b.

Japanese Patent Laid-Open Publication No. 9-200144 discloses an optically amplified repeating system which can suppress the output level of a repeater apparatus to realize a long repeater spacing. According to the technique disclosed in this publication, it is possible to extend the repeating distance.

However, the techniques disclosed in Japanese Patent Laid-Open Publication No. 9-113941 and Japanese Patent Laid-Open Publication No. 9-200144 have three types of problems. First, since a plurality of pumping sources are transmitted through optical cables differing from an optical cable through which optical signals are transmitted, the investment cost of the optical cables is high. In concrete, in the optically amplified transmission system 90 shown in FIG. 47, the number of the optical cables required among the optical repeaters is two to three, and the number of optical cables required between the terminal stations is 14 for both transmission and reception. Further, no description of the optical level controlling method is seen therein.

Further, in remote pumping, adjustment of the output level between the optical repeaters sometimes lacks accuracy since the adjustment is carried out on the basis of theoretical optical transmission distance calculation. The second problem is that a precise control is necessary in each terminal station, which requires a labor cost of an administrator who executes the control.

The third problem is that the method for detecting cut of an optical cable is not established.

In the light of the above problems, the first object of the present invention is to enable transmission and reception of transmission light and reception light through one optical fiber cable, thereby decreasing the installation cost and maintenance cost of the optical cables.

The second object of the present invention is to detect cut of the optical cable by a monitoring function using pumping light and residual pumping light, thereby largely improving reliability and safety of the system. The third object of the present invention is to most suitably set optical output level adjustment in the repeating station according to an actual transmitting distance.

DISCLOSURE OF INVENTION

For this, an optical transmitting apparatus of this invention comprises an optical transmitting means for multiplexing and amplifying first transmission light ($\lambda 1L$) and first pumping light ($\lambda 2PL$) amplifying the first transmission light ($\lambda 1L$), and outputting amplified optical signal to an internal optical fiber, a level monitoring means connected to the optical transmitting means for detecting a level of the optical signal outputted from the optical transmitting means, an optical multiplexing means connected to the internal optical fiber for transmitting an optical signal in the internal optical fiber to a first optical fiber connected to an external optical repeating apparatus, and also being operable to receive an optical signal having a predetermined wavelength in transmission light transmitted from the external optical repeating apparatus through the first optical fiber, and split the optical signal into a plurality of directions, and output split optical signal, and a loop back light detecting means connected to the optical multiplexing means for receiving an optical monitoring signal ($\lambda$2PL') transmitted from the external optical repeating apparatus.

Accordingly, transmission light and reception light can be transmitted through optical fiber cables in one system, so that the installation cost and maintenance cost of an optical cable cost can be decreased. Since cut of the optical cable is performed by a monitoring function using pumping light and residual pumping light in a two-way transmission, reliability and safety of the system can be remarkably improved.

An optical repeating apparatus of this invention comprises a first optical transmitting means for receiving first transmission light ($\lambda$1L) and first pumping light ($\lambda$2PL) transmitted from an optical transmitting apparatus through a first optical fiber, amplifying the first transmission light ($\lambda$1L) and the first pumping light ($\lambda$2PL), and outputting second transmission light ($\lambda$1L') and second pumping light ($\lambda$2PL'), a first loopback means connected to the first optical transmitting means to extract the second pumping light ($\lambda$2PL') from the optical signal amplified by the first optical transmitting means, and outputting the second pumping light ($\lambda$2PL'), a second optical transmitting means for receiving third transmission light ($\lambda$1R) and third pumping light ($\lambda$3PR) transmitted from an optical receiving apparatus through the second optical fiber, amplifying the third transmission light ($\lambda$1R) and the third pumping light ($\lambda$3PR), and outputting fourth transmission light ($\lambda$1R'), a second loopback means connected to the second optical transmitting means to extract fourth pumping light ($\lambda$3PR') from the optical signal amplified by the second optical transmitting means, and outputting the fourth pumping light ($\lambda$3PR'), a first optical coupler disposed on an output's side of the first optical transmitting means to output the second transmission light ($\lambda$1L') and the second pumping light ($\lambda$2PL') toward the optical receiving apparatus, while outputting the third transmission light ($\lambda$1R) and the third pumping light ($\lambda$3PR) from the optical receiving apparatus, and a second optical coupler disposed on an output's side of the second optical transmitting means to output the optical signal from the first loopback means and the optical signal from the second optical transmitting means toward a side of the optical transmitting apparatus, while outputting the first transmission light ($\lambda$1L) and the first pumping light ($\lambda$2PL) from a side of the optical transmitting apparatus.

Accordingly, optical output level adjustment in the repeating station is most suitably set according to an actual transmission distance, which allows an efficient system operation.

BRIEF DESCRIPTION OF DRAWINGS

BEST MODE FOR CARRYING OUT THE INVENTION (A) Description of First Embodiment of the Invention FIG. 1 is a diagram showing a structure of an optically amplified two-way transmission remote pumping system according to a first embodiment of this invention. An optically amplified two-way transmission remote pumping system 10 shown in FIG. 1 is a system which can transmit/receive transmission light, reception light and pumping light through optical fiber cables of one system.

Figure 1:
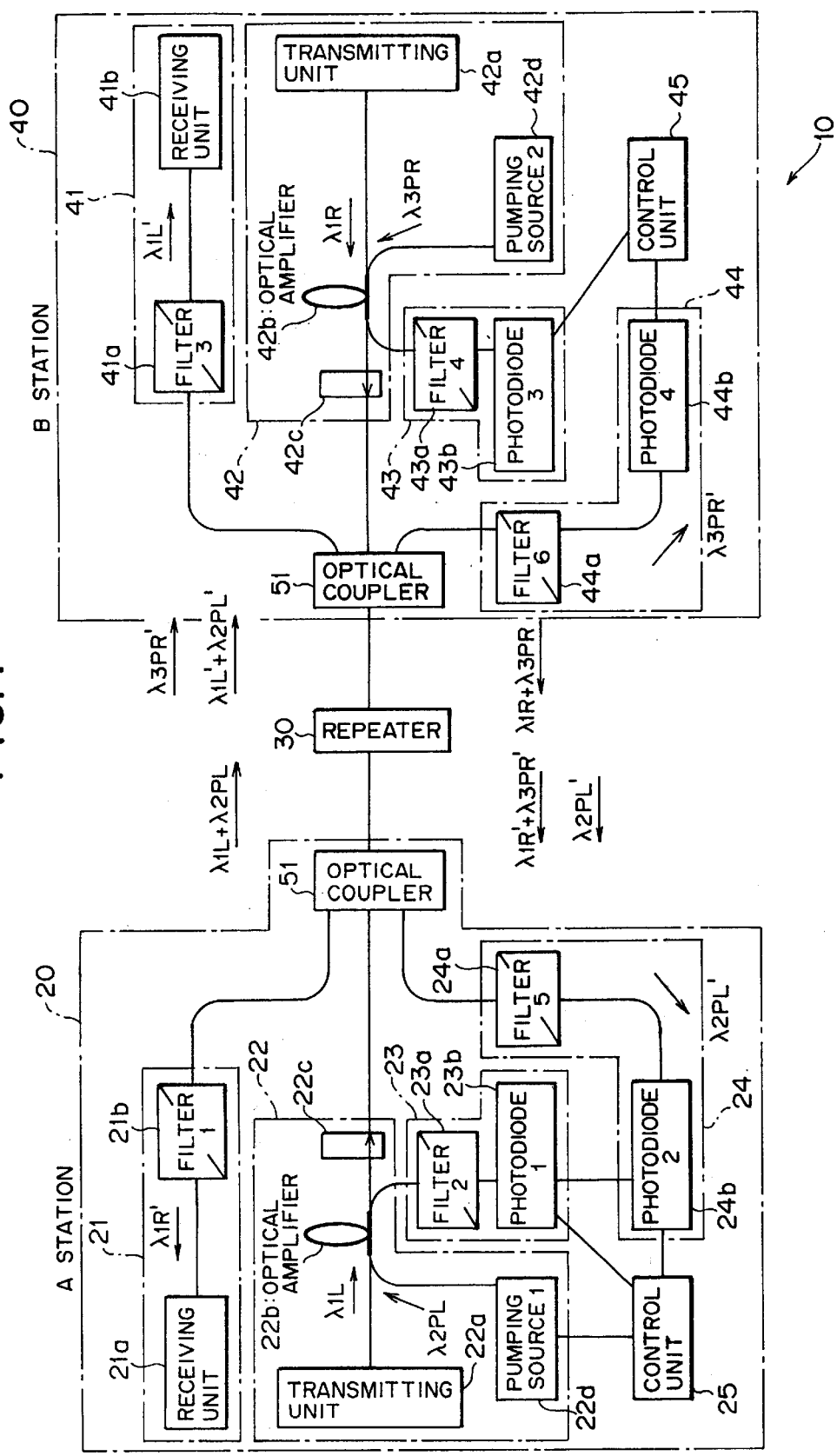
FIG. 1 is a diagram showing a structure of an optical amplification two-way transmission remote pumping system according to a first embodiment of this invention.

The optical system 10 shown in FIG. 1 comprises a transmitting station (A station) 20, a repeating station 30, and a receiving station (B station) 40, where the stations are connected by optical cables to be able to transmit optical signals in two ways. In the repeating station 30, the output level of a pumping source thereof is controlled. Between the stations, a control on the optical level and detection of cut of the optical cable are carried out, whereby the system can be automatically restored. In the following descriptions, the optically amplified two-way transmission remote pumping system will be occasionally referred as an optical system.

In FIG. 1, wavelengths of optical signals used among the transmitting station 20, the repeating station 30 and the receiving station 40 areas follows. Wavelength of optical signals (transmission light) sent from the transmitting station 20 to the repeating station 30 is of two types; $\lambda 1L$ and $\lambda 2PL$. Wavelengths of optical signals sent from the repeating station 30 to the transmitting station 20 are of three types; $\lambda 1L'$, $\lambda 3PR'$ and $\lambda 2L'$.

In the wavelengths of the transmission light from the transmitting station 20 to the repeating station 30, $\lambda 1L$ is a wavelength component of signal light on which a signal component has been superimposed, and $\lambda 2PL$ is a wavelength component of a first pumping source (Pump LD or PLD; Pump Laser Diode) 22d to be described later. On the other hand, in the wavelengths of transmission light from the repeating station 30 to the transmitting station 20, $\lambda 1R'$ is a wavelength component of signal light on which a signal component has been superimposed, and $\lambda 3PR'$ and $\lambda 2PL'$ are wavelength components of two types of pumping sources in the repeating station 30. Optical signals having these wavelength components become monitor light, and are inputted to the transmitting station 20.

Meanwhile, with respect to subscripts of the wavelengths, L represents local, whereas R represents remote. Here, "local" signifies the transmitting station 20 that is a local station, whereas "remote" signifies the receiving station 40 that is a remote station. These subscripts will be used in the same meanings in the following descriptions.

The transmitting station 20 in FIG. 1 is a transmitting terminal station which transmits/receives optical signals. The transmitting station 20 comprises an optical transmitting means 22, a level monitoring means 23, an optical coupler (ODC: Optical Directional Coupler) 51, a loopback light detecting means 24, a controlling means (control unit) 25 and an optical receiving means 21.

The optical transmitting means 22 multiplexes a first transmission light ($\lambda 1L$) and first pumping light ($\lambda 2PL$) amplifying the first transmission light ($\lambda 1L$), amplifies them, and outputs the amplified optical signal to an internal optical fiber. The optical transmitting means 22 comprises a transmitting unit 22a, a first pumping source (pumping source 21) 22d, an optical amplifier 22b, and an isolator 22c. The internal optical fiber is installed inside the transmitting station 20, which will be sometimes used to differentiate it from an optical cable installed in the transmission section in the following descriptions.

The transmitting unit 22a electro-optically converts a voice signal or a data signal on the telephone, for example, sent from another network, and outputs it, which is referred as an OS (Optical Sending Unit) In the following descriptions, assuming that a voice signal or the like on the telephone is transmitted and received. The first pumping source 22d generates first pumping light ($\lambda$2PL). The optical amplifier 22b amplifies an optical signal, an EDFA (Erbium-Doped Fiber Amplifier) being used therefor. The isolator 22c sends an optical signal inputted from the optical amplifier 22b to the optical coupler 51, while absorbing power of an optical signal leaking from the optical coupler 51 to prevent the optical signal from flowing into the optical amplifier 22b.

Whereby, the optical signal outputted from the transmitting unit 22a and the first pumping light ($\lambda$2PL) from the first pumping source 22d are optically amplified by the optical amplifier 22b, and the optically amplified optical signal is sent to the optical coupler 51 through the isolator 22c.

The level monitoring means 23 is connected to the optical transmitting means 22 to detect a level of the optical signal outputted from the optical transmitting means 22. The level monitoring means 23 comprises a second filter (filter 2) 23a, and a first optical detector (photodiode 1) 23b. The second filter 23a extracts only the $\lambda$2PL component in the optical signal ($\lambda$1L+$\lambda$2PL) outputted from the optical transmitting means 22, and outputs it. This function is realized by, for example, an optical filter. The first optical detector 23b detects an output from the second filter 23a, a function of which is realized by, for example, a photodiode. Incidentally, the optical signal ($\lambda$1L+$\lambda$2PL) signifies an optical signal having a wavelength $\lambda$1L and a wavelength $\lambda$2PL. The similar expression will be sometimes used in the following descriptions.

The optical coupler 51 is connected to the internal optical fiber to transmit the optical signal in the internal optical fiber to a first optical fiber connected to the repeating station 30 (external optical repeating apparatus), while being able to receive an optical signal having a predetermined wavelength in an optical signal transmitted from the repeating station 30 through the first optical fiber to branch the optical signal into a plurality of directions and output it. The optical coupler 51 thus multiplexes and demultiplexes the optical signals. In concrete, an optical fiber of a fusion type with 1×3 terminals is used for the optical coupler 51. An optical signal is inputted from one terminal, and outputted as the same optical signal from each of the three terminals. On the other hand, optical signals are inputted from the three terminals, and outputted as the same optical signal from one terminal. The first optical fiber signifies an optical fiber transmitting optical signals sent from the transmitting station's side. Whereby, transmission light and reception light can be transmitted through one optical cable.

The loopback light detecting means 24 is connected to the optical coupler 51 to receive an optical monitoring signal ($\lambda$2PL') transmitted from the repeating station 30. The loopback light detecting means 24 comprises a fifth filter (filter 5) 24a and a second optical detector (photodiode 2) 24b. The optical monitoring signal is an optical signal transmitted from the adjacent repeating station 30, as will be described later, used to monitor a state of transmission in the optical cable. The fifth filter 24a extracts only the $\lambda$2PL' component in the optical signal ($\lambda$1R'+$\lambda$3PR'+$\lambda$2PL') from the repeating station outputted from the optical coupler 51, and outputs it, a function of which is realized by, for example, an optical filter. The second optical detector 24b detects an output from the fifth filter 24a, a function of which is realized by, for example, a photodiode.

The controlling means 25 is connected to the optical transmitting means 22, the level monitoring means 23 and the loopback light detecting means 24 to control the output level of the first pumping light ($\lambda$2PL) on the basis of a reception level of the optical monitoring signal ($\lambda$2PL') from the loopback light detecting means 24.

Only the $\lambda$2PL component is extracted from the optical signal outputted from the optical transmitting means 22 by the second filter 23a, an output from the second filter 23a is detected by the first optical detector 23b, the optical monitoring signal ($\lambda$2PL') transmitted from the repeating station 30 is received by the loopback light detecting means 24, the $\lambda$2PL component and the $\lambda$2PL' component are inputted to the controlling means 25, and the output level of the first pumping light ($\lambda$2PL) is controlled by the controlling means 25 on the basis of the reception levels of these components, and adjusted to the optimum output power.

The optical receiving means 21 is connected to the optical coupler 51 to receive an optical signal transmitted from the repeating station 30. The optical receiving means 21 comprises a first filter (filter 1) 21b and a receiving unit 21a. The first filter 21b extracts only a $\lambda$1R' component in an optical signal from the optical coupler 51. The receiving unit 21a receives an optical signal having the $\lambda$1R' component from the first filter 21b, electro-optically converts the optical signal, and sends, for example, a voice signal or a data signal on the telephone to another network (not shown). The receiving unit is sometimes called an OR (Optical Receiving Unit).

Accordingly, the transmitting station 20 has three kinds of functions; a transmitting function, a receiving function and a monitoring function. An optical signal to be transmitted is outputted to the optical cable, and an optical signal and monitor light send from the repeating station 30 are inputted to the same optical cable. In the transmitting station 20, the administrator sets the pumping level of an optical signal to be sent to an appropriate value to control it, on the basis of the monitor light.

As this, it is possible to transmit/receive through the optical cables in one system, and remotely adjust the output level of the pumping light in the repeating station 30.

The repeating station (repeater) 30 is provided on a transmission path of the optical system 10 to be able to amplify optical signals in two ways, and transmit them. The repeating station 30 also has a function of controlling the optical level, a function of detecting cut of the optical cable, and a function of automatic restoration after the cut is detected, between repeaters and between repeater stations. The repeating station 30 comprises an optical amplifier which can remotely pump, as will be described later.

The receiving station 40 is a transmission terminal station which transmits/receives optical signals. The receiving station 40 comprises an optical transmitting means 42, a level monitoring means 43, an optical coupler 51, a loopback light detecting means 44, a controlling means (control unit) 45 and an optical receiving means 41.

The optical transmitting means 42 multiplexes third reception light ($\lambda$1R) and second pumping light ($\lambda$3PR) amplifying the third reception light ($\lambda$1R) and amplifies them, then outputs the amplified optical signal to an internal optical fiber. The optical transmitting means 42 comprises a transmitting unit 42a, a second pumping source (pumping source 2) 42d, an optical amplifier 42b and an isolator 42c.

The transmitting unit 42a is similar to the above transmitting unit 22a. The second pumping source 42d generates the second pumping light ($\lambda$3R). The optical amplifier 42b amplifies an optical signal, an EDFA being used for it. The isolator 42c sends an optical signal inputted from the optical amplifier 42b to the optical coupler 51, and absorbs power of the optical signal leaking from the optical coupler 51.

The optical signal outputted from the transmitting unit 42a and the second pumping light ($\lambda$3PR) from the second pumping source 42d are optically amplified by the optical amplifier 42b, and the optically amplified optical signal is sent to the optical coupler 51 via the isolator 42c.

The level monitoring means 43 is connected to the optical transmitting means 41 to detect a level of the optical signal outputted from the optical transmitting means 41, which comprises a fourth filter (filter 4) 43a and a third optical detector (photodiode 3) 43b. The fourth filter 43a extracts only a $\lambda$1R component in the optical signal ($\lambda$1R+$\lambda$3PR) outputted from the optical amplifier 42b and outputs it, an optical filter, for example, being used for it. The third optical detector 43b detects an output from the fourth filter 43a, a photodiode, for example, being used for it.

The optical coupler 51 is connected to the internal optical fiber to transmit an optical signal in the internal optical fiber to a second optical fiber connected to the repeating station 30. The optical coupler 51 can also receive an optical signal having a predetermined wavelength in an optical signal transmitted from the repeating station 30 through the second optical fiber, and branch the optical signal in a plurality of directions and output it, an optical fiber of a fusion type with 1×3 terminals (not shown) being used for it. The second optical fiber signifies an optical fiber transmitting optical signals send from the receiving station's side. Hereinafter, the above first optical fiber and this second optical fiber will be used in the similar meanings.

The loopback light detecting means 44 is connected to the optical coupler 51 to receive a optical monitoring signal ($\lambda$3PR') transmitted from the repeating station 30. The loopback light detecting means 44 comprises a sixth filter (filter 6) 44a, a fourth optical detector (photodiode 4) 44b. The sixth filter 44a extracts only the ($\lambda$3PR') component in an optical signal ($\lambda$1L'+$\lambda$2PL'+$\lambda$3PR') from the repeating station 30 outputted from the optical coupler 51 and outputs it, a function of which is realized by, for example, an optical filter. The fourth optical detector 44b detects an output from the sixth filter 44a, a function of which is realized by, for example, a photodiode.

The controlling means 45 is connected to the optical receiving means 41, the level monitoring means 43 and the loopback light detecting means 44 to control the output level of second pumping light ($\lambda$3PR) on the basis of a reception level of the optical monitoring signal ($\lambda$3PR') from the loopback light detecting means 44. Each of the controlling means 45 and the controlling means 25 (in the transmitting station 20) has a disconnect detecting function to be able to detect occurrence of a fault in the second optical fiber. This will be explained in a second modification of the first embodiment to be described later.

Only the $\lambda$3PR component in the optical signal outputted from the optical transmitting means 42 is extracted by the fourth filter 43a, an output from the fourth filter 43a is detected by the third optical detector 43b, the optical monitoring signal ($\lambda$3PR') transmitted from the repeating station 30 is received by the loopback light detecting means 44, the $\lambda$3PR component and the $\lambda$3PR' component are inputted to the controlling means 45, and the output level of the second pumping light ($\lambda$3PR) is controlled by the controlling means 45 on the basis of the reception levels of these, and adjusted to the optimum output power.

The optical receiving means 41 is connected to the optical coupler 51 to receive an optical signal from the repeating station 30, which comprises a third filter (filter 3) 41a and a receiving unit 41b. The third filter 41a extracts only a $\lambda$1L' component in the optical signal inputted from the optical coupler 51. The receiving unit 41 is similar to the above receiving unit 21. The receiving unit 41 receives an optical signal having the $\lambda$1L' component from the third filter 41a, electro-optically convert it, and sends a voice signal or a data signal on the telephone to another network (not shown).

In FIG. 1, wavelengths of optical signals used between the receiving station 40 and the repeating station 30 are as follows. Namely, kinds of wavelengths of optical signals sent from the repeating station 30 to the receiving station 40 are three ($\lambda$1L', $\lambda$2PL' and $\lambda$3PR'). Kinds of wavelengths of optical signals (transmission light) sent from the receiving station 40 to the repeating station 30 are two ($\lambda$1R and $\lambda$3PR).

In the wavelengths of transmission light from the receiving station 40 to the repeating station 30, $\lambda$1R is a wavelength of an optical signal having a component on which a signal component has been superimposed. $\lambda$3PR is a wavelength of the second pumping source 42d. In the wavelengths of transmission light from the repeating station 30 to the receiving station 40, $\lambda$1L' is a wavelength of an optical signal having a component on which a signal component has been superimposed. $\lambda$2PL' and $\lambda$3PR' are wavelengths of two kinds of pumping sources in the repeating station 30. Optical signals having these wavelengths become monitor light, and are inputted to the receiving station 40.

Figure 2:
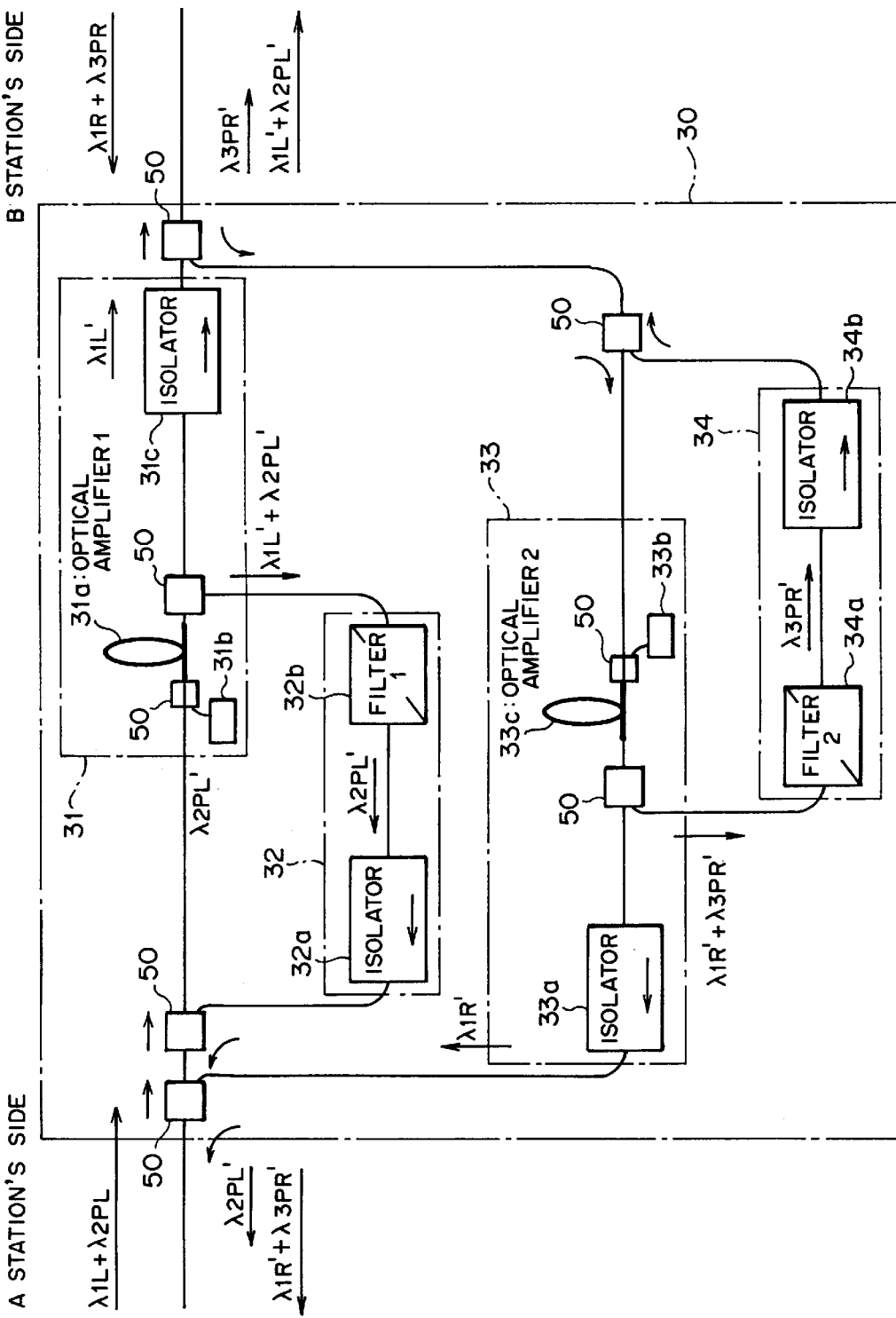
FIG. 2 is a diagram showing an internal structure of a repeating station according to the first embodiment of this invention.

FIG. 2 is a diagram showing an internal structure of the repeating station 30 according to the first embodiment of this invention. On the right side of this drawing is the receiving station 40 (B station). On the left side is the transmitting station 20 (A station). The repeating station 30 shown in FIG. 2 comprises a first optical transmitting means 31, a first loopback means 32, a second optical transmitting means 33, a second loopback means 34, and four optical couplers 50.

The first optical transmitting means 31 receives the first transmission light ($\lambda$1L) and the first pumping light ($\lambda$2PL) transmitted from the transmitting station 20 through the first optical fiber, amplifies the first transmission light ($\lambda$1L) and the first pumping light ($\lambda$2PL), and transmits second transmission light ($\lambda$1L') and second pumping light ($\lambda$2PL') to the second optical fiber toward the receiving station 40. The first optical transmitting means 31 comprises a first optical amplifier (optical amplifier 1) 31a, a third pumping source 31b, two optical couplers 50 and an isolator 31c.

The first optical amplifier 31a receives the first transmission light ($\lambda$1L) and the first pumping light ($\lambda$2PL), amplifies the first transmission light ($\lambda$1L) and the first pumping light ($\lambda$2PL), and outputs them. The third pumping source 31b generates the pumping light ($\lambda$2PL').

Each of the two optical couplers 50 multiplexes optical signals in two directions, a function of which is realized by, for example, an optical fiber of a fusion type with 1×2 terminals (not shown). An optical signal is inputted from one terminal, and the optical signal is outputted as the same optical signals from two terminals. On the other hand, optical signals are inputted from the two terminals, and the optical signals are outputted as the same optical signal from the one terminal.

Accordingly, these optical couplers 50 can multiplex and demultiplex optical signals. An optical signal from the transmitting station 20 is fed through the optical couplers 50 in two stages provided on the entrance's side, multiplexed with λ2PL' from the third pumping source 31*b* by the optical coupler 50 in the third stage at the input of the first optical amplifier 31*a*, and inputted to the first optical amplifier 31*a*. The optical signal amplified by the first optical amplifier 31*a* is demultiplexed into two directions by the optical coupler 50.

The amplified optical signal from the first optical amplifier 31*a* is split by the optical coupler 50 connected to the output's side of the first optical amplifier 31*a*, an optical signal having a wavelength λ1L' is sent toward the output isolator 31*c* (toward the receiving station 40), and an optical signal having wavelengths λ1L' and λ2PL' is sent to the input's side (toward the transmitting station 20). Incidentally, such an optical signal containing two kinds of wavelengths will be occasionally referred as an optical signal of λ1L'+λ2PL' in the following descriptions. Additionally, the wavelength λ1L' component will be abbreviated as λ1L', occasionally.

The isolator 31*c* sends the split optical signal to the optical coupler 50. The isolator 31*c* also absorbs power of the optical signal leaking from the optical coupler 50 to prevent the optical signal from flowing into the first optical amplifier 31*a*.

On the output's side of the isolator 31*c* provided is the optical coupler 50. Namely, the optical coupler 50 is provided on the output's side of the first optical transmitting means 31 to output second transmission light (λ1L') and second pumping light (λ2PL') to the optical receiving apparatus's side, and outputs the third transmission light (λ1R) and the third pumping light (λ3PR) from the optical receiving apparatus's side, which functions as a first optical coupler.

The first loopback means 32 is connected to the first optical transmitting means 31 to extract the second pumping light (λ2PL') from the optical signal amplified by the first optical transmitting means 31, and outputs the second pumping light (λ2PL'), which comprises a first loopback filter (filter 1) 32*b* and an isolator 32*a*. The first loopback filter 32*b* is inputted thereto an optical signal (λ1L'+λ2PL') outputted from the above first optical transmitting means 31, attenuates λ1L' in these wavelengths, and outputs the remaining wavelength λ2PL'. The isolator 32*a* has the similar function to the above isolator 31*c*. In concrete, the isolator 32*a* is provided in order to prevent an optical signal containing an unnecessary component for the first loopback filter 32*b* from flowing back.

The second optical transmitting means 33 receives the third transmission light (λ1R) and the third pumping light (λ3PR) transmitted from the receiving station 40 through the second optical fiber, amplifies the light, and outputs fourth transmission light (λ1R'). The second optical transmitting means 33 comprises a second optical amplifier (optical amplifier 2) 33*c*, a fourth pumping source 33*b*, two optical couplers 50 and an isolator 33*a*. The fourth pumping source 33*b* generates fourth pumping light (λ1R'). Incidentally, the second optical amplifier 33*c* and the isolator 33*a* are similar to the first optical amplifier 31*a* and the isolator 31*c* mentioned above, and the optical coupler 50 is similar to that mentioned above, duplicated descriptions of which are thus omitted.

On the output's side of the second optical transmitting means 33 (on the output's side of the second optical amplifier 33*c*) provided is an optical coupler 50 to output an optical signal from the first loopback means 32 and an optical signal from the second optical transmitting means 33 toward the transmitting station 20 (optical transmitting apparatus), and to output the first transmission light (λ1L) and the first pumping light (λ2PL) from the transmitting station 20. The optical coupler 50 functions as a second optical coupler.

The second loopback means 34 is connected to the second optical amplifier 33*c* to extract fourth pumping light (λ3PR') from the optical signal amplified by the second optical amplifier 33*c*, and outputs the fourth pumping light (λ3PR'). The second loopback means 34 comprises a second loopback filter 34*a* (filter 2) and an isolator 34*b*. The second loopback filter 34*a* is inputted thereto an optical signal having wavelengths (λ1R'+λ3PR') outputted from the second optical transmitting means 33, attenuates the λ1R' component in these wavelengths, and outputs the remaining λ3PR' component. The isolator 34*b* has a function similar to the above isolator 31*c*. In concrete, the isolator 34*b* is installed in order to prevent an optical signal having an unnecessary component for the second loopback filter 34*a* from flowing back.

Each of the transmitting station 20 and the receiving station 40 in FIG. 1 has these optical couplers 50, but denotation of the optical couplers 50 is omitted. Similarly, these optical couplers 50 provided in each of the transmitting station 20, the repeating station 30 and the receiving station 40 are omitted in the drawings in embodiments and modifications to be described later.

In FIG. 2, an optical signal repeating operation of the repeating station 30 is as follows. Namely, transmission light (λ1L +λ2PL) from the transmitting station 20 is inputted to the transmitting means 31, multiplexed with λ2PL' from the third pumping source 31*b* in the first optical transmitting means 31, optically amplified by the first optical amplifier 31*a*. After that, the repeater-amplified λ1L' component is outputted along with the residual pumping light (λ2PL') as amplified signal light (λ1L'+λ2PL') to the remote receiving station 40 via the isolator 31*c*.

Transmission light (λ1R+λ3PR) from the receiving station 40 is inputted to the second optical transmitting means 33, multiplexed with λ1R' from the fourth pumping source 33*b* in the second optical transmitting means 33, optically amplified by the second optical amplifier 33*c*. The repeater-amplified λ1R' is outputted along with the residual pumping light λ3PR' as amplified signal light (λ1R'+λ3PR') to the remote transmitting station 20 via the isolator 33*a*.

In FIG. 2, an optical signal looping-back operation from the repeating station 30 to the transmitting station 20 is as follows. Namely, an optical signal amplified by the first optical amplifier 31*a* is branched toward the first loopback filter 32*b* in the first loopback means 32. The λ1L' component of the light signal is removed by the first loopback filter 32*b*, and the λ2PL' component is looped back to the transmitting station 20.

Similarly, an optical signal looping-back operation from the repeating station 30 to the receiving station 40 as follows. Namely, an optical signal amplified by the second optical amplifier 33*c* is branched toward the first loopback filter 32*b* in the second loopback means 34. The λ1R' component of the light signal is removed by the first loopback filter 32*b*, and the λ3PR' component is looped back to the receiving station 40.

With the above structure, repeating and monitoring of the light signal are performed among the transmitting station 20, the repeating station 30 and the receiving station 40, optical transmission using a remote pumping control is thereby performed.

An electric signal such as a voice signal or the like on the telephone is converted into an optical signal in the transmitting station 20 (refer to FIG. 1), then transmission light (λ1L+λ2PL) is transmitted from the transmitting station 20. In the repeating station 30, transmission light (λ1L'+λ2PL') and monitor light λ3PR' are transmitted in the above repeating operation to the receiving station 40. In the receiving station 40, signal light λ1L' is extracted, converted into an electric signal, returned to a signal for the telephone, and sent to another switching station or the like.

On the other hand, amplified pumping light λ2PL' to be sent back from the repeating station 30 to the transmitting station 20 is inputted to the optical coupler 51 in the transmitting station 20, and branched into three directions; toward the receiving unit 21a, the transmitting unit 22a and the loopback light detecting means 24. For the receiving unit 21a and the transmitting unit 22a among them, λ2PL' is a noise component, thus removed by the first filter 21b and the isolator 22c. λ2PL' is inputted to the second optical detector 24b in the loopback light detecting means 24. In the control unit 25, an actual transmission loss between the transmitting station 20 and the repeating station 30 is calculated on the basis of a difference between a level of the first optical detector 23b and a level of the second optical detector 24b, and an output level of the first pumping source 22d is so controlled as to yield the optimum amplification factor.

Similarly, an electric signal such as a telephone signal or the like from the receiving station 40 is converted into an optical signal. Transmission light (λ1R+λ3PR) is transmitted from the receiving station 40. In the repeating station 30, transmission light (λ1R'+λ3PR') and monitor light λ2PL' are transmitted in the above repeating operation to the transmitting station 20. In the transmitting station 20, signal light λ1R' is extracted, converted into an electric signal, returned to a signal for the telephone, and sent to another switching station or the like.

On the other hand, amplified pumping light λ3PR' to be sent back from the repeating station 30 to the receiving station 40 is inputted to the optical coupler 51 in the receiving station 40, then branched into three directions; toward the receiving unit 41a, the transmitting unit 42a and the loopback light detecting means 44. For the receiving unit 41a and the transmitting unit 42a among them, λ3PR' is a noise component, thus removed by the third filter 41a and the isolator 42c. λ3PR' is inputted to the fourth optical detector 44b (photodiode 4) in the loopback light detecting means 44. In the control unit 45, an actual transmission loss between the receiving station 40 and the repeating station 30 is calculated on the basis of a difference between a level of the third optical detector 43b and a level of the fourth optical detector 44b, and the output level of the second pumping source 42d is so controlled as to yield the optimum amplification factor.

As this, communication is performed among the transmitting station 20, the repeating station 30 and the receiving station 40 using only optical cables in one system, and the output level of the pumping source is automatically controlled in each of the transmitting station 20, the repeating station 30 and the receiving station 40, so that the optimum communication becomes possible.

By introducing this optical system 10 as above, the installation cost and maintenance cost of the optical cables are largely decreased, and reliability and safety of this optical system 10 is remarkably improved.

(A1) Description of First Modification of First Embodiment of the Invention

Figure 3:
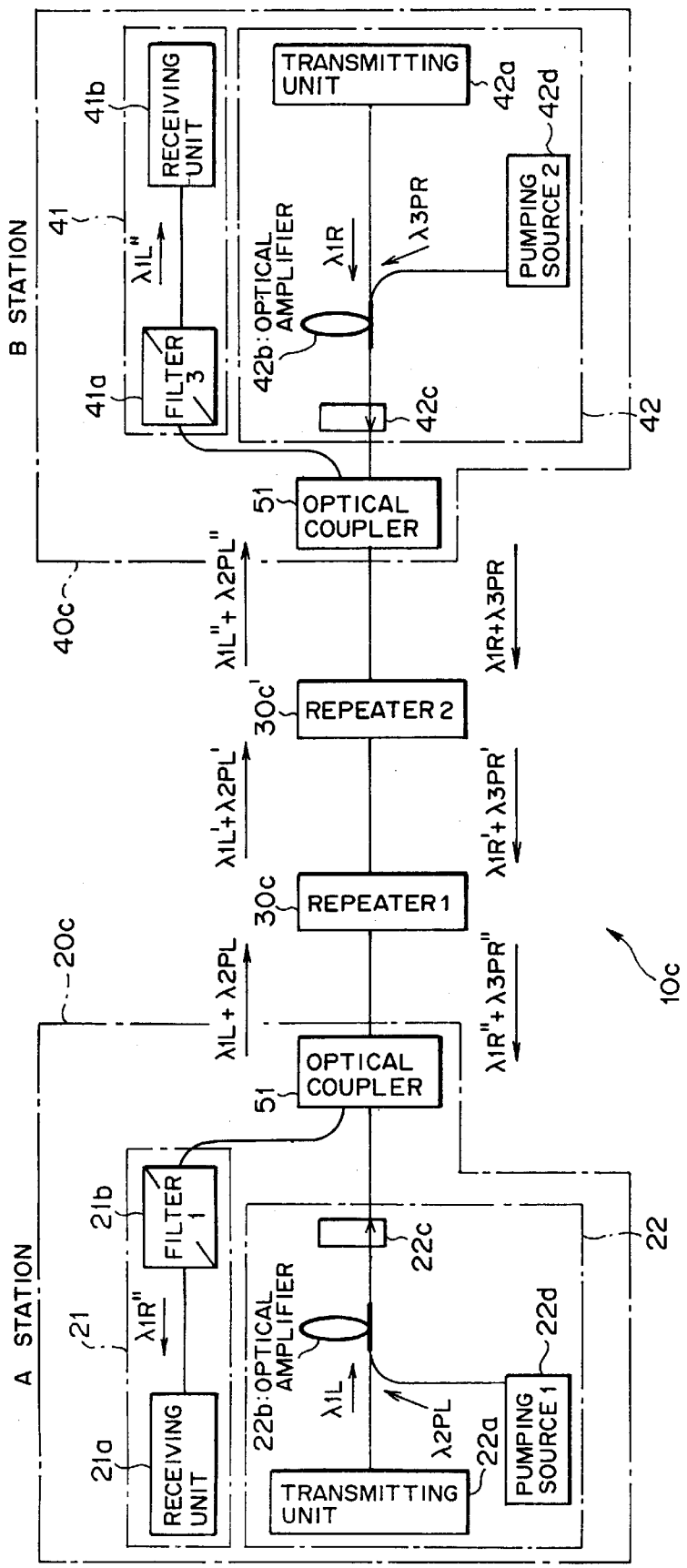
FIG. 3 is a diagram showing a structure of an optical system according to a first modification of the first embodiment of this invention.

FIG. 3 is a diagram showing a structure of an optical system according to a first modification of the first embodiment of this invention. An optical system 10c shown in FIG. 3 is a system in which transmission light, reception light and pumping light can be transmitted/received through optical cables in one system. The optical system 10c comprises a transmitting station (A station) 20c, a first repeating station (repeater 1) 30c, a second repeating station (repeater 2) 30c' and a receiving station (B station) 40c, where the stations are connected by optical cables, whereby optical signals are transmitted/received in two ways.

In FIG. 3, a wavelength of transmission light of the transmitting station 20c is λ1L, and a wavelength of a first pumping source 22d is λ2PL. A wavelength of the receiving station 40c is λ1R, and a wavelength of a second pumping source 42d is λ3PR.

In FIG. 3, parts designated by like reference characters have like or corresponding functions described above, further descriptions of which are thus omitted. Hereinafter, only parts differing from those in the first embodiment will be described. In other embodiments and modifications, modified modes of the transmitting station 20, the repeating station 30 and the receiving station 40 of the optical system will be described.

Figure 4:
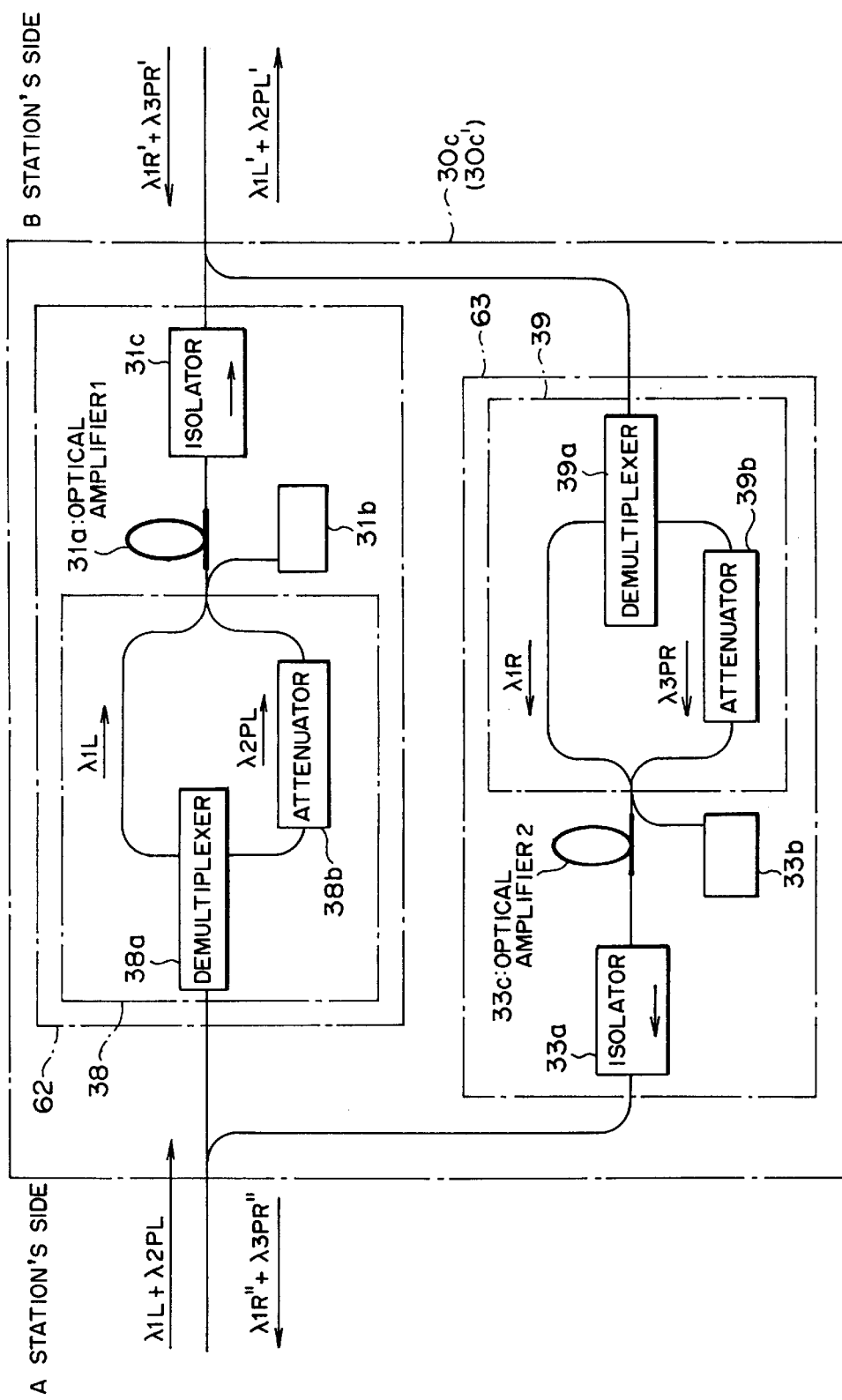
FIG. 4 is a diagram showing an internal structure of a first repeating station according to the first modification of the first embodiment of this invention.

FIG. 4 is a diagram showing an internal structure of a first repeating station according to the first modification of the first embodiment of this invention. The first repeating station 30c shown in FIG. 4 comprises a first optical transmitting means 62, a second optical transmitting means 63, and two optical couplers 50 (not shown).

The first optical transmitting means 62 receives first transmission light (λ1L) and first pumping light (λ2PL) transmitted from a transmitting station 20c through a first optical fiber, changes either a level of the first transmission light (λ1L) or a level of the first pumping light (λ2PL) to a necessary level, amplifies the changed first transmission light (λ1L) and first pumping light (λ2PL), and outputs second transmission light (λ1L') and second pumping light (λ2PL'). The first optical transmitting means 62 comprises a first pumping light adjusting means 38, a first optical amplifier 31a, a pumping source 31b and an isolator 31c.

The first pumping light adjusting means 38 splits the first transmission light (λ1L) and the first pumping light (λ2PL), attenuates a level of the pumping light (λ2PL) by a necessary level, and outputs the first transmission light (λ1L) and the first pumping light (λ2PL). The first pumping light adjusting means 38 comprises a demultiplexer 38a, a variable attenuator (attenuator) 38b and an optical coupler (not shown). The demultiplexer 38a splits into the first transmission light (λ1L) and the first pumping light (λ2PL), and outputs them, a function of which is realized by an optical fiber of a fusion type. The variable attenuator 38b attenuates an optical signal by a predetermined level, and outputs it.

The second optical transmitting means 63 receives third transmission light (λ1R) and third pumping light (λ3PR) transmitted from a receiving station 40c through a second optical fiber, changes either a level of the third transmission light (λ1R) or a level of the third pumping light (λ3PR) to a necessary level, amplifies the changed third transmission light (λ1R) and third pumping light (λ3PR), and outputs fourth transmission light (λ1R') The second optical transmitting means 63 comprises a second pumping light adjusting means 39, a second optical amplifier 33c and an isolator 33a.

The second pumping light adjusting means 39 splits into the third transmission light (λ1R) and the third pumping light (λ3PR), attenuates a level of the pumping light (λ3PR) by a necessary level, and outputs the third transmission light (λ1R) and the third pumping light (λ3PR). The second pumping light adjusting means 39 comprises a demultipexer 39a, a variable attenuator (attenuator) 39b, and an optical coupler 50 (not shown). The demultiplexer 39a splits into the third transmission light ($\lambda 1R$) and the third pumping light ($\lambda 3PR$), and outputs them, a function of which is realized by an optical fiber of a fusion type. The variable attenuator 39b attentuates an optical signal by a predetermined level, and outputs it.

Further descriptions of parts in FIG. 4 corresponding to those described above are omitted here.

Internal processing in the first repeating station 30c is as follows. Namely, transmission light ($\lambda 1L+\lambda 2PL$) from the transmitting station 20c is inputted to the first repeating station 30c, split into two by the demultiplexer 38a of the first pumping light adjusting means 38, and demultiplexed into a $\lambda 1L$ component and a $\lambda 2pl$ component. The demultiplexed $\lambda 1L$ is inputted as it is to the first optical amplifier 31a through the optical coupler 50 (not shown). A level of $\lambda 2PL$ is adjusted by the variable attenuator 38b. $\lambda 2PL$ is then multiplexed with the above $\lambda 1L$ by the optical coupler 50, inputted to the first optical amplifier 31a, then optically amplified with residual pumping light $\lambda 2PL$, a level of which has been adjusted, from the third pumping source 31b. The resulting optical signal ($\lambda 1L'+\lambda 2PL'$) is transmitted to the isolator 31c, and sent to the second repeating station 30c'.

Inputted light ($\lambda 1R'+\lambda 3PR'$) from the second repeating station 30c' is repeater-amplified, and an optical signal ($\lambda 1R''+\lambda 3PR''$) is transmitted to the transmitting station 20c.

Similarly, internal processing in the second repeating station 30c' is as follows. Namely, transmission light ($\lambda 1L'+\lambda 2PL'$) from the first repeating station 30c is inputted to the second repeating station 30c', split into two by the demultiplexer 38a, and demultiplexed into a $\lambda 1L'$ component and a $\lambda 2PL'$ component. The demultiplexed $\lambda 1L'$ is inputted as it is to the first optical amplifier 31a through the optical coupler 50. A level of $\lambda 2PL'$ is adjusted by the variable attenuator 38b. $\lambda 2PL'$ is multiplexed with $\lambda 1L'$ by the optical coupler 50, and inputted to the first optical amplifier 31a, optically amplified with residual pumping light ($\lambda 2PL'$), a level of which has been adjusted, from the third pumping source 31b by the first optical amplifier 31a. The resulting optical signal ($\lambda 1L'''+\lambda 2PL''$) is transmitted to the isolator 31c, and sent to the receiving station 40c.

Inputted light ($\lambda 1R+\lambda 3PR$) from the receiving station 40c is processed in the similar manner, and a light signal ($\lambda 1R'+\lambda 3PR'$) is transmitted to the first repeating station 30c.

With the above structure, repeating and monitoring of the optical signals are performed among the transmitting station 20c, the first repeating station 30c, the second repeating station 30c' and the receiving station 40c, optical transmission using a remote pumping control is thereby performed.

In FIG. 3, the transmission light $\lambda 1L$ from the transmitting station 20c is multiplexed with the pumping source $\lambda 2PL$, optically amplified by the optical amplifier 22b, then transmitted along with residual pumping light to the first repeating station 30c via the optical coupler 51. From the first repeating station 30c, amplified transmission light $\lambda 1L'$ and amplified pumping light $\lambda 2PL'$ are sent to the second repeating station 30c'.

In the second repeating station 30c', reception light ($\lambda 1L'+\lambda 2PL'$) from the first repeating station 30c is amplified, and amplified transmission light $\lambda 1L''$ and amplified pumping light $\lambda 2PL''$ are sent to the receiving station 40c. A flow of transmission light from the receiving station 40c to the transmitting station 20c is similar.

In each of the stations, the administrator, for example, adjusts attenuation quantities of the variable attenuators 38b and 39b on the basis of level values of the light, whereby appropriate quantities of light are outputted.

As this, communication is performed among the transmitting station 20c, the first repeating station 30c, the second repeating station 30c' and the receiving station 40c using only optical cables in one system, and the output level of the pumping source is automatically adjusted in each of the stations, which allows the optimum communication.

As this, the installation cost and maintenance cost of the optical cables are largely decreased, and the optical cables are monitored with pumping light and residual pumping light, which allows large improvement of reliability and safety of this optical system 10c.

(A2) Description of Second Modification of First Embodiment of the Invention

Further, it is possible to improve the reliability of the system by detecting disconnection of optical signals in the transmission terminal station.

Figure 5:
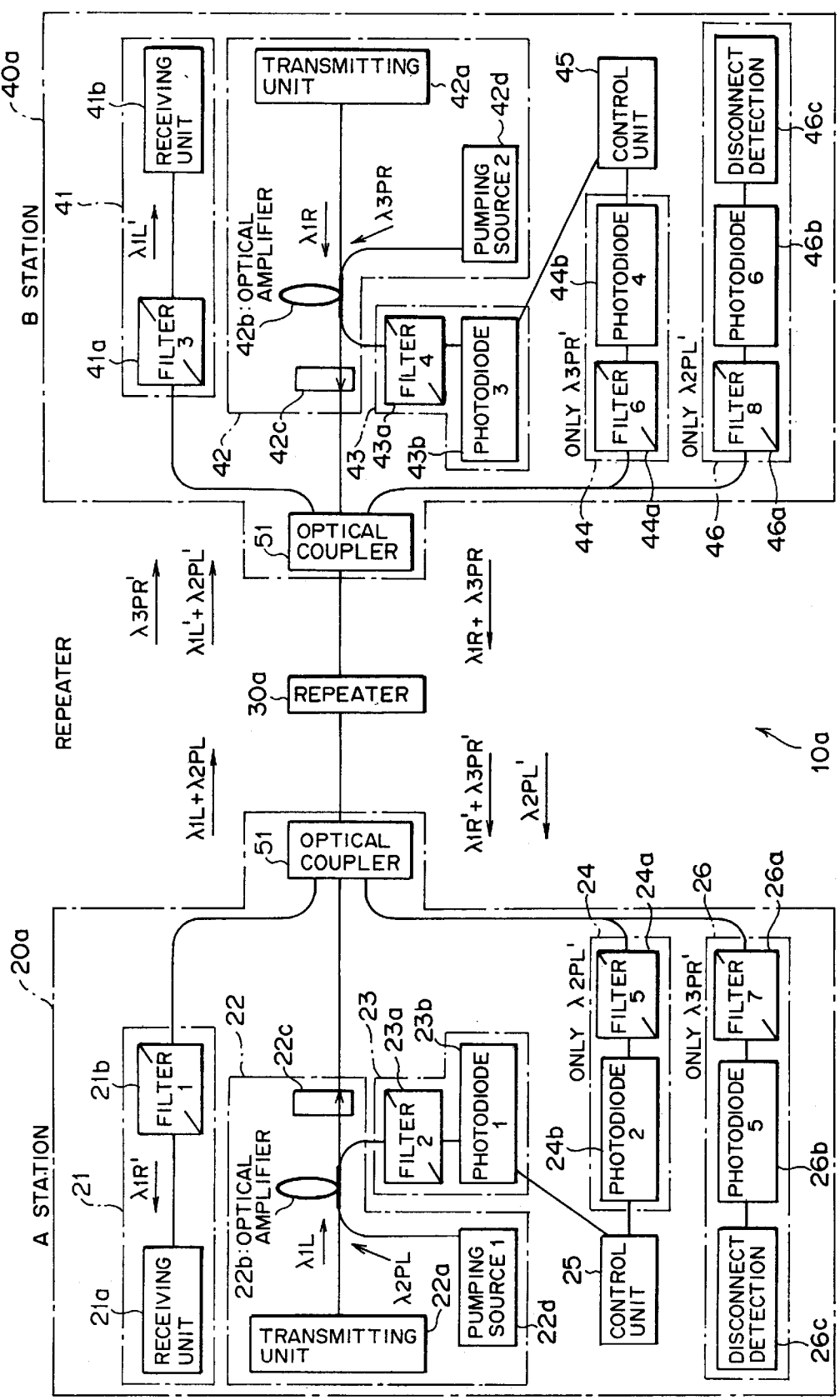
FIG. 5 is a diagram showing a structure of an optical system according to a second modification of the first embodiment of this invention.

FIG. 5 is a diagram showing a structure of an optical system according to a second modification of the first embodiment of this invention. An optical system 10a shown in FIG. 5 is a system in which transmission light, reception light and pumping light can be transmitted/received through optical fiber cables in one system. The optical system 10a comprises a transmitting station (A station) 20a, a repeating station (repeater) 30a and a receiving station (B station) 40a, where the stations are connected by optical cables, and optical signals are transmitted/received in two ways.

In FIG. 5, a wavelength of transmission light of the transmitting station 20a is $\lambda 1L$, a wavelength of a first pumping source 22d is $\lambda 2PL$, a wavelength of transmission light of the receiving station 40a is $\lambda 1R$, a wavelength of a second pumping source 42d is $\lambda 3PR$.

The transmitting station 20a comprises a disconnect detecting means 26 which detects that a fault occurs in the first optical fiber. The disconnect detecting means 26 comprises a first transmitting side filter (filter 7) 26a, a first transmitting side monitoring means (photodiode 5) 26b, and a first transmitting side disconnect detection outputting means (disconnect detection) 26c.

The first transmitting side filter 26a extracts residual pumping light ($\lambda 3PR'$) from a received optical signal, and outputs it, a function of which is realized by an optical filter. The first transmitting side monitoring means 26b detects the residual pumping light ($\lambda 3PR'$) from the first transmitting side filter 26a, a function of which is realized by a photodiode. The first transmitting side disconnect detection outputting means 26c monitors the operation of the first transmitting side monitoring means 26b, and outputs information relating to presence/absence of the residual pumping light ($\lambda 3PR'$), a function of which is realized by directly displaying it by instruments or the like.

In the transmitting station 20a, the first transmitting side filter 26a extracts the residual pumping light ($\lambda 3PR'$) from a received optical signal, the first transmitting side monitoring means 26b detects the residual pumping light ($\lambda 3PR'$) from the first transmitting side filter 26a, the first transmitting side disconnect detection outputting means 26c monitors the operation of the first transmitting side monitoring means 26b and outputs information relating to presence/absence of the residual pumping light ($\lambda 3PR'$).

The receiving station 40a comprises a disconnect detecting means 46 which detects that a fault occurs in the first optical fiber. The disconnect detecting means 46 comprises a first receiving side filter (filter 8) 46a, a first receiving side monitoring means (photodiode 6) 46b, and a first receiving side disconnect detection outputting means (disconnect detection) 46c.

The first receiving side filter 46a extracts residual pumping light (λ2PL') from a received optical signal, and outputs it, a function of which is realized by an optical filter. The first receiving side monitoring means 46b detects the residual pumping light (λ2PL') from the first receiving side filter 46a, a function of which is realized by a photodiode. The first receiving side disconnect detection outputting means 46c monitors the operation of the first receiving side monitoring means 46b, and outputs information relating to presence/absence of the residual pumping light (λ2PL'), a function of which is realized by directly displaying it by instruments or the like.

In the receiving station 40a, the first receiving side filter 46a extracts residual pumping light (λ2PL') from a received optical signal, the first receiving side monitoring means 46b detects the residual pumping light (λ2PL') from the first receiving side filter 46a, and the first receiving side disconnect detection outputting means 46c monitors the operation of the first receiving side monitoring means 46b and outputs information relating to presence/absence of the residual pumping light (λ2PL').

In FIG. 5, parts designated by like reference characters have like or corresponding functions described above, further descriptions of which are thus omitted. Hereinafter, only parts differing from those in the first embodiment will be described.

Figure 6:
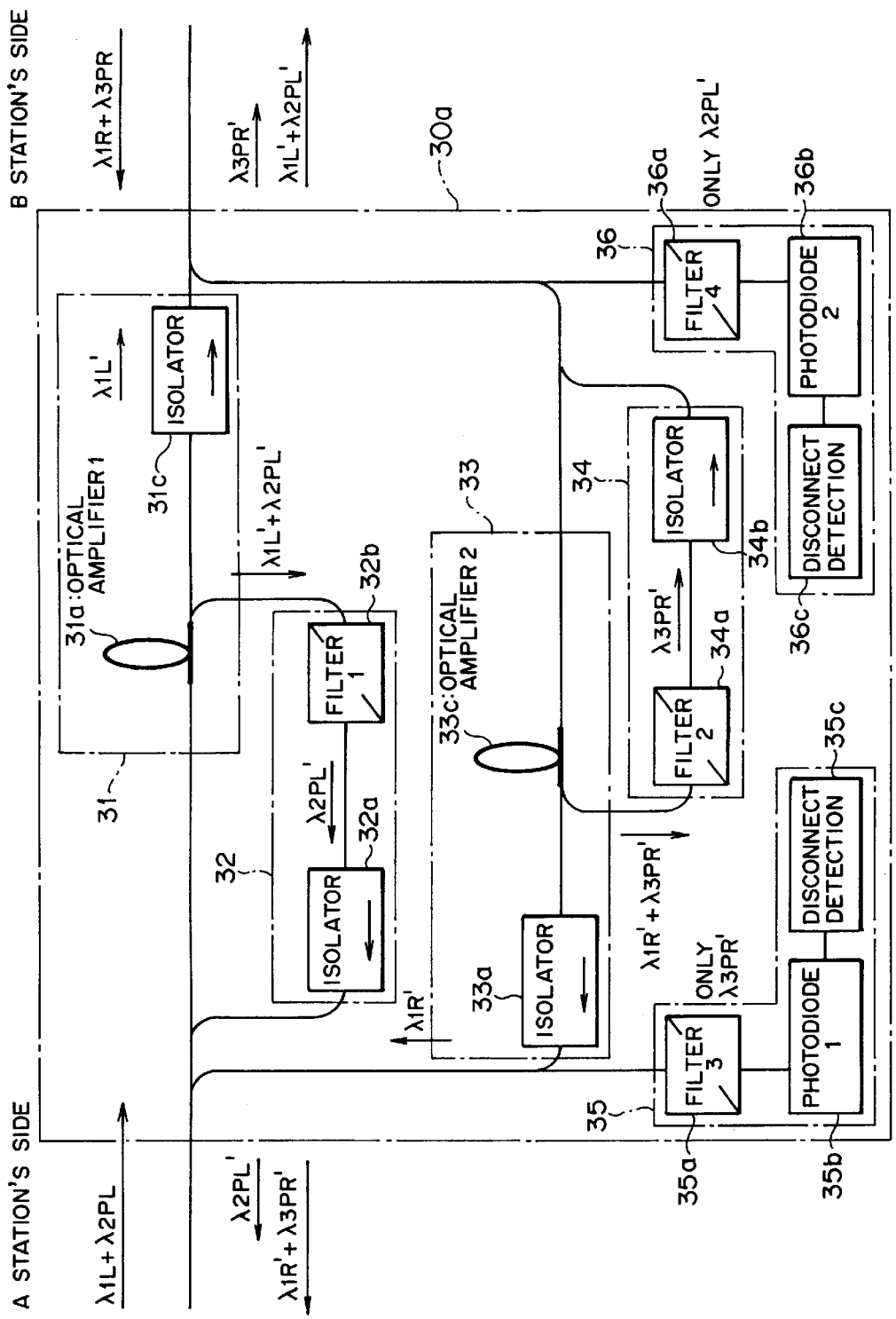
FIG. 6 is a diagram showing an internal structure of a first repeating station according to the second modification of the first embodiment of this invention.

FIG. 6 is a diagram showing an internal structure of the first repeating station according to the second modification of the first embodiment of this invention. The first repeating station 30a shown in FIG. 6 comprises a first disconnect detecting means 35 and a second disconnect detecting means 36. The first disconnect detecting means 35 is disposed at the entrance of the first optical fiber to detect cut of the first optical fiber. The first disconnect detecting means 35 comprises a third filter (filter 3) 35a, a first optical detector (photodiode 1) 35b and a first disconnect detection outputting means (disconnect detection) 35c.

The third filter 35a extracts residual pumping light (λ3PR') from a received optical signal, and outputs it. The first optical detector 35b detects the residual pumping light (λ3PR') from the third filter 35a. The first disconnect detection outputting means 35c monitors the operation of the first optical detector 35b, and outputs information relating to presence/absence of the residual pumping light (λ3PR').

The second disconnect detecting means 36 is disposed at the entrance of the second optical fiber to detect cut of the second optical fiber. The second disconnect detecting means 36 comprises a fourth filter (filter 4) 36a, a second optical detector (photodiode 2) 36b, and a second disconnect detection outputting means (disconnect detection) 36c.

The fourth filter 36a extracts residual pumping light (λ2PL') from a received optical signal, and outputs it. The second optical detector 36b detects the residual pumping light (λ2PL') from the fourth filter 36a. The second disconnect detection outputting means 36c monitors the operation of the second optical detector 36b, and outputs information relating to presence/absence of the residual pumping light (λ2PL').

With the above structure, in the normal state, the first transmitting side disconnect detection outputting means 26c keep receiving λ3PR' so that only λ3PR' can pass through the first transmitting side filter 26a in the transmitting station 20a (refer to FIG. 5).

When cut of the optical cable occurs, the optical signal is reflected by an end of the optical cable having been cut, and transmits in the opposite direction. When optical power loss (loss) is large at the end of the optical cable having been cut, returned light is not detected. This non-detection is detected by the monitoring function. When the optical power loss is small, transmission light from the transmitting station 20a is returned to the transmitting station 20a, the return is not detected, so that no alarm generates. When cut of the optical cable occurs, its input dies out. For this, when cut of the optical cable is detected by the disconnect detection, an alarm generates.

In concrete, when cut of the optical cable occurs between the repeating station 30a and the transmitting station 20a, λ1R'+λ2PL'+λ3PR' components generate in an optical signal inputted from the transmitting station 20a to the repeating station 30a. Accordingly, λ3PR' that is never inputted from the transmitting station 20a in the normal state is detected, whereby cut of the optical cable can be detected.

Similarly, in the receiving station 40a, cable cut is detected by allowing only λ2PL' to pass through the first receiving side filter 46a.

As this, communication is performed among the transmitting station 20a, the repeating station 30a and the receiving station 40a using only the optical cables in one system, and the output level of the pumping source is automatically controlled in each of the stations, which allows the optimum communication.

The installation cost and maintenance cost of the optical cables are largely decreased, and the reliability and safety of this optical system 10a are remarkably improved since each of the stations can detect cut of the optical cable.

(A3) Description of Third Modification of First Embodiment of the Invention

Figure 7:
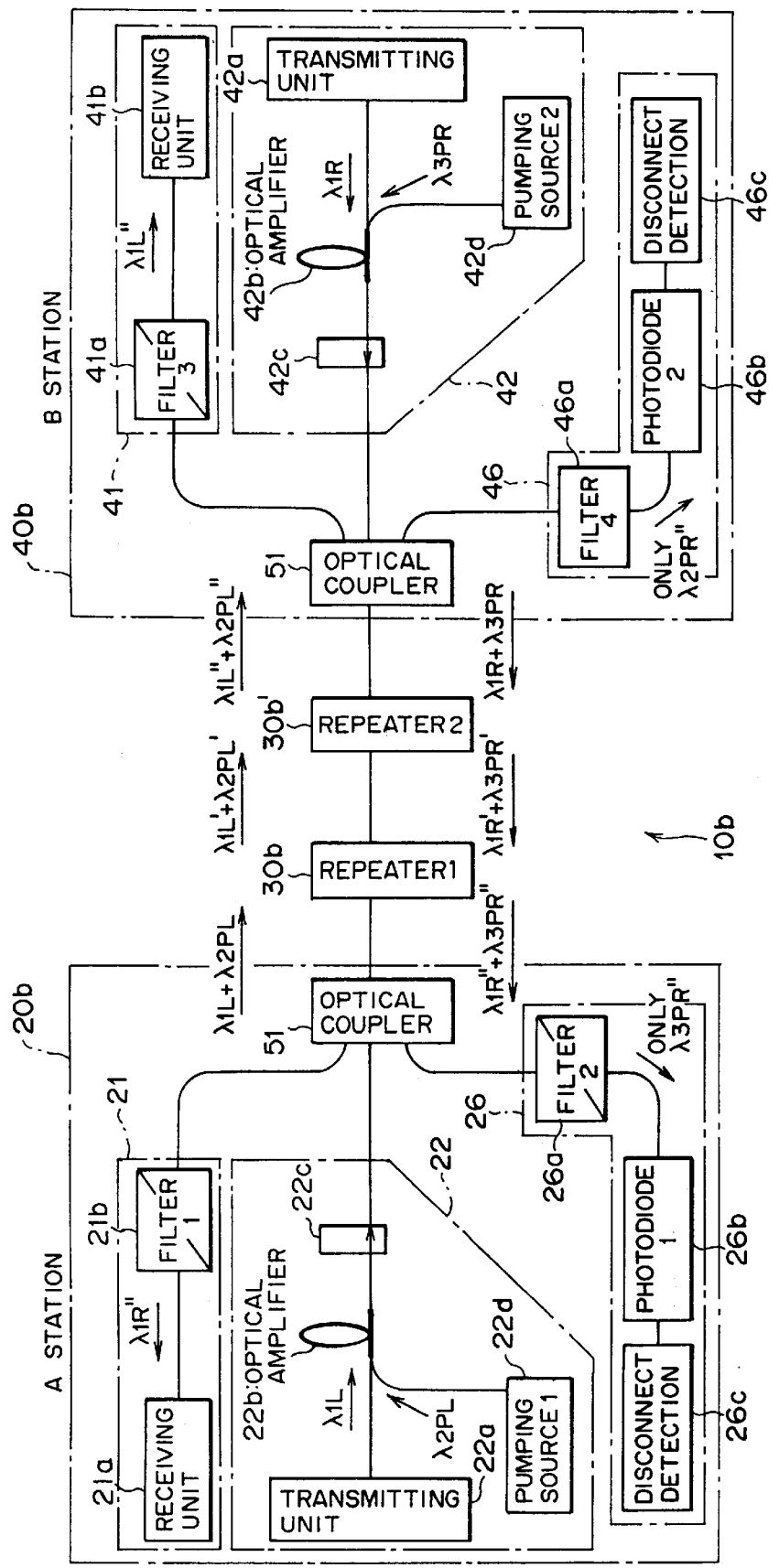
FIG. 7 is a diagram showing a structure of an optical system according to a third modification of the first embodiment of this invention.

Disconnect detection in the case where a plurality (not less than three) of repeating stations are connected is performed in the similar manner. FIG. 7 is a diagram showing a structure of an optical system according to a third modification of the first embodiment of this invention. An optical system 10b shown in FIG. 7 is a system in which transmission light, reception light and pumping light can be transmitted/received through optical fibers in one system. The optical system 10b comprises a transmitting station (A station) 20b, a first repeating station (repeater 1) 30b, a second repeating station (repeater 2) 30b' and a receiving station (B station) 40b, where the stations are connected by optical cables to transmit/receive optical signals in two ways.

The transmitting station 20b is a transmission terminal station transmitting/receiving optical signals, which comprises an optical receiving means 21, an optical transmitting means 22, a disconnect detecting means 26 and an optical coupler 51. The receiving station 40b is a transmission terminal station transmitting/receiving optical signals, which comprises an optical receiving means 41, an optical transmitting means 42, a disconnect detecting means 46 and an optical coupler 51. These have like or corresponding functions to those described above, further descriptions of which are thus omitted.

In FIG. 7, a wavelength of transmission light of the transmitting station 20b is λ1L, a wavelength of a first pumping source 22d is λ2PL, a wavelength of transmission light of the receiving station 40b is λ1R, and a wavelength of a second pumping source 42d is λ3PR. Transmission light λ1L from the transmitting station 20 is multiplexed with the pumping source λ2PL by an optical coupler 50, optically amplified by a first optical amplifier 31a, then transmitted along with residual pumping light to the repeating station 30 via the optical coupler 51.

Transmission of an optical signal from the transmitting station 20b to the receiving station 40b is as follows.

Namely, transmission light ($\lambda 1L+\lambda 2PL$) from the transmitting station 20b is inputted to the first repeating station 30b, and optically amplified in the first repeating station 30b. An optical signal ($\lambda 1L'+\lambda 2PL'$) is sent to the second repeating station 30b', and again optically amplified in the second repeating station 30b'. An optical signal ($\lambda 1L''+\lambda 2PL''$) is then sent to the receiving station 40b.

On the other hand, transmission of an optical signal from the receiving station 40b to the transmitting station 20b is as follows. Namely, transmission light ($\lambda 1R+\lambda 3PR$) from the receiving station 40b is inputted to the second repeating station 30b', and optically amplified in the second repeating station 30b'. An optical signal ($\lambda 1R'+\lambda 3PR'$) is then sent to the first repeating station 30b, and again optically amplified in the first repeating station 30b. An optical signal ($\lambda 1R''+\lambda 3PR''$) is sent to the transmitting station 20b.

Figure 8:
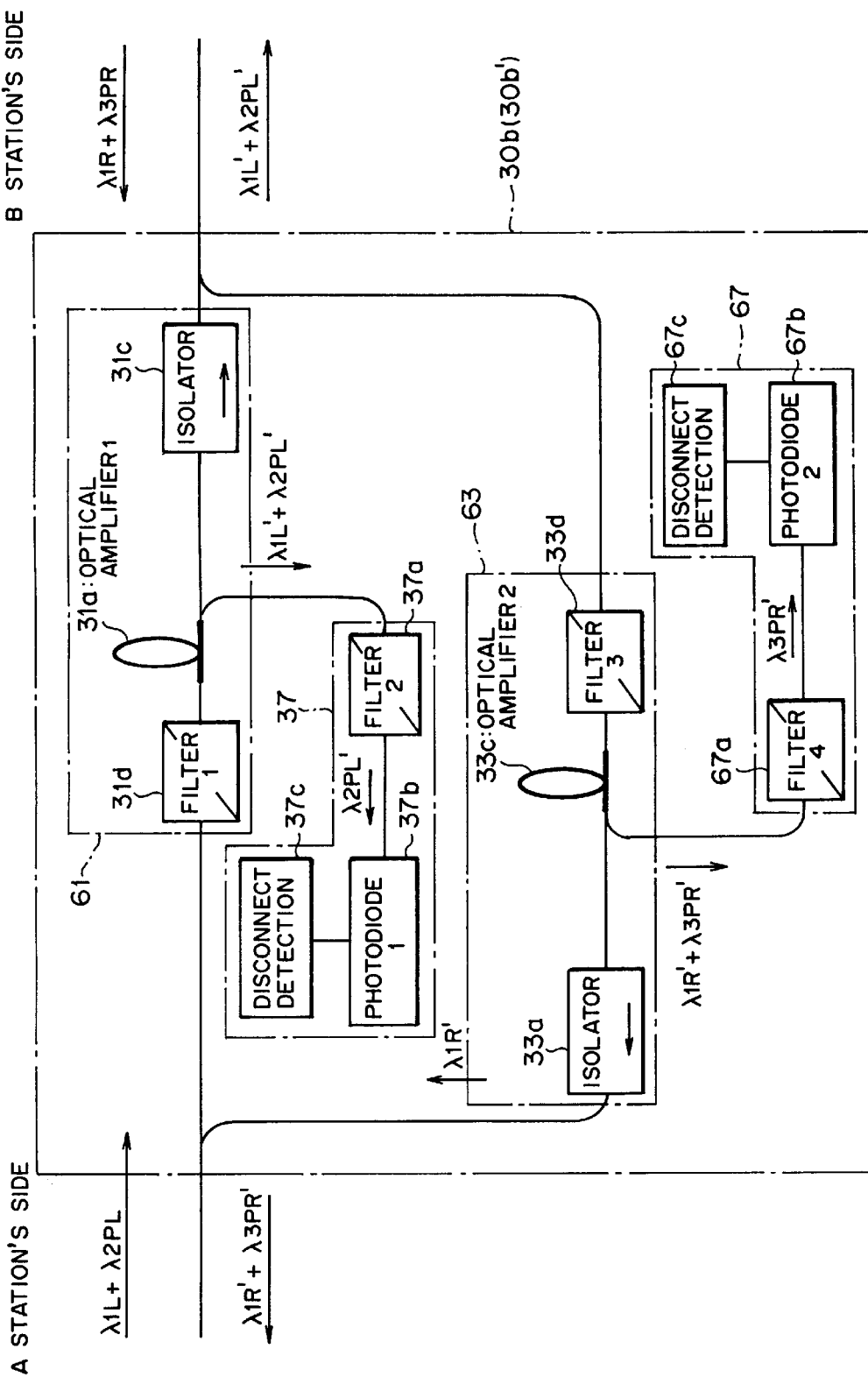
FIG. 8 is a diagram showing a structure of a first repeating station according to the third modification of the first embodiment of this invention.

FIG. 8 is a diagram showing a structure of the first repeating station 30b according to the third modification of the first embodiment of this invention. The first repeating station 30b shown in FIG. 8 comprises a first optical transmitting means 61, a first disconnect detecting means 37, a second optical transmitting means 63 and a second disconnect detecting means 67.

The first optical transmitting means 61 receives the first transmission light ($\lambda 1L$) and the first pumping light ($\lambda 2PL$) transmitted from the transmitting station 20b through the first optical fiber, amplifies the first transmission light ($\lambda 1L$) and the first pumping light ($\lambda 2PL$), and outputs second transmission light ($\lambda 1L'$) and second pumping light ($\lambda 2PL'$). The first optical transmitting means 61 comprises a first optical amplifier 31a, a first filter (filter 1) 31d, and an isolator 31c. Unlike the above first optical transmitting means 31, the first optical transmitting means 61 has the first filter 31d at the input of the first optical amplifier 31a. The first filter 31d extracts ($\lambda 1L+\lambda 2PL'$) components from a received optical signal, and outputs them.

The first disconnect detecting means 37 monitors an output from the first optical amplifier 31a, and outputs information relating to presence/absence of ($\lambda 1L'+\lambda 2PL'$) components in the transmission light. The first disconnect detecting means 37 comprises a second filter (filter 2) 37a extracting $\lambda 2PL'$, a first optical detector (photodiode 1) 37b detecting a level of outputted light from the second filter 37a, and a first disconnect detection outputting means (disconnect detection) 37c. Unlike the above first disconnect detecting means 35, the first disconnect detecting means 37 is directly connected to the output of the first optical amplifier 31a.

Similarly, the second optical transmitting means 63 receives third transmission light ($\lambda 1R'$) and residual pumping light ($\lambda 3PR'$) transmitted from the second repeating station 30b', amplifies the third transmission light ($\lambda 1R'$) and the residual pumping light ($\lambda 3PR'$), and outputs transmission light ($\lambda 1R''+\lambda 3PR''$). The second optical transmitting means 63 comprises a second optical amplifier 33c, a third filter (filter 3) 33d, and an isolator 33a. Unlike the above second optical transmitting means 33, the second optical transmitting means 63 has the third filter 33d at the input of the second optical amplifier 33c. The third filter 33d extracts transmission light components ($\lambda 1R'+\lambda 3PR'$) from a receiving optical signal, and outputs them.

The second disconnect detecting means 67 monitors an output of the second optical amplifier 33c, and outputs information relating to presence/absence of the transmission light components ($\lambda 1R'+\lambda 3PR'$). The second disconnect detecting means 67 comprises a fourth filter (filter 4) 67a extracting $\lambda 3PR'$, a second optical detector (photodiode 2) 67b detecting a level of outputted light from the fourth filter 67a, and a second disconnect detection outputting means (disconnect detection) 67c. Unlike the above second disconnect detecting means 35, the second disconnect detecting means 67 is directly connected to the output of the second optical amplifier 33c.

Meanwhile, parts designated by like reference characters have like or corresponding functions described above, further descriptions of which are thus omitted.

With this structure, disconnect detection is performed. In the ($\lambda 1L+\lambda 2PL$) components inputted to the first repeating station 30b, only ($\lambda 1L+\lambda 2PL$) components are inputted to the first optical amplifier 31a, and optically amplified. ($\lambda 1L'+\lambda 2PL'$) components optically amplified with residual pumping light (not shown) are transmitted to the second repeating station 30b' (refer to FIG. 7) via the isolator 31c.

Only a $\lambda 2PL'$ component in the ($\lambda 1L'+\lambda 2PL'$) components is left by the second filter 37a, optical detection is performed in the first optical detector 37b, and the $\lambda 2PL'$ component is detected by the first disconnect detecting means 37c.

Flow of an optical signal from the second repeating station 30b' is similar.

When cut of the optical cable occurs between the transmitting station 20b and the first repeating station 30b, inputs of $\lambda 2PL'$ to the first optical detector 37b die out, thus an alarm generates. When cut of the optical cable occurs between the first repeating station 30b and the second repeating station 30b', inputs of the $\lambda 3PR'$ component to the second optical detector 67b die out, thus an alarm generates.

The first optical detector 37b and the second optical detector 67b keep detecting pumping light of the opposite stations at any time. When any part of the optical cable is cut between the transmitting station 20b and the receiving station 40b, pumping light of the opposite station comes not to be received. When the inputs die out, an alarm generates, the cut is thereby detected.

As this, communication is performed among the stations using only the optical cables in one system, and the output level of the pumping source is automatically controlled in each of the stations, which allows the optimum communication.

As this, the installation cost and maintenance cost of the optical cables are largely decreased, and reliability and safety of this optical system 10b are remarkably improved since each of the stations can detect cut of the optical cable.

(A4) Description of Fourth Modification of First Embodiment of the Invention

Figure 9:
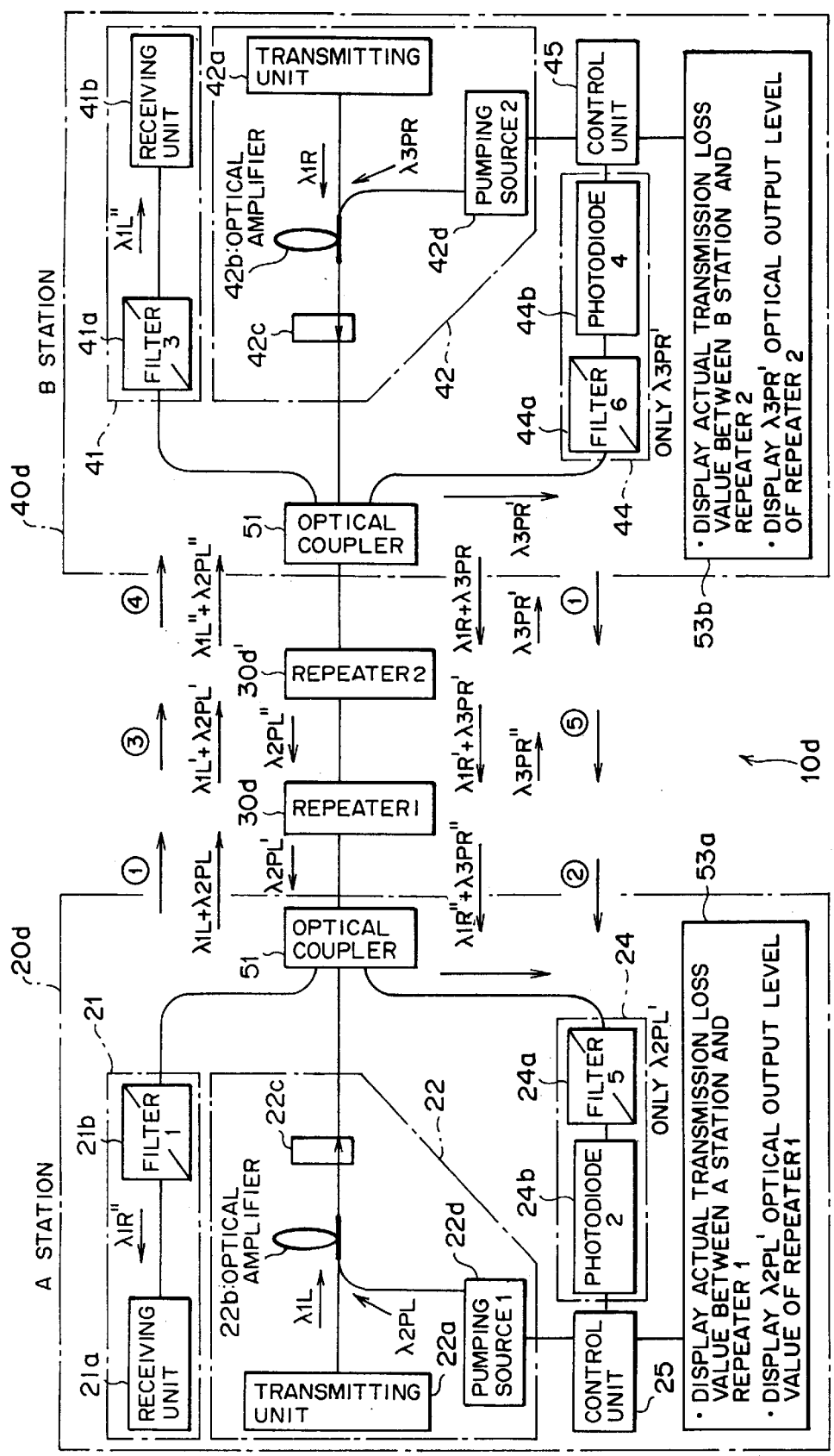
FIG. 9 is a diagram showing a structure of an optical system according to a fourth modification of the first embodiment of this invention.

A mode of transmission among a plurality of repeating stations is possible in this modification, as well. FIG. 9 is a diagram showing a structure of an optical system according to a fourth modification of the first embodiment of this invention. When an optical system 10d shown in FIG. 9 is compared with the above optical system 10a shown in FIG. 5, a transmitting station 20d has neither the level monitoring means 23 nor the disconnect detecting means 26 of the transmitting station 20a (refer to FIG. 5), but has a displaying unit 53a. A receiving station 40d has neither the level monitoring means 43 nor the cut means 46 of the receiving station 40a (refer to FIG. 5), but has a displaying unit 53b. These displaying units 53a and 53b are connected to controlling means 25 and 45, respectively, to display desired values. A function of each of these displaying unit 53a and 53b is realized by a display apparatus, for example. Parts designated by like reference character have like or corresponding functions described above, further descriptions of which are thus omitted.

First, an operation of the controlling means 25 in the transmitting station 20d is described. The controlling operation is as in (p1) to (p5) below.

(p1) The controlling means 25 calculates a λ2PL level outputted from the transmitting station 20d, and stores it.

(p2) A λ2PL' level of looped back light from a first repeating station 30d is monitored by a second optical detector (photodiode 2) 24b.

(p3) An actual transmission loss between the transmitting station 20d and the first repeating station 30d is calculated and stored, and this result is displayed by the displaying unit 53a.

(p4) An optical output level of λ2PL' at the first repeating station 30d is calculated, and displayed.

(p5) Gain control is performed on a first pumping source 22d so that the optimum optical level is inputted to the first repeating station 30d.

A calculating method for this is as follows. Namely, an actual transmission loss (dB) between the transmitting station 20d and the first repeating station 30d is determined from the equation (1):

$$L = (O + A - I)/2 \quad (1)$$

Where, O (ou) is a λ2PL optical output level (dBm), I (ai) is a monitor light optical level (dBm) at the second optical detector 22d, AIN is a λ2PL optical input level (dBm) inputted to a first optical amplifier 31a (refer to FIG. 10 to be described later) of the first repeating station 30d, and A is an optical amplification factor (dB) to the optical input level. Here, dBm is a power ratio to one milliwatt.

When a relationship of O−L=AIN is substituted into the equation (1), a relational equation between A and AIN becomes equation (2):

$$O + I = A + 2AIN \quad (2)$$

A relationship between A and AIN is uniquely determined on the basis of characteristics of the first optical amplifier 31a. For this, once O and I can be obtained by turning its characteristics into a database and preparing it by the transmitting station 20d, it is possible to determine values of A and AIN, thus L can be calculated. Incidentally, the relationship between A and AIN is an input-output relationship of the first optical amplifier 31a, so that the optical amplification factor AIN at that time can be determined once the input level is known. From a result of this calculation, it is possible to calculate an actual transmission loss L (dB), and a λ2PL' optical level value=AIN+A (dBm).

Next, an operation of a controlling means 45 in the receiving station 40d is as in (p6) to (p10) below:

(p6) The controlling means 45 calculates a λ3PR optical output level outputted from the optical amplifier 42b, and stores it.

(p7) Returned light λ3PR' from the second repeating station 30d' is monitored by a fourth optical detector (photodiode 4) 44b.

(p8) An actual transmission loss between the receiving station 40d and a second repeating station 30d' is calculated and stored, then a result of this is displayed.

(p9) An optical output level of λ3PR' at the second repeating station 30d' is calculated, and displayed.

(p10) Gain control is performed on a second pumping source 42d so that the optimum optical level is inputted to the second repeating station 30d'.

Figure 10:
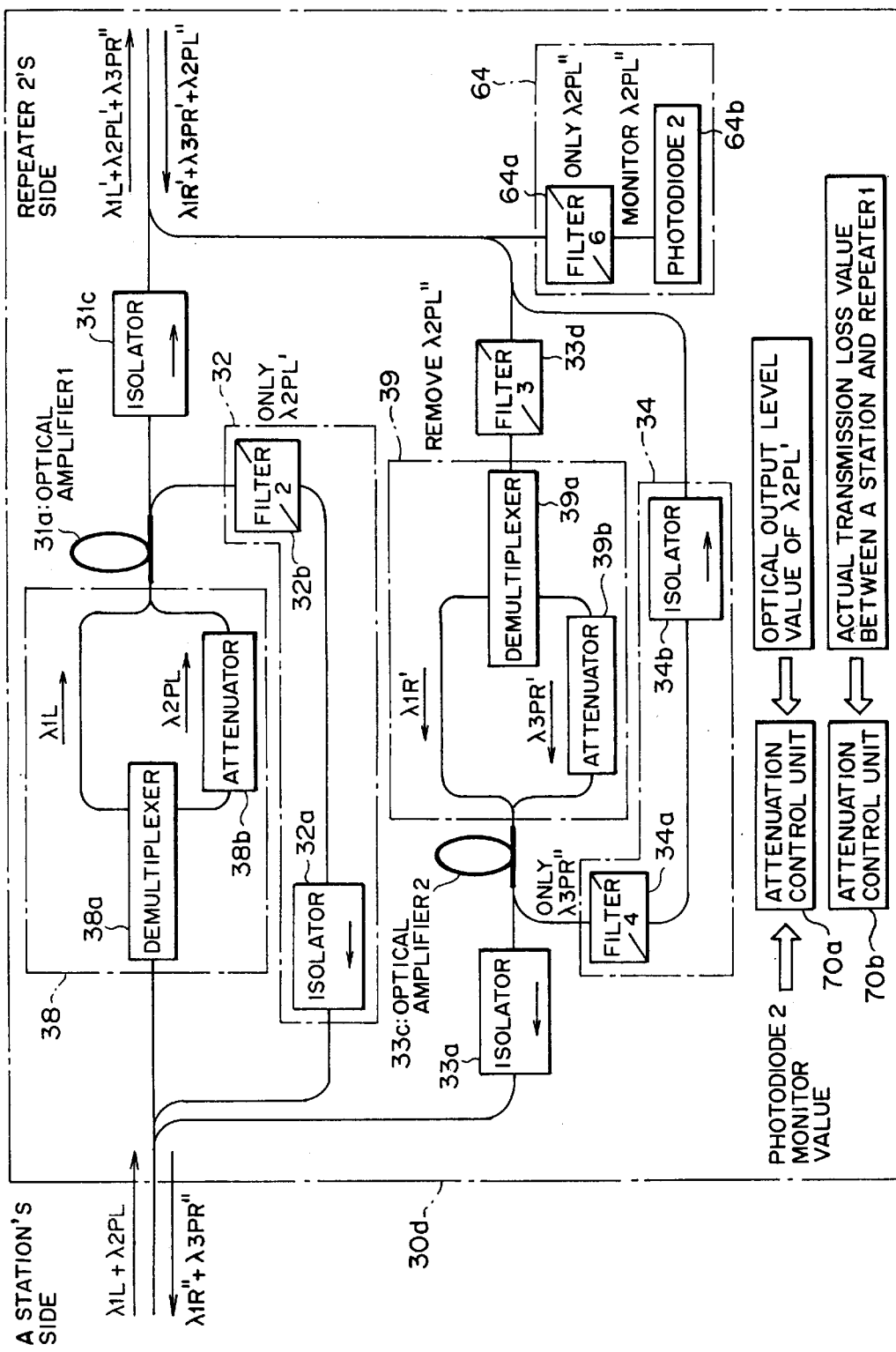
FIG. 10 is a diagram showing an internal structure of a first repeating station according to the fourth modification of the first embodiment of this invention.

A calculating method for this is similar to that in the description of the controlling means 25 of the transmitting station 20d. A control in the first repeating station 30d will be next described with reference to FIG. 10. FIG. 10 is a diagram showing an internal structure of the first repeating station 30d according to the fourth modification of the first embodiment of this invention. The first repeating station 30d shown in FIG. 10 comprises a second disconnect detecting means 64 and attenuation control units 70a and 70a'.

The second disconnect detecting means 64 is disposed at an entrance of a second optical fiber in order to detect a level of a transmission optical signal, thereby detecting cut of the second optical fiber. The second disconnect detecting means 64 comprises a sixth filter (filter 6) 64a, and a second optical detector (photodiode 2) 64b. Incidentally, the second disconnect detecting means 64 is similar to the second disconnect detecting means 36 (refer to FIG. 6), but does not detect cut.

The sixth filter 64a is similar to the fourth filter 36a (refer to FIG. 6), which extracts residual pumping light (λ2PL") from a transmission optical signal, and outputs it. The second optical detector 64b is similar to the second optical detector 36b (refer to FIG. 6), which detects a level of the residual pumping light (λ2PL") outputted from the sixth filter 64a.

The attenuation control units 70a and 70a' control variable attenuators (attenuators) 38b and 39b, respectively. The attenuation control unit 70a controls an attenuation quantity of the first pumping light adjusting means on the basis of a difference between a level detected by the second optical detector 64b and a level prepared beforehand.

At an entrance of the optical coupler 39a disposed is a third filter (filter 3) 33d. The third filter 33d removes a residual pumping light component (λ2PL") from a received optical signal. The others designated by like reference characters have like or corresponding functions described above, further descriptions of which are thus omitted.

In the first repeating station 30d, a control as follows is performed. When transmission light (λ1L+λ2PL) from the transmitting station 20d is inputted to the first repeating station 30d, the transmission light is split into λ1L and λ2PL by a demultiplexer 38a. The split λ1L is outputted as it is. A level of the split λ2PL is adjusted by the variable attenuator (attenuator) 38b. The λ1L and attenuated λ2PL are multiplexed by an optical coupler 50 (not shown), inputted to the first optical amplifier 31a, and optically amplified with residual pumping light (not shown) by the first optical amplifier 31a. The optically amplified optical signal (λ1L'+λ2PL') is branched toward a first loopback filter 32b and an isolator 31c.

Light outputted from the isolator 31c is sent as it is to the second repeating station 30d'. Only λ2PL' of the other light is extracted by the first loopback filter 32b, and this component is sent back to the transmitting station 20d.

Inputted light (λ1R'+λ3PR'+λ2PL") from the second repeating station 30d' is inputted to a third filter 33d and the sixth filter 64a. After a λ2PL" component is removed by the third filter 33d, the inputted light is split into λ1R' and λ3PR' by a demultiplexer 39a. The split λ1R' is outputted as it is, whereas a level of the split λ3PR' is adjusted by the variable attenuator (attenuator) 39b, then they are multiplexed by an optical coupler 50 (not shown), and inputted to a second optical amplifier 33c. The light is optically amplified with residual pumping light (not shown) by the second optical amplifier 33c. The amplified optical signal (λ1R"+λ3PR") is branched toward an isolator 33a and a second loopback filter 34a (filter 4).

The light outputted from the isolator 33a is sent as it is to the transmitting station 20d. Only a λ3PR" component of the other light is extracted by the second loopback filter 34a, and this component is sent back to the second repeating station 30d'.

Only the λ2PL component of the inputted light from the second repeating station 30d' is extracted by the sixth filter (filter 6) 64a, and a reception level of this component is monitored by the second optical detector (photodiode 2) 64b.

Figure 11:
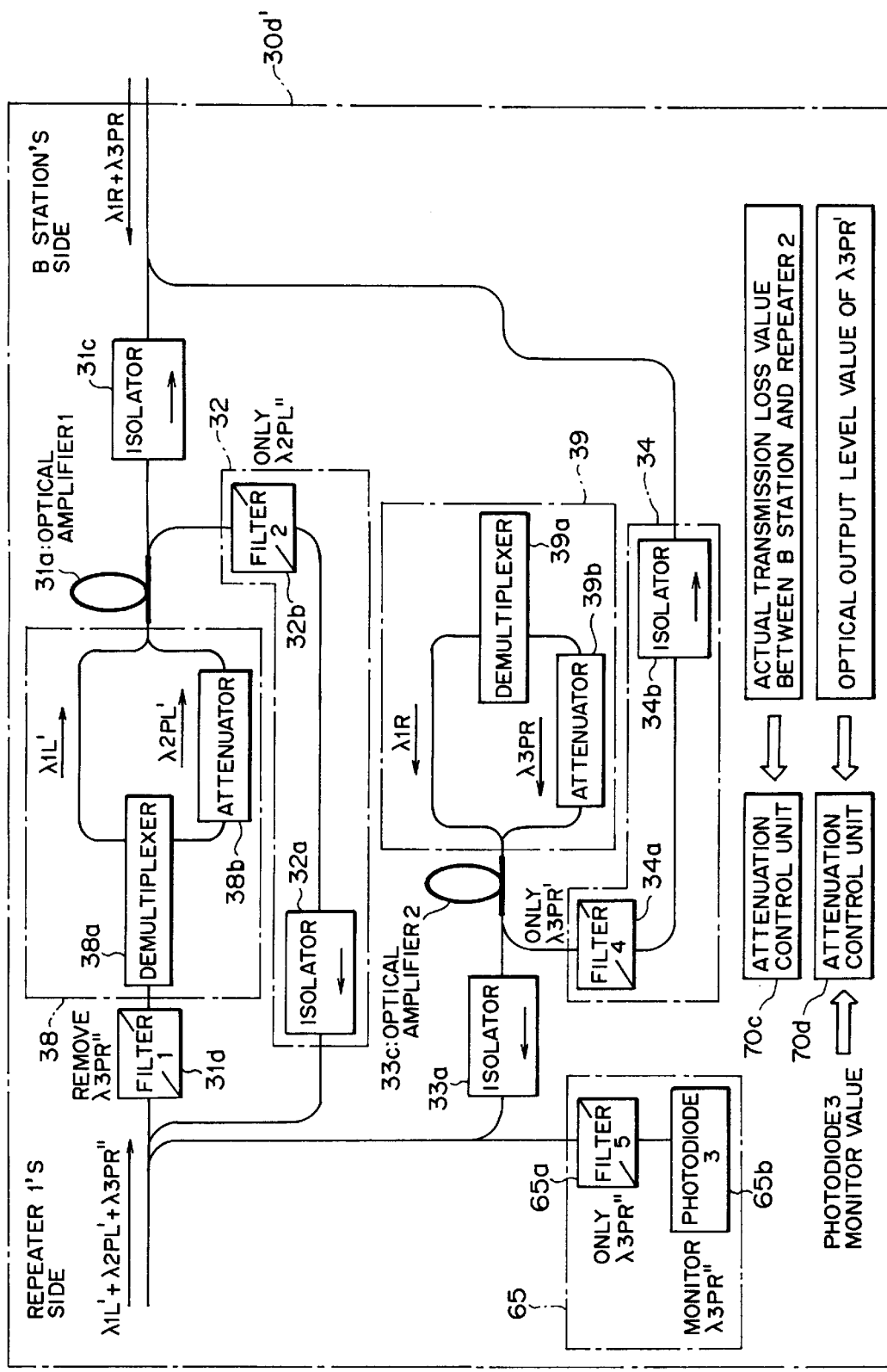
FIG. 11 is a diagram showing an internal structure of a second repeating station according to the fourth modification of the first embodiment of this invention.

Next, a control in the second repeating station 30d' will be described with reference to FIG. 11. FIG. 11 is a diagram showing an internal structure of the second repeating station 30d' according to the fourth modification of the first embodiment of this invention. Like the second disconnect detecting means 64 in the first repeating station 30d, the second repeating station 30d' shown in FIG. 11 comprises a second disconnect detecting means 65, and attenuation control units 70c and 70d.

The second disconnect detecting means 65 is disposed at the entrance of the first optical fiber in order to detect a level of a transmitted optical signal, thereby detecting cut of the second optical fiber. The second disconnect detecting means 65 comprises a fifth filter (filter 5) 65a extracting residual pumping light ($\lambda$3PR") from a transmitted optical signal and outputting it, and a third optical detector (photodiode 3) 65a detecting a level of the residual pumping light ($\lambda$3PR") outputted from the fifth filter 65a.

The attenuation control units 70c and 70d control the variable attenuators (attenuators) 38b and 39b, respectively, whereby an attenuation quantity of the second pumping light adjusting means is controlled on the basis of a difference between a level detected by the third optical detector 65b and a level beforehand prepared.

At an entrance of the demultiplexer 38a disposed is a first filter (filter 1) 31d. The first filter 31d removes a residual pumping light component ($\lambda$3PR") from the received optical signal.

Accordingly, a first optical transmitting means 31 (refer to FIG. 2) is provided with the first filter 31d which is disposed at the input's side of the first optical amplifier 31a to remove the residual pumping light component ($\lambda$3PR") from a received optical signal. The Others designated by like reference characters have like or corresponding functions described above, further descriptions of which are thus omitted.

In the second repeating station 30d' a control as follows is performed. Transmission light ($\lambda$1L' +$\lambda$2PL'+$\lambda$3PL") from the first repeating station 30d is inputted to the second repeating station 30d', and branched toward the first filter 31d and the fifth filter 65a. The $\lambda$1L' component and the $\lambda$2PL' component of the inputted light are extracted by the first filter 31d, and split into $\lambda$1L' and $\lambda$2PL' by the demultiplexer 38a.

The splits $\lambda$1L' is outputted as it is. A level of the other split $\lambda$2PL' is adjusted by the variable attenuator 38b, multiplexed by an optical coupler 50 (not shown), inputted to the first optical amplifier 31a, then optically amplified with residual pumping light (not shown) by the first optical amplifier 31a. The optically amplified optical signal ($\lambda$1L"+$\lambda$2PL") is branched toward the isolator 31c and the first loopback filter 32b.

The light outputted from the isolator 31c is sent as it is to the receiving station 40d. The $\lambda$2PL" component of the other light is extracted by the first loopback filter 32b, and this component is send back to the first repeating station 30d.

Only the $\lambda$3PR" component of the inputted light is extracted by the fifth filter 65a, and the reception level is monitored by the third optical detector 65b.

The opposite direction is similar. Namely, inputted light ($\lambda$1R+$\lambda$3PR) from the receiving station 40d is split into $\lambda$1R and $\lambda$3PR by the demultiplexer 39a. The split $\lambda$1R is inputted as it is to the second optical amplifier 33c. A level of the split $\lambda$3PR is adjusted by the variable attenuator (attenuator) 39b, multiplexed by an optical coupler 50 (not shown), then inputted to the second optical amplifier 33c.

$\lambda$3PR is optically amplified with residual pumping light (not shown) by the second optical amplifier 33c, and the optically amplified optical signal ($\lambda$1R'+$\lambda$3PR') is branched toward the isolator 33a and the second loopback filter 34a. The light outputted from the isolator 33a is sent as it is to the first repeating station 30d. Only the $\lambda$3PR' component of the other light is extracted by the second loopback filter 34a, and this component is sent back to the receiving station 40d.

With the above structure, repeater transmission is performed. An operation of the first repeating station 30d (refer to FIG. 10) is as follows.

First, an actual transmission loss value (value displayed on the display unit 53a in the transmitting station 20d) between the transmitting station 20d and the first repeating station 30d, and an optical output level value of $\lambda$2PL' to be sent to the second repeating station 30d' are sent to the attenuation control unit (ATT1 control unit) 70a in the first repeating station 30d from the transmitting station 20d. Incidentally, this actual transmission loss value is expressed as photodiode 2 monitor value in FIG. 10.

Next, the attenuation control unit 70a controls an optical attenuation quantity at the variable attenuator 39b on the basis of the actual transmission loss value between the transmitting station 20d and the first repeating station 30d so that $\lambda$1R" at the optimum level is inputted to the transmitting station 20d.

The attenuation control unit 70a' calculates an actual transmission loss value between the first repeating station 30d and the second repeating station 30d' on the basis of a difference between an optical output level value of $\lambda$2PL' to be sent to the second repeating station 30d' and returned light $\lambda$2PL" (monitor value at the second optical detector 64b) from the second repeating station 30d', and controls an optical attenuation quantity at the variable attenuator 38b so that $\lambda$1PL' at the optimum level is inputted to the second repeating station 30d '.

Similarly, an operation of the second repeating station 30d' (refer to FIG. 11) is as follows. First, an actual transmission loss value (value displayed on the display unit 53b in the receiving station 40d) between the receiving station 40 and the second repeating station 30d', and an optical output level value of $\lambda$3PR' to be sent to the receiving station 40d are transmitted to the attenuation control unit 70c.

The attenuation control unit 70c controls an optical attenuation quantity at the variable attenuator 38b on the basis of the actual transmission loss value between the receiving station 40d and the second repeating station 30d' so that $\lambda$1L" at the optimum level is inputted to the receiving station 40d.

The attenuation control unit 70d calculates an actual transmission loss value between the second repeating station 30d' and the first repeating station 30d on the basis of returned light $\lambda$3PR" (monitor value at the fifth filter 65a) from the first repeating station 30d and an optical output level value of $\lambda$3PR', and controls an optical attenuation quantity at the variable attenuator 39b so that $\lambda$1R' at the optimum level is inputted to the first repeating station 30d.

In the transmitting station 20d shown in FIG. 9, the transmission light $\lambda$1L is multiplexed with $\lambda$2PL from the first pumping source 22d, optically amplified by the optical amplifier 22b, then transmitted along with residual pumping light to the first repeating station 30d via an optical coupler 51.

The first repeating station 30d sends the amplified transmission light $\lambda$1L' and the amplified pumping light $\lambda$2PL' to the second repeating station 30d', and sends back the amplified pumping light λ2PL' to the transmitting station 20d.

The second repeating station 30d' sends amplified transmission light λ1L" and amplified pumping light λ2PL" to the receiving station 40d, and sends back the amplified pumping light λ2PL" to the first repeating station 30d.

The opposite direction is similar. The second repeating station 30d' amplifies transmission light (λ1R+λ3PR) from the receiving station 40d, and outputs transmission light (λ1R'+λ3PR') to the first repeating station 30d. The second repeating station 30d' also sends back amplified pumping light λ3PR' to the receiving station 40d.

The first repeating station 30d amplifies the transmission light (λ1R'+λ3PR'), and outputs transmission light (λ1R"+λ3PR") to transmitting station 20d, and sends back amplified pumping light λ3PR" to the second repeating station 30d'.

A gain controlling method in each of sections denoted by ① through ⑤ in FIG. 9 will be next described. The controls in the sections ① through ⑤ are as follows:

①: Optical output level control between the transmitting station 20d and the first repeating station 30d; optical output level control between the receiving station 40 and the second repeating station 30d';

②: Optical output level control between the first repeating station 30d and the transmitting station 20d;

③: Optical output level control between the first repeating station 30d and the second repeating station 30d';

④: Optical output level control between the second repeating station 30d' and the receiving station 40;

⑤: Optical output level control between the second repeating station 30d' and the first repeating station 30d.

(i) With Respect to ①

The controlling means 25 in the transmitting station 20d calculates an optical output level of λ2PL and stores it, and is inputted thereto a level (value monitored by the second optical detector 24b) of returned light λ2PL' from the first repeating station 30d. The controlling means 25 calculates an actual transmission loss in ① from the above result, and stores it. The displaying unit 53a displays this result, while calculating an optical output level of λ2PL' at the first repeating station 30d using the relationship between an optical level AIN inputted to the first optical amplifier 31a and an optical amplification factor A, and displaying it.

The calculation is performed as shown by the above equations (1) and (2). The control unit 25 in the transmitting station 20d controls on the basis of an actual transmission loss obtained through this calculation so that λ1L at the optimum level is inputted to the first repeating station 30d. Incidentally, an operation of the control unit 45 in the receiving station 40d is similar.

(ii) With Respect to ②

The actual transmission loss value between the transmitting station 20d and the first repeating station 30d and the optical output level value of λ2PL' displayed on the controlling means 25 in the transmitting station 20d are inputted to both of the attenuation control unit 70a and the attenuation control unit 70a' in the first repeating station 30d. The attenuation control unit 70a controls on the basis of the inputted actual transmission loss value between the transmitting station 20d and the first repeating station 30d so that λ1R" at the optimum level is inputted to the transmitting station 20d.

(iii) With Respect to ③

The attenuation control unit 70a in the first repeating station 30d calculates an actual transmission loss value between the first repeating station 30d and the second repeating station 30d' on the basis of the optical output level of the inputted λ2PL' and a monitor value at the second optical detector 64b in the first repeating station 30d, and controls so that λ1L' at the optimum level is inputted to the second repeating station 30d'.

(iv) With Respect to ④

The actual transmission loss value between the receiving station 40d and the second repeating station 30d' and the optical output level value of λ3PR' displayed on the controlling means 45 in the receiving station 40d are inputted to both of the attenuation control unit 70c and the attenuation control unit 70d in the second repeating station 30d'. The attenuation control unit 70c controls on the basis of the inputted actual transmission value between the receiving station 40d and the second repeating station 30d' so that λ1L" at the optimum level is inputted to the receiving station 40d.

(v) With Respect to ⑤

The attenuation control unit 70d in the second repeating station 30d' calculates an actual transmission loss value between the second repeating station 30d' and the first repeating station 30d on the basis of an optical output level value of the inputted λ3PR' and a monitor value at the third optical detector 65b in the second repeating station 30d', and controls so that λ1R' at the optimum level is inputted to the first repeating station 30d.

As this, communication is performed among the stations using only the optical cables in one system, and the output level of the pumping source is automatically controlled in each of the stations, which allows the optimum communication.

As this, the installation cost and maintenance cost of the optical cables are largely decreased, and each of the stations can detect cut of the optical cable, so that reliability and safety of this optical system 10d are remarkably improved.

(A5) Description of Fifth Modification of First Embodiment of the Invention

In the optical system 10d according to the fourth modification, an optical output level value after amplified by each optical amplifier (EDFA) is determined on the basis of characteristic data of the EDFA in a theoretical calculation. According to this modification, not in the theoretical calculation but using a monitoring function for outputted light, a more accurate gain control becomes possible. This monitoring function is performed by actual measurement using an optical detector (photodiode).

Figure 12:
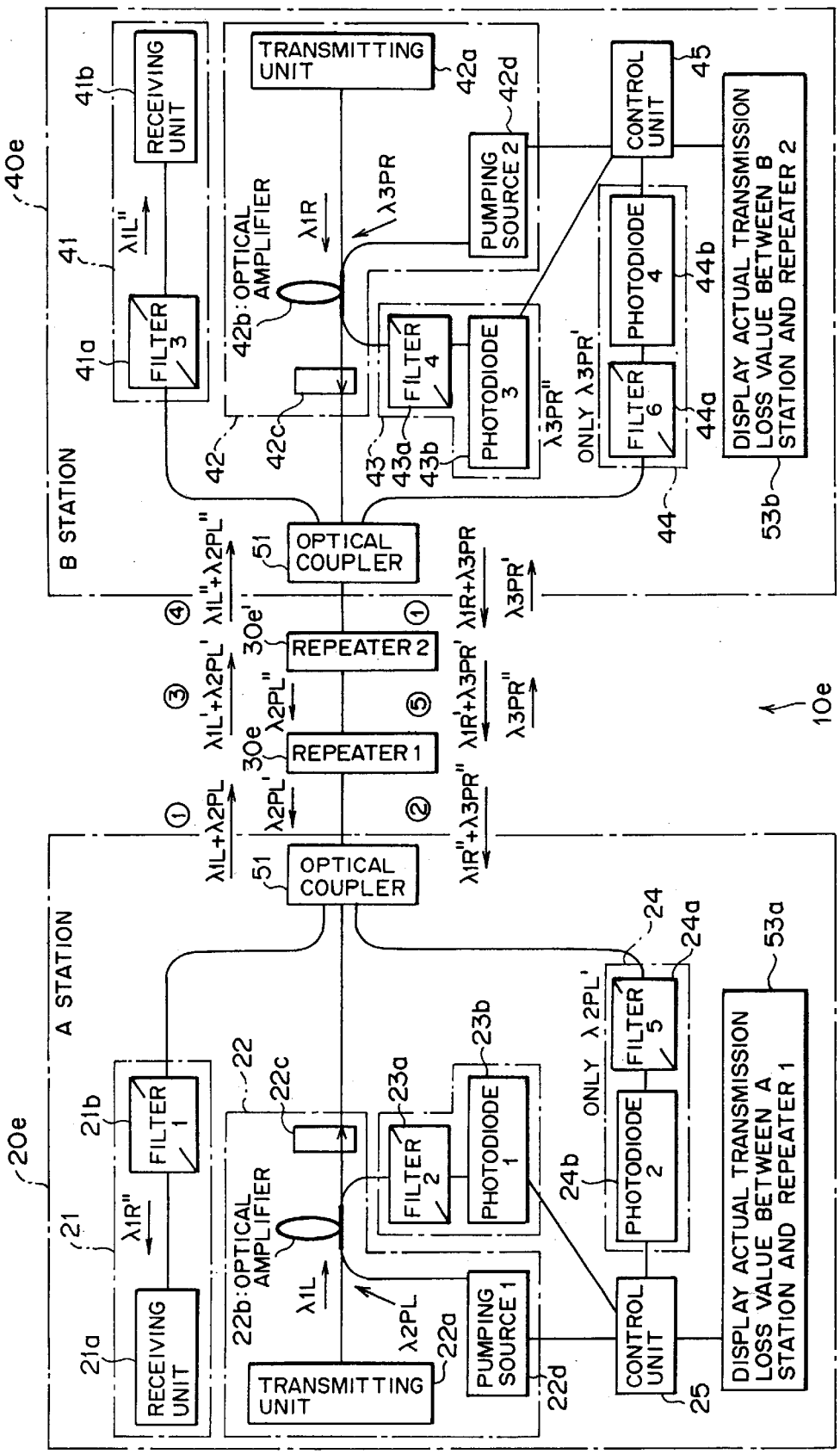
FIG. 12 is a diagram showing a structure of an optical system according to a fifth modification of the first embodiment of this invention.

FIG. 12 is a diagram showing a structure of an optical system according to a fifth modification of the first embodiment of this invention. An optical system 10e shown in FIG. 12 is a system in which transmission light, a reception light and pumping light can be transmitted/received through optical fiber cables in one system. The optical system 10e comprises a transmitting station (A station) 20e, a first repeating station (repeater 1) 30e, a second repeating station (repeater 2) 30e' and a receiving station (B station) 40e, where the stations are connected by optical cables, whereby optical signals are transmitted/received in two ways.

When the optical system 10e shown in FIG. 12 is compared with the optical system 10d shown in FIG. 9, the transmitting station 20e is equivalent to the transmitting station 20d (refer to FIG. 9) to which a level monitoring means 23 is additionally provided. And, the displaying function is simplified. The receiving station 40e is equivalent to the receiving station 40d (refer to FIG. 9) to which a level monitoring means 43 is additionally provided. And, the displaying function is simplified, as well. In FIG. 12, parts designated by like reference characters have like or corresponding functions, further descriptions of which are thus omitted.

In FIG. 12, a wavelength of transmission light of the transmitting station 20e is λ1L, a wavelength of a first pumping source 22d is λ2PL, a wavelength of transmission light of the receiving station 40e is λ1R, and a wavelength of a second pumping source 42d is λ3PR.

Transmission light λ1L from the transmitting station 20e is multiplexed with a first pumping source 22d, optically amplified by an optical amplifier 22b, and transmitted along with residual pumping light to the first repeating station 30e via an optical coupler 51.

In the first repeating station 30e, the component of the transmission light λ1L of the light of the amplified residual pumping light is removed by a first loopback filter 32b, and an optical level thereof is monitored by a first optical detector (photodiode 1) 32c, as will be described later.

The amplified transmission light λ1L' and the amplified pumping light λ2PL' from the first repeating station 30e are sent to the second repeating station 30e', and the amplified pumping light λ2PL' is sent back to the transmitting station 20e. Like the fourth modification, an actual transmission loss between the transmitting station 20e and the first repeating station 20e is calculated, and an output level of the pumping source 22d is controlled so as to yield the optimum amplification factor.

In the second repeating station 30e', reception light (λ1L'+λ2PL') from the transmitting station 20e is amplified, amplified transmission light λ1L" and amplified pumping light λ2PL" are sent to the receiving station 40e, and the amplified pumping light λ2PL" is sent back to the first repeating station 30e. An actual transmission loss between the first repeating station 30e and the second repeating station 30e' is calculated, a level of an optical attenuation quantity at the first repeating station 30e is adjusted so as to yield the optimum amplification factor, and an output level of the pumping source (not shown) is controlled.

Flow of transmission light from the receiving station 40e is similar.

Figure 13:
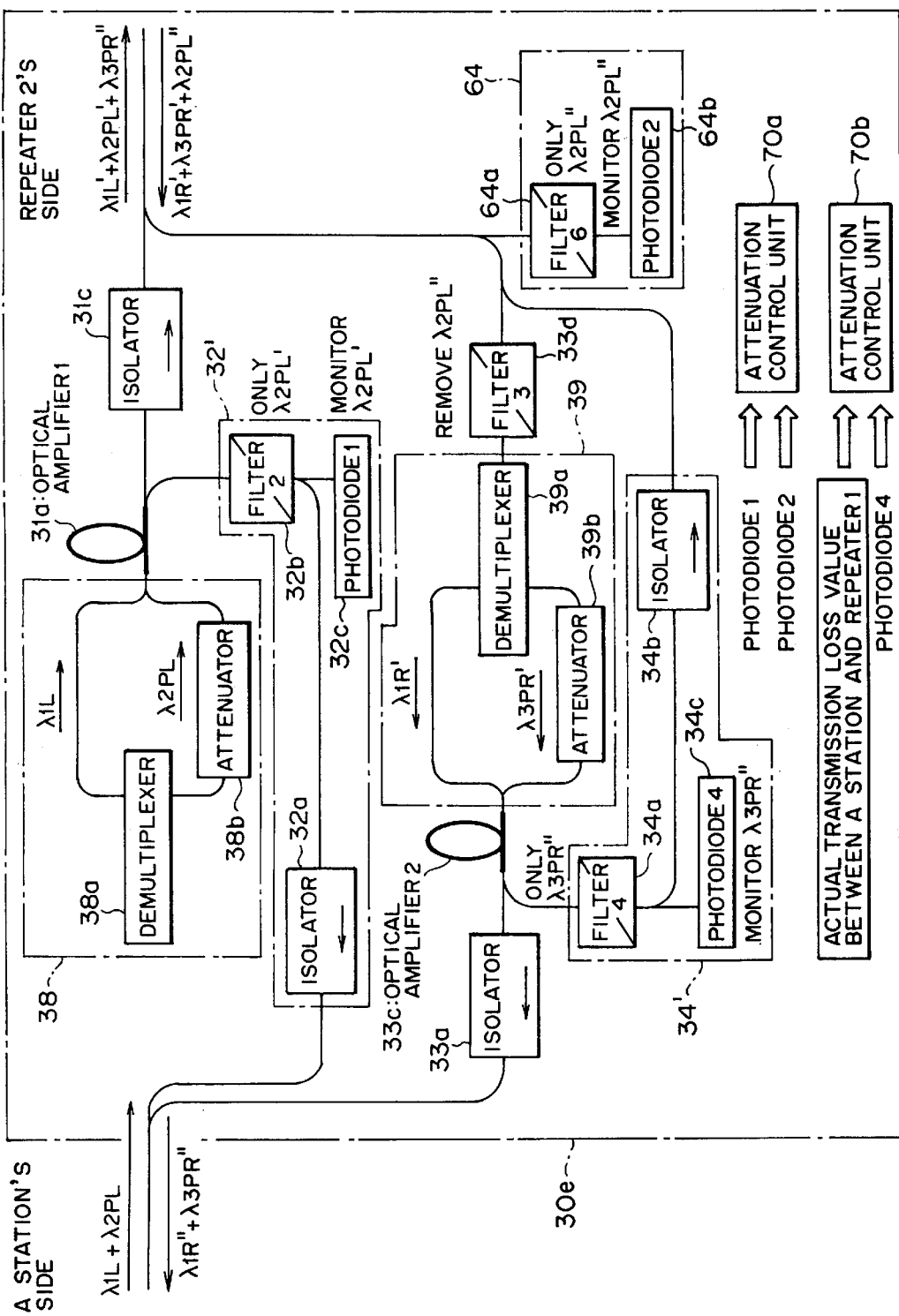
FIG. 13 is diagram showing a structure of a first repeating station according to the fifth modification of the first embodiment of this invention.

FIG. 13 is a diagram showing an internal structure of the first repeating station 30e according to the fifth modification of the first embodiment of this invention. The first repeating station 30e shown in FIG. 13 has a similar structure to the first repeating station 30e (refer to FIG. 10), which comprises a first loopback means 32' and a second loopback means 34'. The function of a second optical transmitting means in the first repeating station 30e is realized by a third filter 33d disposed at an input's side of a second optical amplifier 33c to remove a residual pumping light component (λ2PL") from a received optical signal, a second pumping light adjusting means 39 and a second optical amplifier 33c in cooperation. The first loopback means 32' is connected to a first optical amplifier 31a to extract second pumping light (λ2PL') from an optical signal amplified by the first optical amplifier 31a, outputs second pumping light (λ2PL'), and monitors a level of the same. The first loopback means 32' comprises a first loopback filter 32b, an isolator 32a, and the first optical detector (photodiode 1) 32c. The first loopback means 32' is similar to the above first loopback means 32 (refer to FIG. 2), in which an output from the first loopback filter 32b is monitored.

The second loopback means 34' is similar to the above second loopback means 34 (refer to FIG. 2), having a monitoring function. The other parts designated by like reference characters have like or corresponding functions, further descriptions of which are thus omitted.

Accordingly, the first loopback means 32' has the first optical detector 32c detecting a level of pumping light (λ2PL') outputted from the first optical amplifier 31a, and controls an attenuation quantity of a first pumping light adjusting means 38 on the basis of a level value detected by the first optical detector 32c. The second loopback means 34' has a fourth optical detector 34c detecting a level of pumping light (λ3PR") outputted from the second optical amplifier 33c to control an attenuation quantity of the second pumping light adjusting means 39 on the basis of a level value detected by the fourth optical detector 34c.

In the first repeating station 30e, the following control is performed. When transmission light (λ1L+λ2PL) from the transmitting station 20e is inputted to the first repeating station 30e, the transmission light is split into λ1L and λ2PL by a demultiplexer 38e. The split λ1L is outputted as it is. A level of the split λ2PL is adjusted by a variable attenuator 38b, outputted, multiplexed with λ1L by an optical coupler 50 (not shown), and inputted to the first optical amplifier 31a. The light signal (λ1L'+λ2PL") optically amplified with residual pumping light (not shown) by the first optical amplifier 31a is branched toward the isolator 31c and the first loopback filter 32b. The light toward the isolator 31c is sent as it is to the second repeating station 30e', whereas a λ2PL' component of the light toward the first loopback filter 32b is extracted by the first loopback filter 32b, and sent back to the transmitting station 20e. At this time, an optical level of the amplified residual pumping light (λ2PL') is monitored by the first optical detector 32c.

Inputted light (λ1R'+λ3PR'+λ2PL") from the second repeating station 30e is inputted to the third filter 33d and a sixth filter 64a, and a λ2PR" component is removed by the third filter 33d. The light is then split into λ1R' and λ3PR' by a demultiplexer 39a. The split λ1R' is outputted as it is, whereas a level of the split λ3PR' is adjusted by a variable attenuator 39b, multiplexed with λ1R' by an optical coupler 50 (not shown), then inputted to the second optical amplifier 33c.

The light is optically amplified with residual pumping light (not shown) by the second optical amplifier 33c. The optically amplified optical signal (λ1R"+λ3PR") is branched toward the isolator 33a and a second loopback filter 34a. The light toward the isolator 33a is sent as it is to the transmitting station 20e, whereas only a λ3PR" component of the light toward the second loopback filter 34a is extracted by the second loopback filter 34a. This component is sent back to the second repeating station 30e'. At this time, an optical level of the amplified residual pumping light λ3PR" is monitored by a fourth optical detector 44b.

On the other hand, only a λ2PL component of the inputted light from the second repeating station 30e' to be inputted to the sixth filter 64a is extracted by the sixth filter 64a. A reception level of this component is monitored by the second optical detector.

Figure 14:
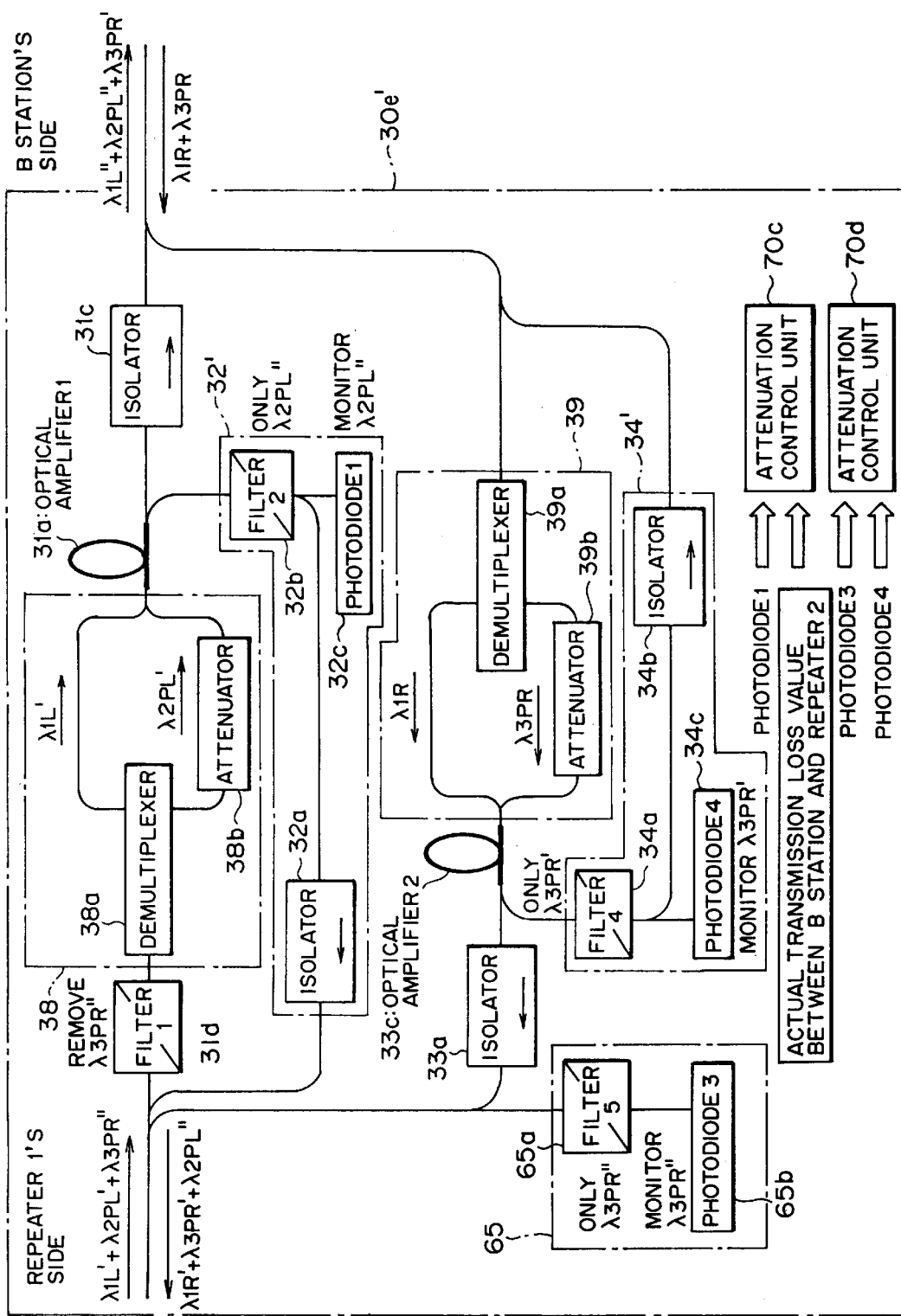
FIG. 14 is a diagram showing an internal structure of a second repeating station according to the fifth modification of the first embodiment of this invention.

FIG. 14 is a diagram showing an internal structure of the second repeating station 30e' according to the fifth modification of the first embodiment of this invention. The second repeating station 30e' shown in FIG. 14 has a similar structure to the second repeating station 30d' (refer to FIG. 11), which comprises a first loopback means 32', and the second loopback means 34', having a monitoring function. In FIG. 14, parts designated by like reference characters have like or corresponding functions described above, further descriptions of which are thus omitted.

In the second repeating station 30e', the following control is performed. When transmission light (λ1L'+λ2PL'+λ3PR") from the first repeating station 30e is inputted to the second repeating station 30e', the transmission light is branched toward a first filter 31d and a fifth filter 65a at an entrance leading to the first repeating station 30e. In the inputted light toward the first filter 31d, λ1L' component and a λ2PL' component are extracted by the first filter 31d, and split into λ1L' and λ2PL' by the demultiplexer 38a. The split λ1L' is outputted as it is. A level of the split λ2PL' is adjusted by a variable attenuator 38b. After that, λ2PL' is multiplexed with λ1L' by an optical coupler 50 (not shown), inputted to a first optical amplifier 31a, and optically amplified with residual pumping light (not shown) by the first optical amplifier 31a. The optically amplified optical signal (λ1L"+λ2PL") is branched toward an isolator 31c and the first loopback filter 32b. The light toward the isolator 31c is sent as it is to the receiving station 40e. Only a λ2PL" component of the other light is extracted by the first loopback filter 32b. This component is sent back to the first repeating station 30e. At this time, an optical level of the amplified residual pumping light λ2PL" is monitored by the first optical detector 32c.

Only a λ3PR component of the other light inputted toward the fifth filter 65a is extracted by the fifth filter 65a, and a reception level of the same is monitored by a third optical detector 65b.

The opposite direction is similar. Namely inputted light (λ1R+λ3PR) from the receiving station 40e is split into λ1R and λ3PR by a demultiplexer 39a. The split λ1R is outputted as it is. A level of the other split λ3PR is adjusted by a variable attenuator 39b, λ3PR is multiplexed with λ1R by an optical coupler 50 (not shown), inputted to a second optical amplifier 33c, optically amplified with residual pumping light (not shown) by the second optical amplifier 33c. The optically amplified optical signal (λ1R'+λ3PR') is branched toward an isolator 3 and a second loopback filter 34a. The light toward the isolator 3 is sent as it is to the first repeating station 30e. Only the λ3PR' component of the light toward the second loopback filter 34a is extracted by the second loopback filter 34a. This component is sent back to the receiving station 40e.

With the above structure, repeater transmission is performed. In FIG. 12, an operation of a controlling means 25 in the transmitting station 20e is as follows. An optical output level of λ2PL is monitored by a first optical detector 23b. A level of returned light λ2PL' from the first repeating station 30e is monitored by a second optical detector 24b. In the method described in the fourth embodiment, an actual transmission loss between the transmitting station 20e and the first repeating station 30e is calculated, and displayed on a display unit 53a. The controlling means 25 performs a gain control on the first pumping source 22d so that the optimum optical level is inputted to the first repeating station 30e.

An operation of the controlling means 45 in the receiving station 40e is as follows. An optical output level of λ3PR is monitored by a third optical detector (photodiode 3) 43b. Returned light λ3PR' from the second repeating station 30e' is monitored by a fourth optical detector (photodiode 4) 44b. In the method described in the fourth embodiment, an actual transmission loss value between the receiving station 40e and the second repeating station 30e' is calculated, and displayed on a displaying unit 53b. The controlling means 45 performs a gain control on a second pumping source 42b so that the optimum optical level is inputted to the second repeating station 30e'.

Operations of attenuation control units 70a and 70a' in the first repeating station 30e are as follows. In FIG. 13, an actual transmission loss value (displayed on the controlling means 25 in the transmitting station 20e) between the transmitting station 20e and the first repeating station 30e is inputted to the attenuation control unit 70a' which adjusts an output optical level toward the transmitting station 20e. The attenuation control unit 70a' controls an optical attenuation quantity of the variable attenuator 39b on the basis of the inputted actual transmission loss value between the transmitting station 20e and the first repeating station 30e so that λ1R" at the optimum level is inputted to the transmitting station 20e.

The attenuation control unit 70a (adjusting an output optical level toward the first repeating station 30e) calculates an actual transmission loss value between the first repeating station 30e and the second repeating station 30e' on the basis of a difference between a monitor value (an optical output level value of λ2PL' to the second repeating station 30e') of the first optical detector 32c and a monitor value (returned light λ2PL" from the second repeating station 30e') of the second optical detector 64a, and controls an optical attenuation quantity of the variable attenuator 38b so that λ1L ' at the optimum level is inputted to the second repeating station 30e'.

Similarly, operations of attenuation control units 70c and 70d in the second repeating station 30e ' are as follows. In FIG. 14, an actual transmission loss value between the receiving station 40e and the second repeating station 30e' displayed on a controlling means 45 in the receiving station 40e is inputted to the attenuation control unit 70d. The attenuation control unit 70 controls an optical attenuation quantity of the variable attenuator 38b on the basis of the inputted actual transmission loss value between the receiving station 40e and the second repeating station 30e ' so that λ1L" at the optimum level is inputted to the receiving station 40e.

The attenuation control unit 70c (adjusting an output optical level to the first repeating station 30e) calculates an actual transmission loss value between the second repeating station 30e' and the first repeating station 30e on the basis of a difference between a monitor value (optical output value of λ3PR' to the first repeating station 30e) of the fourth optical detector 44b and a monitor value of the third optical detector 65b (returned light λ3PR" from the first repeating station 30e), and controls an attenuation quantity of the variable attenuator 39b so that λ1R' at the optimum level is inputted to the first repeating station 30e.

Sections denoted by ① through ⑤ shown in FIG. 12 are defined as follows, and gain controls in the respective sections will be now described.

① : Optical output level control between the transmitting station 20e and the first repeating station 30e, optical level control between the receiving station 40e and the second repeating station 30e';

② : Optical output level control between the first repeating station 30e and the transmitting station 20e;

③ : Optical output level control between the first repeating station 30e and the second repeating station 30e';

④ : Optical output level control between the second repeating station 30e' and the receiving station 40e;

⑤ : Optical output level control between the second repeating station 30e' and the first repeating station 30e.

(i) With Respect to ①

The controlling means 25 in the transmitting station 20e monitors an optical output level of λ2PL by the first optical detector 23b and stores it, and monitors a level of returned light λ2PL' from the first repeating station 30e by the second optical detector 24b. The controlling means 25 calculates an actual transmission loss in ① on the basis of the above result and displays it, and controls on the basis of the actual transmission loss value obtained in the above calculation so that λ1L and λ2PL at the optimum levels are inputted to the first repeating station 30e. Incidentally, an operation of a controlling means 45 in the receiving station 40e is similar.

(ii) With Respect to ②

An actual transmission loss value (displayed on the controlling means 25 in the transmitting station 20e) between the transmitting station 20e and the first repeating station 30e is inputted to an attenuation control unit 70a in the first repeating station 30e. The attenuation control unit 70a controls on the basis of the inputted actual transmission loss value between the transmitting station 20e and the first repeating station 30e so that λ1R" at the optimum level is inputted to the transmitting station 20e.

(iii) With Respect to ③

The variable attenuator 38b control unit in the first repeating station 30e calculates an actual transmission loss value between the first repeating station 30e and the second repeating station 30e' on the basis of an optical output level value monitored by the first optical detector in the first repeating station 30e and a monitor value of the second optical detector in the first repeating station 30e, and controls so that λ1L' at the optimum level is inputted to the second repeating station 30e'.

(iv) with respect to ④

An actual transmission loss value (displayed on the control unit 45 in the receiving station 40e) between the receiving station 40e and the second repeating station 30e' is inputted to the attenuation control unit 70c in the second repeating station 30e'. The attenuation control unit 70c controls on the basis of the inputted actual transmission loss value between the receiving station 40e and the second repeating station 30e' so that λ1L" at the optimum level is inputted to the receiving station 40e.

(v) With Respect to ⑤

The attenuation control unit 70a in the second repeating station 30e' calculates an actual transmission loss value between the second repeating station 30e' and the first repeating station 30e on the basis of an output level value monitored by the fourth optical detector 44b in the second repeating station 30e' and a monitor value of the third optical detector 65b in the second repeating station 30e', and controls so that λ1R' at the optimum value is inputted to the first repeating station 30e.

As this, communication is performed among the stations using only optical cables in one system, and the output level of the pumping source is automatically controlled in each of the stations, which allows the optimum communication.

As this, the installation cost and maintenance cost of the optical cables are largely decreased, and each of the stations can detect cut of the optical cable so that reliability and safety of this optical system 10e is remarkably improved.

(A6) Description of Sixth Modification of First Embodiment of the Invention

Figure 15:
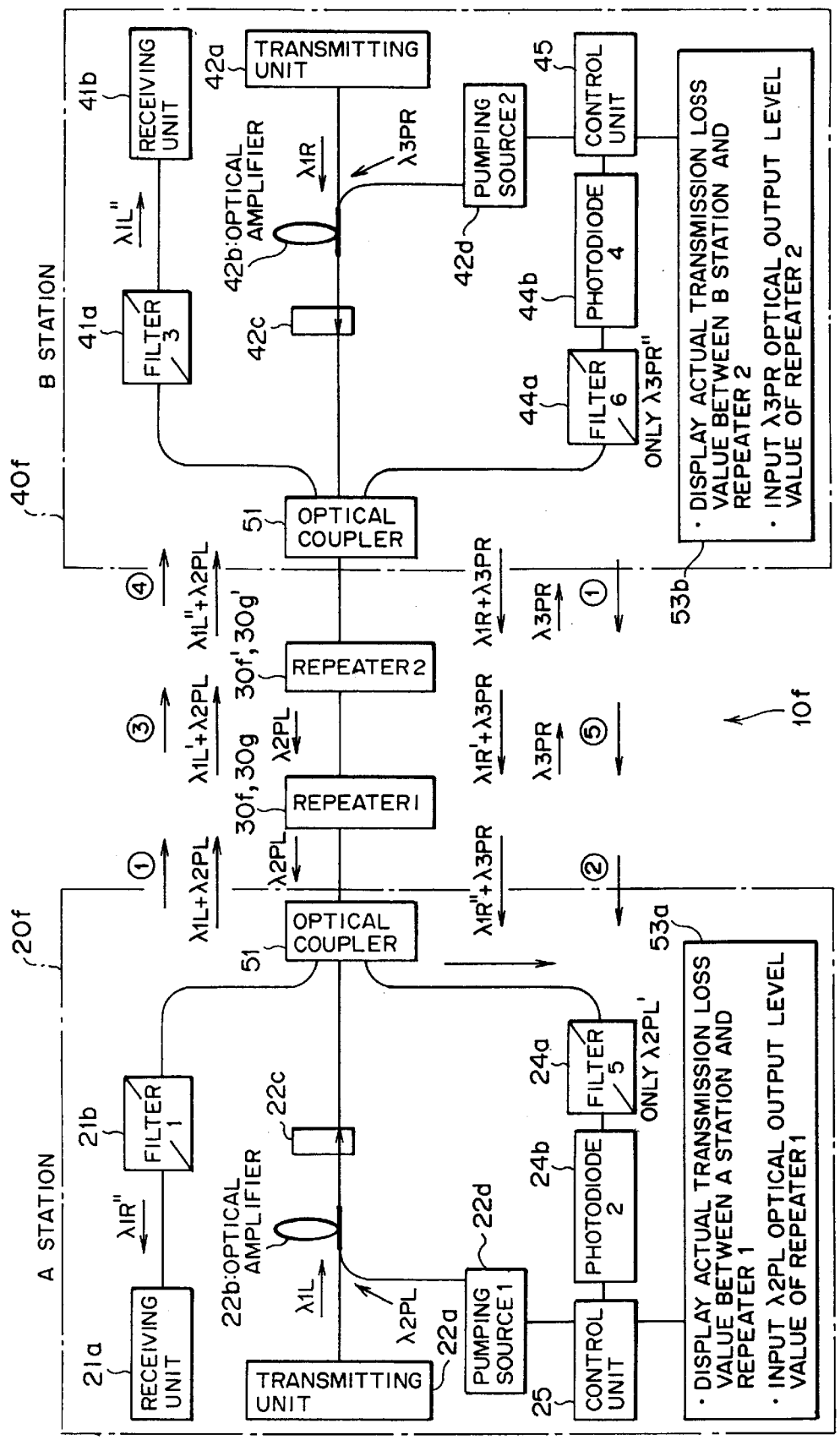
FIG. 15 is a diagram showing a structure of an optical system according to a sixth modification of the first embodiment of this invention.

FIG. 15 is a diagram showing a structure of an optical system according to a sixth modification of the first embodiment of this invention. An optical system 10f shown in FIG. 15 has different values of wavelengths for use in transmission, as compared with the above optical system 10d. Namely, different points are that the wavelength λ2PL' and the wavelength λ2PL" used in the above optical system 10d are replaced with a wavelength λ2PL, and the wavelength λ3PR' and the wavelength λ3PR" are replaced with a wavelength λ3PR. In FIG. 15, parts designated by like reference characters have like or corresponding functions described above, further descriptions of which are thus omitted.

Figure 16:
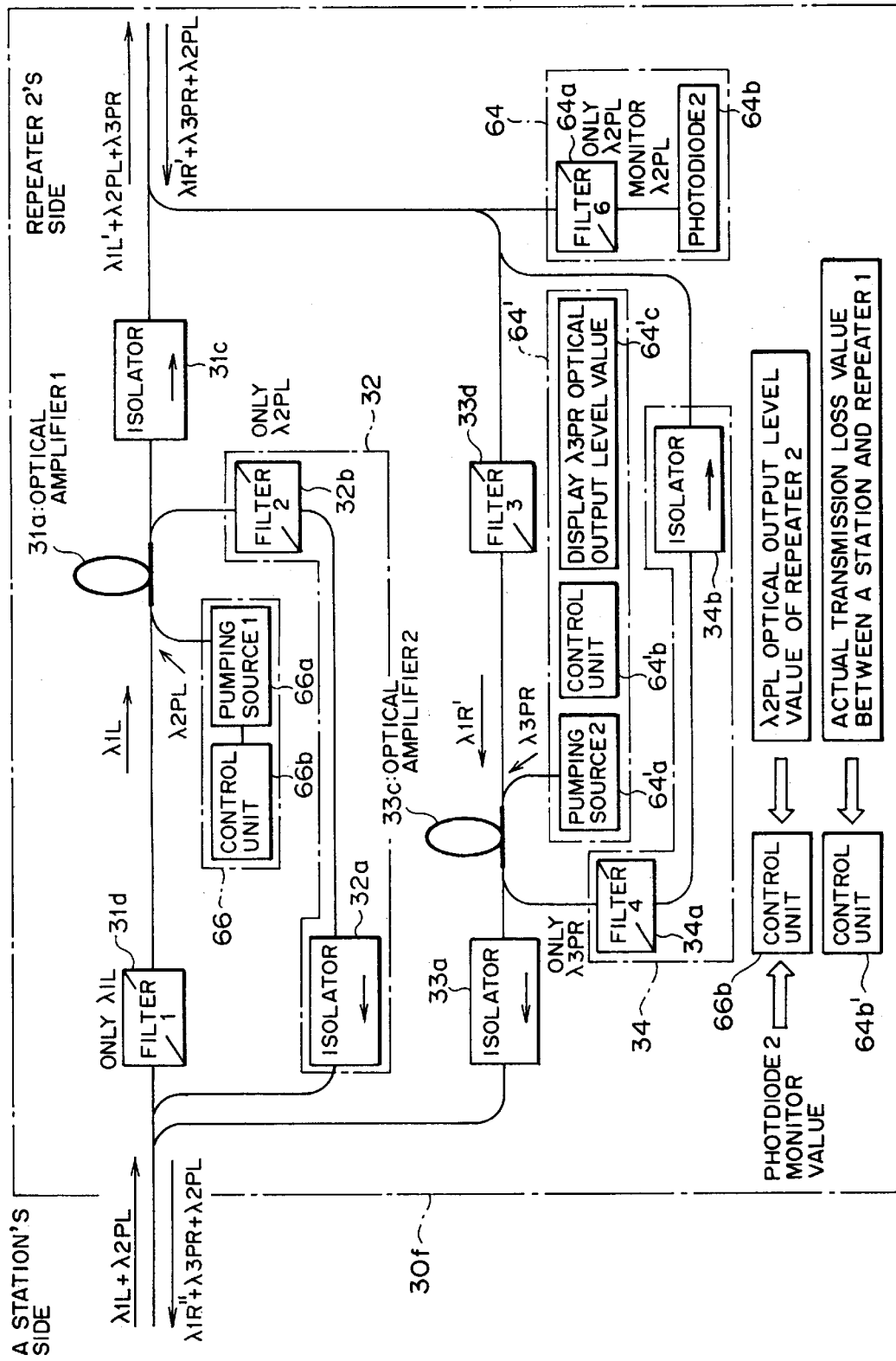
FIG. 16 is a diagram showing an internal structure of a first repeating station according to the sixth modification of the first embodiment of this invention.

FIG. 16 is a diagram showing an internal structure of a first repeating station 30f according to the sixth modification of the first embodiment of this invention. The first repeating station 30f shown in FIG. 16 monitors a value of a received optical wavelength in lieu of a variable attenuator, thereby adjusting output optical levels of a first optical amplifier 31a and a second optical amplifier 33c.

The first repeating station 30f is provided with a first pumping light generating means 66 disposed on the input's side of a first optical amplifier 31a (in an upper part in FIG. 16). The first pumping light generating means 66 comprises a first pumping source (pumping source 1) 66a and a first pumping light controlling means (control unit) 66b. The first repeating station 30f is also provided with a second pumping light generating means 64' on a input's side of the second optical amplifier 33c (in a lower part in FIG. 16). The second pumping light generating means 64' comprises a second pumping source (pumping source 2) 64'a, a second pumping light controlling means (control unit) 64'b, and a displaying unit 64'c.

The first pumping light controlling means 66b controls an output level of the first pumping source 66a. The second pumping light controlling means 64'b controls an output level of the second pumping source 64'a. The displaying unit 64'c is connected to the second pumping light controlling means 64'b to display an optical output level value of λ3PR, a display apparatus (not shown), for example, being used therefor.

The first optical amplifier 31a, an isolator 31c and the first pumping light generating means 66 function in cooperation as a first optical transmitting means. The second optical amplifier 33c, an isolator 33a and the second pumping light generating means 64' function in cooperation as a second optical transmitting means.

Accordingly, the second optical transmitting means (33c, 33a, 64') is provided with a second displaying means (display unit 64'c) which has control data relating to a second transmission loss value that an optical signal loses on the transmission path, and can output the control data, and a second pumping light controlling means 64'b which controls an output level of the second pumping source 64'a in its station on the basis of the control data of the second displaying means (display unit 64'c). In FIG. 16, parts designated by like reference characters have like or corresponding described above, further descriptions of which are thus omitted.

Figure 17:
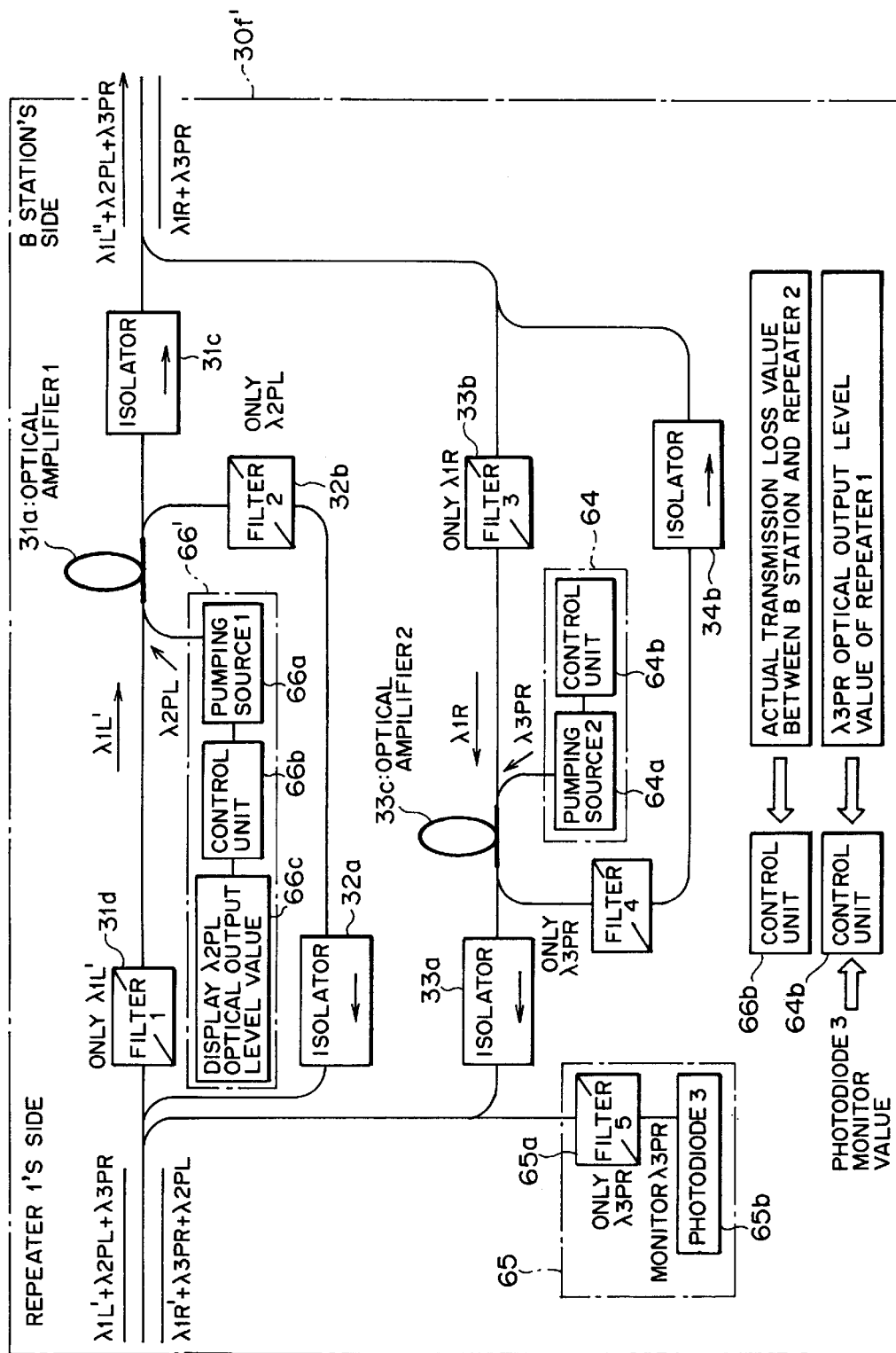
FIG. 17 is a diagram showing an internal structure of a second repeating station according to the sixth modification of the first embodiment of this invention.

FIG. 17 is a diagram showing an internal structure of a second repeating station 30f' according to the sixth modification of the first embodiment of this invention. The second repeating station 30f' shown in FIG. 17 monitors a value of a received optical wavelength in lieu of a variable attenuator, thereby adjusting output optical levels of the first optical amplifier 31a and the second optical amplifier 33c.

In the second repeating station 30f', a first pumping light generating means 66' is disposed on the input's side of a first optical amplifier 31a (in the upper part in FIG. 17). The first pumping light generating means 66' comprises a first pumping source (pumping source 1) 66a, a first pumping light controlling means (control unit) 66b and a displaying unit (λ2PL optical output level value display) 66c. In the second repeating station 30f', a second pumping light generating means 64 is disposed on the input's side of a second optical amplifier 33c (in the lower part in FIG. 17). The second pumping light generating means 64 comprises a second pumping source (pumping source 2) 64a and a second pumping light controlling means (control unit) 64b.

The displaying unit 66c is connected to the first pumping light controlling means 66b to display an optical output level of λ2PL, a display apparatus (not shown) being used therefor. The first optical amplifier 31a, the isolator 31c and the first pumping light generating means 66' function in cooperation as a first optical transmitting means. The second optical amplifier 33c, an isolator 33a and the second pumping light generating means 64 function in cooperation as a second optical transmitting means. In FIG. 17, parts designated by like reference characters have like or corresponding functions described above, further descriptions of which are thus omitted.

Accordingly, the first optical transmitting means (31a, 31c, 66') is provided with a first displaying means (display unit 66c) which has control data relating to a first transmission loss value that an optical signal loses on the transmission path, and can output the control data, and the first pumping light controlling means 66b which controls an output level of the first pumping source 66a in its own station on the basis of the control data of the first displaying means (display unit 66c).

In FIG. 16, an optical signal transmitted from the transmitting station 20f is inputted from the left side in FIG. 16. Only a $\lambda$1L component of this optical signal is extracted by a first filter 31d, and outputted as it is. A level of a $\lambda$2PL component outputted from the first pumping source 66a is adjusted by the first pumping light controlling means 66b, outputted, multiplexed with the above $\lambda$1L by an optical coupler 50 (not shown), and inputted to the first optical amplifier 31a.

The optical signal ($\lambda$1L'+$\lambda$2PL) optically amplified by the first optical amplifier 31a is branched toward the isolator 31c and the first loopback filter 32b. The light toward the isolator 31c is sent as it is to the second repeating station 30f'. Only the $\lambda$2PL component of the light toward the first loopback filter 32b is extracted by the first loopback filter 32b, and this component is sent back to the transmitting station 20f.

Inputted light ($\lambda$1R'+$\lambda$3PR'+$\lambda$2PL") from the second repeating station 30f' is inputted to a third filter 33d and the sixth filter 64a. A$\lambda$1R" component of the inputted light is removed by the third filter 33d, the inputted light is then outputted as it is. A level of $\lambda$3PR' is adjusted by the second pumping light controlling means 64'b, multiplexed with the above $\lambda$1R', and inputted to the second optical amplifier 33c.

The optical signal ($\lambda$1R"+$\lambda$3PR) optically amplified by the second optical amplifier 33c is branched toward the isolator 33a and a second loopback filter 34a. The light toward the isolator 33a is sent as it is to the transmitting station 20f. Only a $\lambda$3PR component of the other light is extracted by the second loopback filter 34a. This component is sent back to the second repeating station 30f'.

Only a $\lambda$2PL component of inputted light from the second repeating station 30f' to be inputted to the sixth filter 64a is extracted by the sixth filter 64a. A reception level of this component is monitored by the second optical detector 64b.

Similarly, in FIG. 17, transmission light ($\lambda$1L'+$\lambda$2PL +$\lambda$3PR) from the first repeating station 30f is inputted from the left side in the FIG. 17. When the optical signal is inputted to the second repeating station 30f', the optical signal is branched toward a first filter 31d and a fifth filter 65a. Only a $\lambda$1L' component of the light inputted to the first filter 31d is extracted by the first filter 31d, and outputted as it is. A level of $\lambda$2PL outputted from a first pumping source 66a is adjusted by a first pumping light controlling means 66b, outputted, multiplexed with the above $\lambda$1L' by an optical coupler 50 (not shown), and inputted to a first optical amplifier 31a.

The optical signal ($\lambda$1L"+$\lambda$2PL) optically amplified by the first optical amplifier 31a is branched toward the isolator 31c and a first loopback filter 32b. The light toward the isolator 31c is sent as it is to the receiving station 40f. Only a $\lambda$2PL component of the light toward the first loopback filter 32b is extracted by the first loopback filter 32b, and this component is sent back to the repeating station 30f.

Only a $\lambda$3PR component of the inputted light toward a fifth filter 65a is extracted by the fifth filter 65a, and a reception level thereof is monitored by a third optical detector 65b.

Only a $\lambda$1R component of inputted light ($\lambda$1R+$\lambda$3PR) from the receiving station 40f is extracted by a third filter 33d, and inputted to a second optical amplifier 33c. A level of $\lambda$3PR is adjusted by a second pumping light controlling means 64b. $\lambda$3PR is multiplexed with $\lambda$1R by an optical coupler 50 (not shown), and inputted to the second optical amplifier 33c. The optical signal ($\lambda$1R'+$\lambda$3PR) optically amplified by the second optical amplifier 33c is branched toward an isolator 33a and a second loopback filter 34a. The light toward the isolator 33a is sent as it is to the first repeating station 30f. Only a $\lambda$3PR component of the other light is extracted by the second loopback filter 34a. This component is sent back to the receiving station 40f.

With the above structure, repeater transmission is performed. In the first repeating station 30f shown in FIG. 16, a value (actual transmission loss value between the transmitting station 20f and the first repeating station 30f) displayed by a controlling means 25 in the transmitting station 20f is inputted, and this information is transmitted to the second pumping light controlling means 64'b. The second pumping light controlling means 64'b performs a gain control on the second pumping source 64'a on the basis of the inputted actual transmission loss value between the transmitting station 20f and the first repeating station 30f so that $\lambda$1R" at the optimum level is inputted to the transmitting station 20f.

The first pumping light controlling means 66b calculates an actual transmission loss value between the first repeating station 30f and the second repeating station 30f' from a monitor value of the second optical detector 64b and an optical output level value of $\lambda$2PL to be outputted to the second repeating station 30f', and performs a gain control on the first pumping source 64'a so that $\lambda$1L' at the optimum level is inputted to the second repeating station 30f'.

Similarly, in the second repeating station 30f' shown in FIG. 17, a value (actual transmission loss value between the receiving station 40f and the second repeating station 30f') displayed by a controlling means 45 in the receiving station 40f is inputted, and this information is transmitted to the second pumping light controlling means 64b. The first pumping light controlling means 64b performs a gain control on the first pumping source 66a on the basis of the inputted actual transmission loss value between the receiving station 40f and the second repeating station 30f' so that $\lambda$1L" at the optimum level is inputted to the receiving station 40f.

The second pumping light controlling means 64b calculates an actual transmission loss value between the second repeating station 30f' and the first repeating station 30f on the basis of a monitor value of the second optical detector 65b and an inputted optical output level value of $\lambda$3PR in the first repeating station 30f, and performs a gain control on the second pumping source 64a so that $\lambda$1R' at the optimum level is inputted to the first repeating station 30f.

The gain controls in respective sections denoted by ① through ⑤ in FIG. 15 are as follows.

①: Optical output level control between the transmitting station 20f and the first repeating station 30, optical output level control between the receiving station 40f and the second repeating station 30f';

②: Optical output level control between the first repeating station 30f and the transmitting station 20f;

③: Optical output level control between the first repeating station 30f and the second repeating station 30f';
④: Optical output level control between the second repeating station 30f' and the receiving station 40f;
⑤: Optical output level control between the second repeating station 30f' and the first repeating station 30f.

(i) With Respect to ①

The controlling means 25 in the transmitting station 20f calculates an optical output level of λ2PL, and stores it. The optical output level value of λ2PL displayed in the first repeating station 30f is inputted to the controlling means 25 in the transmitting station 20f, and an actual transmission loss between the transmitting station 20f and the first repeating station 30f is calculated on the basis of a difference between the optical output level value of λ2PL and a monitor value of the second optical detector 24b in the first repeating station 30f, and displayed. The controlling means 25 in the transmitting station 20f controls on the basis of the actual transmission loss value obtained in the above calculation so that λ1L at the optimum level is inputted to the first repeating station 30f.

Meanwhile, an operation of the controlling means 45 in the receiving station 40f is similar.

(ii) With Respect to ②

A value (actual transmission loss value between the transmitting station 20f and the first repeating station 30f) displayed on the controlling means 25 in the transmitting station 20f is inputted to the second pumping light controlling means 64'b in the first repeating station 30f. The second pumping light controlling means 64'b controls on the basis of the inputted actual transmission loss value between the transmitting station 20f and the first repeating station 30f so that λ1R" at the optimum level is inputted to the transmitting station 20f.

(iii) With Respect to ③ the first pumping light controlling means 66b in the first repeating station 30f calculates an actual transmission loss value between the first repeating station 30f and the second repeating station 30f' from an inputted optical output level value of λ2PL in the second repeating station 30f' and a monitor value of the second optical detector 64b in the first repeating station 30f, and controls so that λ1L' at the optimum level is inputted to the second repeating station 30f'.

(iv) with respect to ④

A value (actual transmission loss value between the receiving station 40 and the second repeating station 30f') displayed on the controlling means 45 in the receiving station 40f is inputted to the first pumping light controlling means 66b in the second repeating station 30f'. The first pumping light controlling means 66b controls on the basis of the inputted actual transmission loss value between the receiving station 40f and the second repeating station 30f' so that λ1L" at the optimum level is inputted to the receiving station 40f.

(v) With Respect to ⑤

The second pumping light controlling means 64'b in the second repeating station 30f' calculates an actual transmission loss value between the second repeating station 30f' and the first repeating station 30f from an inputted optical output level value of λ3PR of the first repeating station 30f and a monitor value of the third optical detector 65b in the second repeating station 30f', and controls so that λ1R' at the optimum level is inputted to the first repeating station 30f.

As this, communication among the stations is performed using only optical cables in one system, and the output level of the pumping source is automatically controlled in each of the stations, which allows the optimum communication.

As this, the installation cost and maintenance cost of the optical cables are largely decreased, and reliability and safety of this optical system 10f is remarkably improved since each of the stations can detect cut of the optical cable.

(A7) Description of Seventh Modification of First Embodiment of the Invention

Next, description will be made of another control mode of the above optical system 10f (refer to FIG. 15).

Figure 18:
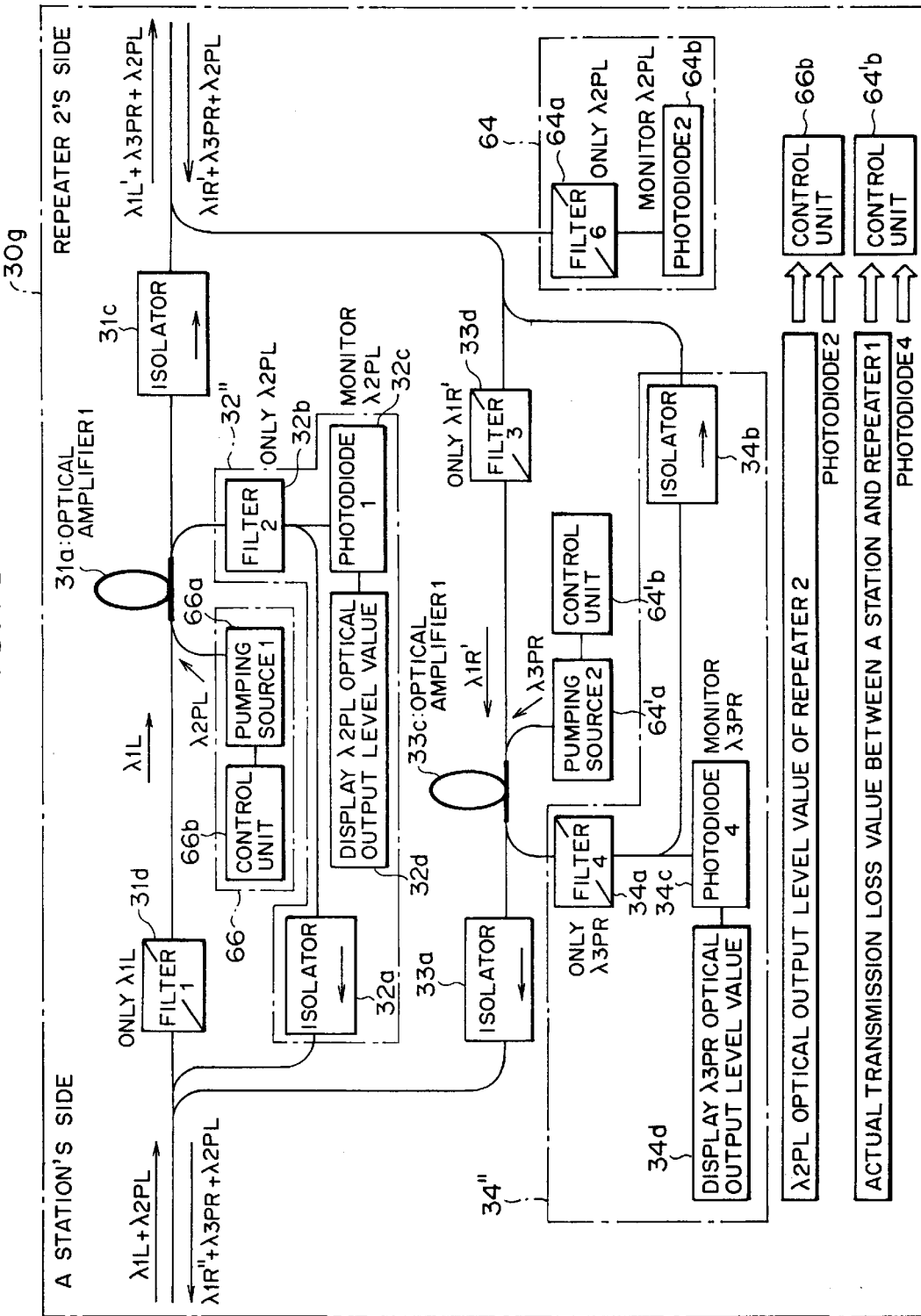
FIG. 18 is a diagram showing an internal structure of a first repeating station according to a seventh modification of the first embodiment of this invention.

FIG. 18 is a diagram showing an internal structure of a first repeating station 30g according to a seventh modification of the first embodiment of this invention. A difference between the first repeating station 30g shown in FIG. 18 and the first repeating station 30f shown in FIG. 16 is that the first repeating station 30f computes an optical output level after amplified of the pumping source from the database and displays it, whereas this modification displays a result of measurement monitored by a detector (photodiode) to enable a more accurate gain control.

A first loopback means 32" is connected to an output's side of a first optical amplifier 31a (in the upper part in FIG. 18). The first loopback means 32" is connected to the first optical amplifier 31a to extract second pumping light (λ2PL) from an optical signal amplified by the first optical amplifier 31a, and output second pumping light (λ2PL). The first loopback means 32" comprises a first loopback filter 32b, an isolator 32a and a first optical detector 32c, along with a display unit 32d. The display unit 32d displays an optical output level value of λ2PL, a display apparatus, for example, being used therefor.

A first pumping light controlling means 66b is provided with the first level monitoring means 32c which detects a level of the second pumping light (λ2PL) outputted from the second filter 32b to control an output optical level of the first pumping source 31a on the basis of a level detected by the first level monitoring means 32c and a reception light level detected by the first reception light monitoring means. A second pumping light controlling means 64'b is provided with a second level monitoring means 34c which detects a level of third pumping light (λ3PR) outputted from a fourth filter 34a to control an output optical level of a second pumping source 64'a on the basis of a level value detected by the second level monitoring means 34c and a reception light level detected by the first reception light monitoring means.

In FIG. 18, parts designated by like reference characters have like or corresponding functions described above, further descriptions of which are thus omitted.

When transmission light (λ1L+λ2PL) from a transmitting station 20f is inputted to the first repeating station 30g, only a λ1L component thereof is extracted by a first filter 31d, multiplexed with pumping light (λ2PL) of the first pumping source 22d, and inputted to the first optical amplifier 31a. The optical signal (λ1L'+λ2PL) optically amplified by the first optical amplifier 31a is demultiplexed toward the isolator 31c and the first loopback filter 32b. The light toward the isolator 31c is sent as it is to the second repeating station 30g'. Only a λ2PL component of the light toward the first loopback filter 32b is sent back to the transmitting station 20f by the first loopback filter 32b. At this time, an optical level of the amplified pumping light (λ2PL) is monitored by the first optical detector 32c and displayed.

Similarly, a second loopback means 34" is connected to an output's side of the second optical amplifier 33c (in the lower part in FIG. 18). The second loopback means 34" is connected to the second optical amplifier 33c to extract λ3PR from the optical signal amplified by the second optical amplifier 33c, and output λ3PR. The second loopback means 34" comprises the second loopback filter 34a, the isolator 32a and the first optical detector 32c, along with the display unit 32d. The display unit 32d displays an optical output level value of λ2PL, a display apparatus, for example, being used therefor.

Inputted light (λ1R'+λ3PR+λ2PL) from the second repeating station 30g' is inputted to a third filter 33d and a sixth filter 64a. Only a λ1R' component of this inputted light is extracted by the third filter 33d, and outputted as it is. A level of λ3PR is adjusted by the second pumping light controlling means 64'b, and λ3PR is multiplexed with the above λ1R' by an optical coupler 50 (not shown), and inputted to a second optical amplifier 33c. The optical signal (λ1R"+λ3PR) optically amplified by the second optical amplifier 33c is branched toward the isolator 33a and the second loopback filter 34a. The light from the isolator 33a is sent as it is to the transmitting station 20f. Only a λ3PR component of the light from the side of the second loopback filter 34a is extracted from the second loopback filter 34a at the second loopback filter 34a. Only a λ2PL component of inputted light from the second repeating station 30g' to be inputted to the sixth filter 64a is extracted by the sixth filter 64a. A reception level of this component is monitored by the second optical detector 64b.

Figure 19:
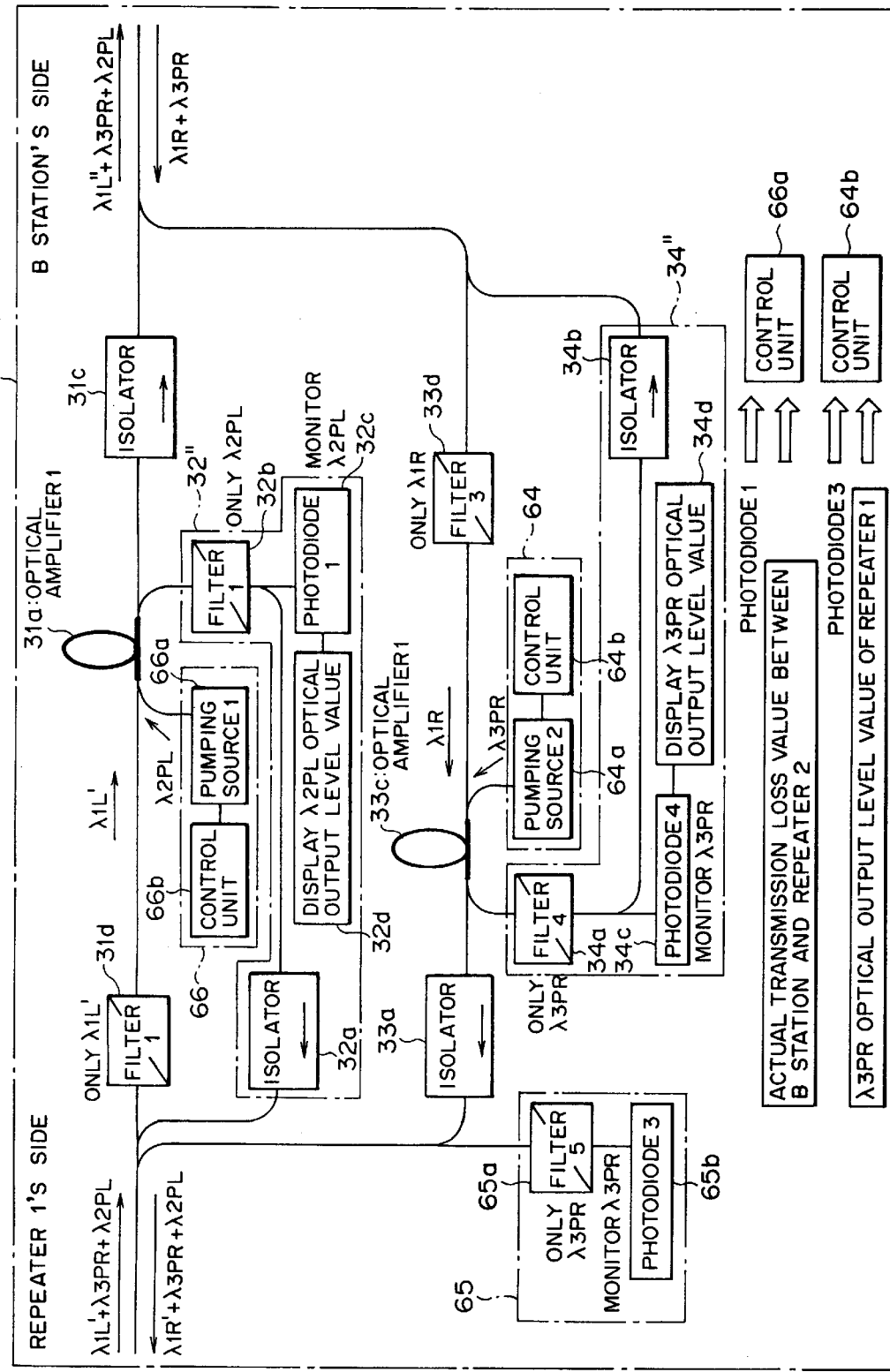
FIG. 19 is a diagram showing an internal structure of a second repeating station according to the seventh modification of the first embodiment of this invention.

FIG. 19 is a diagram showing an internal structure of the second repeating station 30g' according to the seventh modification of the first embodiment of this invention. A process inside the second repeating station 30g' shown in FIG. 19 is as follows. Namely, transmission light (λ1L'+λ2PL+λ3PR) from the first repeating station 30g is inputted to the second repeating station 30g'. Only a λ1L' component of this inputted light is extracted by a first filter 31d, multiplexed with pumping light (λ2PL) of a first pumping source 22d via an optical coupler 50, and inputted to a first optical amplifier 31a. The optical signal (λ1L"+λ2PL) optically amplified by the first optical amplifier 31a is demultiplexed toward an isolator 31c and an isolator 32a. The light toward the isolator 31c is sent as it is to the receiving station 40f. Only a λ2PL component of the light toward a first loopback filter 32b is extracted by the first loopback filter 32b. This component is sent back to the first repeating station 30g.

At this time, an optical level of the amplified residual pumping light λ2PL is monitored by a first optical detector 32c and displayed. Only a λ3PR component of the inputted light toward a fifth filter 65a is extracted by the fifth filter 65a, and a reception level thereof is monitored by a third optical detector 65b.

Only a λ1R component of inputted light from the receiving station 40f is extracted by a third filter 33d. This λ1R component is inputted to a second optical amplifier 33c. A level of λ3PR is adjusted by a second pumping light controlling means 64b, multiplexed with λ1R by an optical coupler 50 (not shown), then inputted to a second optical amplifier 33c. The optical signal (λ1R'+λ3PR) optically amplified by the second optical amplifier 33c is branched toward the isolator 33a and a second loopback filter 34a. The light from the isolator 33a is sent as it is to the first repeating station 30g. Only a λ3PR component of the light toward the second loopback filter 34a is extracted by the second loopback filter 34a, and this component is sent back to the receiving station 40.

In FIG. 19, parts designated by like reference characters have like or corresponding functions described above, further descriptions of which are thus omitted.

With the above structure, a value (actual transmission loss value between the transmitting station 20f and the first repeating station 30g) displayed on the display unit 53a in the transmitting station 20f is inputted to the first repeating station 30g (refer to FIG. 18), and this information is transmitted to the second pumping light controlling means 64'b. The second pumping light controlling means 64'b performs a gain control on the second pumping source 64'a on the basis of the inputted actual transmission loss value between the transmitting station 20f and the first repeating station 30g so that λ1R" at the optimum level is inputted to the transmitting station 20f.

The first pumping light controlling means 66b calculates an actual transmission loss value between the first repeating station 30g and the second repeating station 30g' on the basis of a monitor value of the second optical detector 64'b and the inputted optical output level value of λ2PL in the second repeating station 30g', and performs a gain control on the first pumping source 22d so that λ1L ' at the optimum level is inputted to the second repeating station 30g'.

A value (actual transmission loss value between the receiving station 40f and the second repeating station 30g') displayed on the controlling means 45 in the receiving station 40f is inputted to the second repeating station 30g' shown in FIG. 19, and this information is transmitted to a first pumping light controlling means 66b. The first pumping light controlling means 66b controls an optical attenuation quantity of the first pumping source 66a on the basis of the inputted actual transmission loss value between the receiving station 40f and the second repeating station 30g' so that λ1L" at the optimum level is inputted to the receiving station 40f.

The second pumping light controlling means 64'b calculates an actual transmission loss value between the second repeating station 30g' and the first repeating station 30g from a monitor value of the third optical detector 65b and an inputted optical output level value of returned light λ3PR from the first repeating station 30g, and performs a gain control on the second pumping source 64a so that λ1R' at the optimum level is inputted to the first repeating station 30g. A gain controlling method in each of the sections is similar to that described in the sixth modification of the first embodiment, further description of which is thus omitted.

Accordingly, the output level of the pumping source in each of the stations is controlled using only the optical cables in one system, and each of the stations can detect cut of the optical cable, which allows a large decrease in the installation cost and maintenance cost of the optical cables.

(A8) Description of Eighth Modification of First Embodiment of the Invention

It is possible to decrease the number of the used wavelengths by providing a repeating station according to this modification in the optical system 10c described in the first modification of the first embodiment described above. In concrete, the wavelength λ2PL' and the wavelength λ2PL" are changed to a wavelength λ2PL, and the wavelength λ3PR' and the wavelength λ3PR" are changed to a wavelength λ3PR. Operations of a transmitting station 20 and a receiving station 40 are similar to the operations of the transmitting station 20 and the receiving station 40 in the optical system 10c described in the first modification of the first embodiment, descriptions of which are thus omitted. Only the inside of the repeating station will be described.

Figure 20:
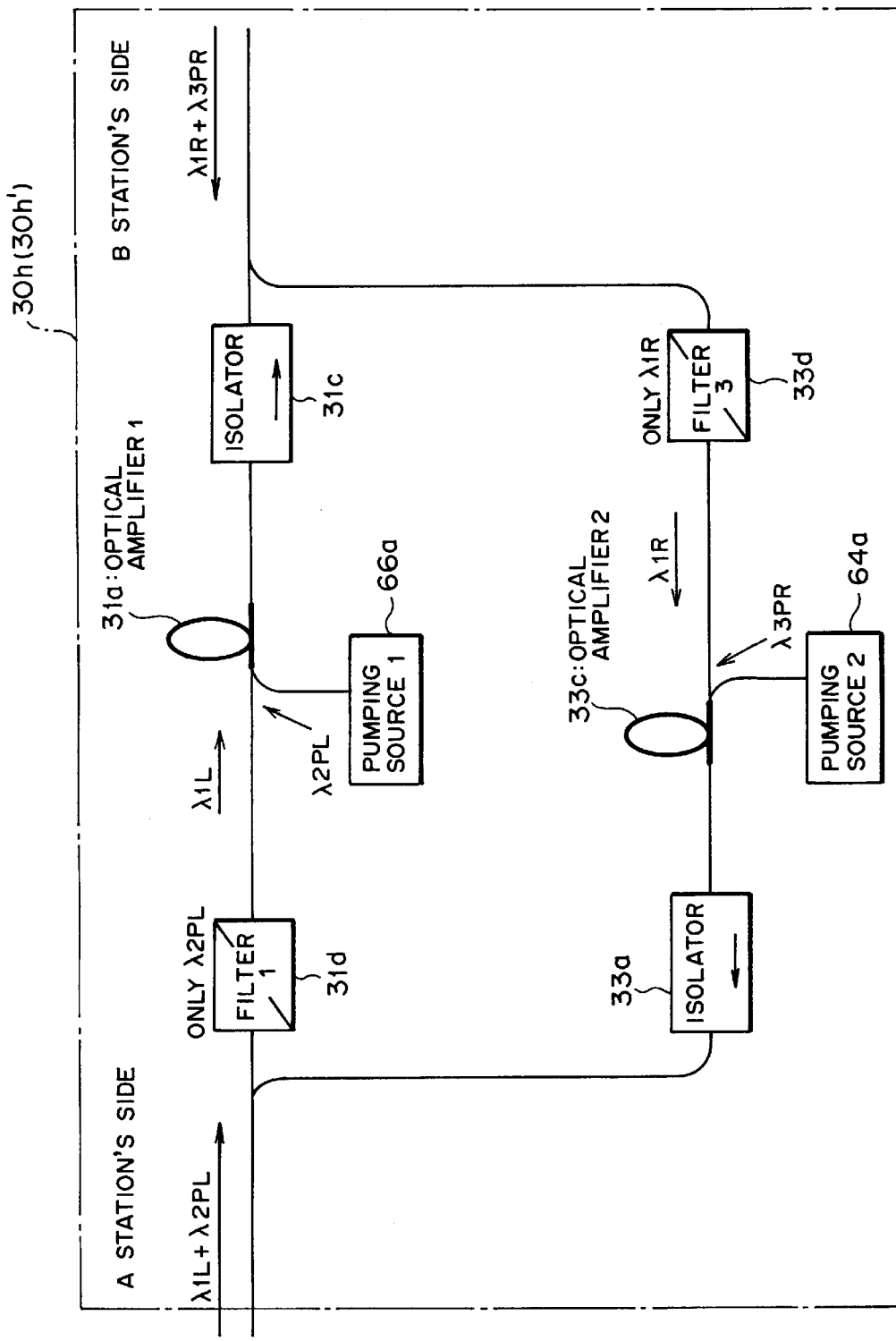
FIG. 20 is a diagram showing an internal structure of a first repeating station according to an eighth modification of the first embodiment of this invention.

FIG. 20 is a diagram showing an internal structure of a first repeating station according to an eighth modification of the first embodiment of this invention. A first repeating station 30h shown in FIG. 20 comprises a first optical transmitting means and a second optical transmitting means.

The first repeating station 30h comprises a first filter 31d, a first pumping source 66a, a first optical amplifier 31a and an isolator 31c. They function in cooperation as a first optical transmitting means. The first optical transmitting means receives first transmission light (λ1L) transmitted from a transmitting station 20c (refer to FIG. 3) through the first optical fiber and first pumping light (λ2PL) and changes either a level of the first transmission light (λ1L) or a level of the first pumping light (λ2PL) to a necessary level, amplifies the changed first transmission light (λ1L) and first pumping light (λ2PL), and outputs second transmission light (λ1L') and second pumping light (λ2PL'). The first filter 31d is disposed on the input's side of the first optical amplifier 31a to extract transmission light (λ1L, λ1R) from a received optical signal, and inputs the transmission light (λ1L, λ1R) to the first optical amplifier 31a.

The first repeating station 30h comprises a second filter 33d, a second pumping source 64a, a second optical amplifier 33c and an isolator 33a. They function in cooperation as a second optical transmitting means. The second optical transmitting means receives third transmission light (λ1L) and third pumping light (λ3PR) transmitted from a receiving station 40c (refer to FIG. 3) through the second optical fiber, changes either a level of the third transmission light (λ1R) or a level of the third pumping light (λ3PR) to a necessary level, amplifies the changed third transmission light (λ1R) and third pumping light (λ3PR), and outputs fourth transmission light (λ1R'). The second filter 33d is disposed on an input's side of the second optical amplifier 33c to extract transmission light (λ1L, λ1R) from a received optical signal, and inputs the transmission light (λ1L, λ1R) to the second optical amplifier 33c.

In FIG. 20, parts designated by like reference characters have like or corresponding functions described above, further descriptions of which are thus omitted. A second repeating station 30h' has a similar structure to that of the first repeating station 30h.

With this, transmission light (λ1L+λ2PL) from the transmitting station 20c is inputted to the first repeating station 30h. Only a λ1L component of this inputted light is extracted by the first filter 31d. This λ1L component is outputted as it is, multiplexed with λ2PL from the first pumping source 66a, and inputted to a first optical amplifier 31a. The optical signal (λ1L'+λ2PL) optically amplified by the first optical amplifier 31a is transmitted to the isolator 31c, and sent as it is to the second repeating station 30h'.

With regard to inputted light (λ1R'+λ3PR) from the second repeating station 30h', transmission light (λ1R"+λ3PR) is transmitted to the transmitting station 20c.

The second repeating station 30h' (identical to the first repeating station 30h) shown in FIG. 20 is similar. Namely, transmission light (λ1L'+λ2PL) from the first repeating station 30h (on the left side in FIG. 20) is inputted to the second repeating station 30h'. Only a λ1L' component of this inputted light is extracted by a first filter 31d, and outputted as it is. This component is multiplexed with λ2PL from a first pumping source 66a, and inputted to a first optical amplifier 31a. The optical signal (λ1R"+λ2PL) optically amplified by the first optical amplifier 31a is transmitted to an isolator 31c, and sent as it is to the receiving station 31c.

Inputted light (λ1R+λ3PR) from the receiving station 40c is similar. An optical signal (λ1R"+λ3PR) is transmitted to the first repeating station 30h.

As this, communication is performed among the stations using only optical cables in only one system, and the output level of the pumping source is automatically controlled in each of the stations, which allows the optimum communication.

As this, the installation cost and maintenance cost of the optical cables are largely decreased, and each of the stations can detect cut of the optical cable, thus reliability and safety of the optical system 10c are remarkably improved.

(A9) Description of Ninth Modification of First Embodiment of the Invention

Figure 21:
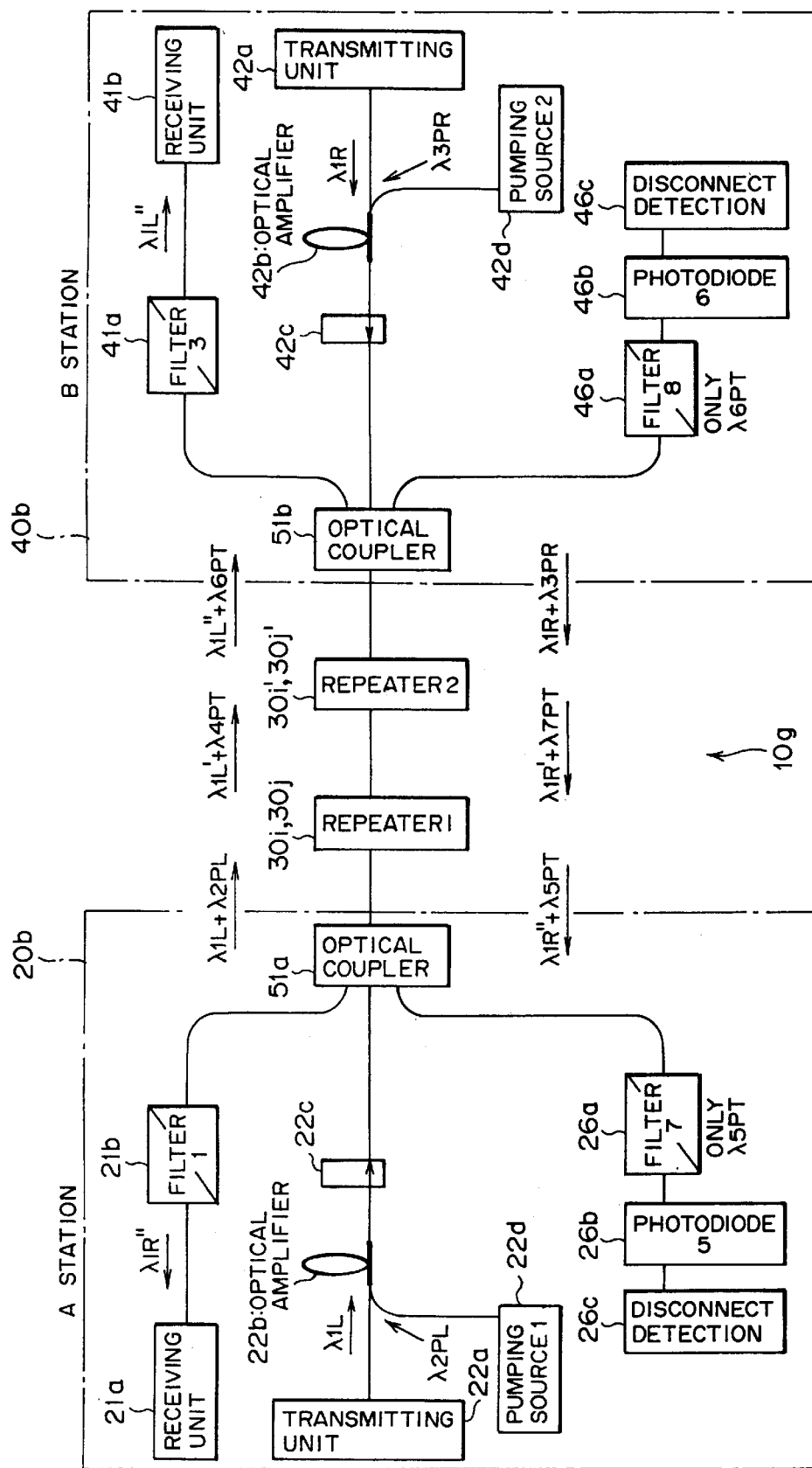
FIG. 21 is a diagram showing a structure of an optical system according to a ninth modification of the first embodiment of this invention.

Next, a disconnect detecting function additionally provided to the structure of the repeating station shown in FIG. 20 will be described. FIG. 21 is a diagram showing a structure of an optical system 10g according to a ninth modification of the first embodiment of this invention. In FIG. 21, detection of cut of an optical cable between a transmitting station 20b and a first repeating station 30i is performed such that a first transmitting side monitoring means 26b in a transmitting station 20b monitors residual pumping light λ5PT from a first repeating station 30i, and determines that the optical cable is cut when the input dies out. Between a receiving station 40b and a second repeating station 30i' is similar. In the receiving station 40b, a first receiving side monitoring means 46b monitors residual pumping light λ6PT from the second repeating station 30i', and determines that the optical cable is cut when the input dies out. In FIG. 21, parts designated by like reference characters have like or corresponding functions described above, further descriptions of which are thus omitted.

Figure 22:
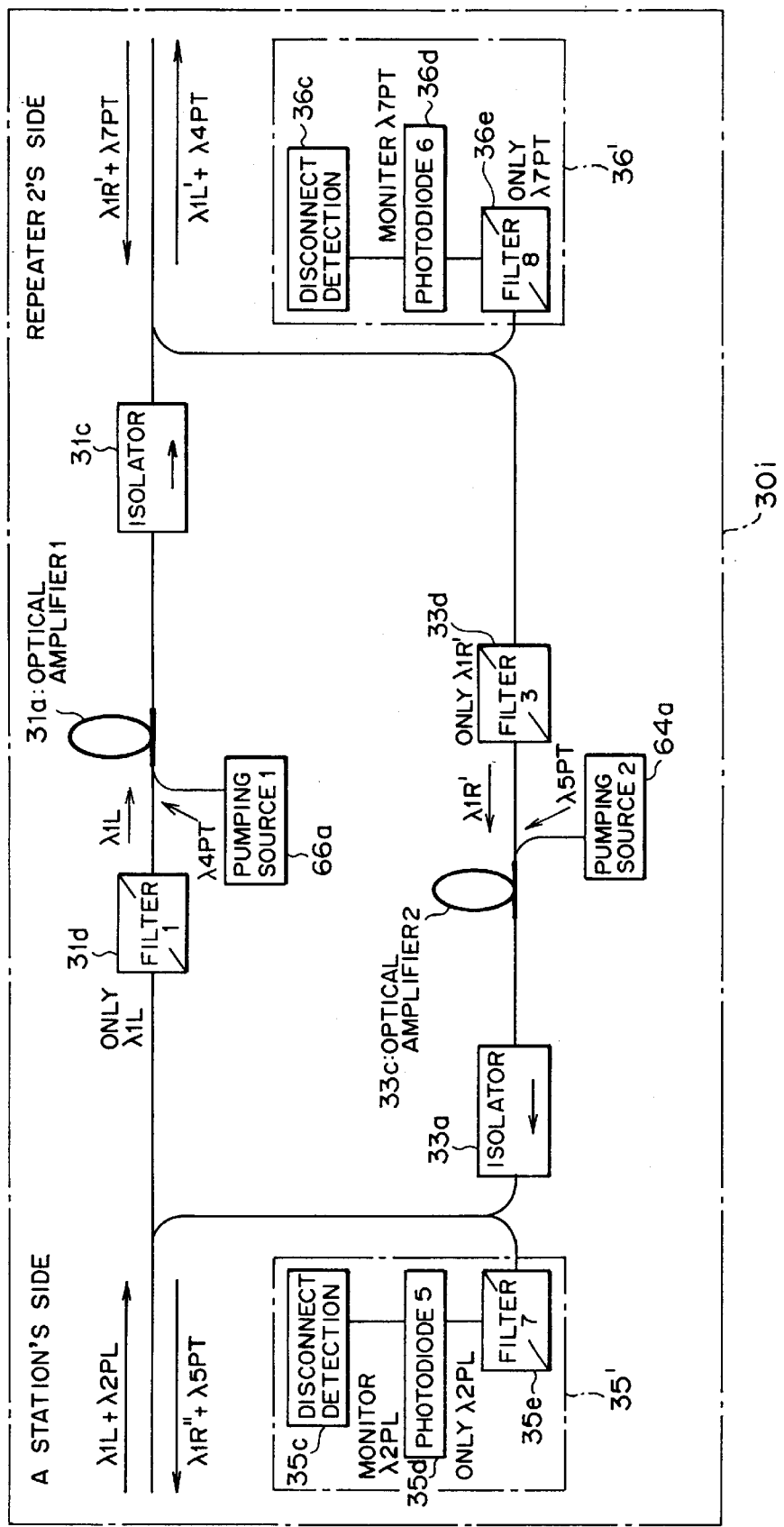
FIG. 22 is a diagram showing an internal structure of a first repeating station according to the ninth modification of the first embodiment of this invention.

FIG. 22 is a diagram showing an internal structure of the first repeating station 30i according to the ninth modification of the first embodiment of this invention. The first repeating station 30i shown in FIG. 22 monitors inputted light from the transmitting station 20b to detect cut by this monitoring function, as compared with the first repeating station 30h (refer to FIG. 20).

A first disconnect detecting means 35' is almost the same as the above first disconnect detecting means 35, but a wavelength that the first disconnect detecting means 35' can detect differs. Namely, the first disconnect detecting means 35' is disposed at an entrance of the first optical fiber to detect cut of the first optical fiber. The first disconnect detecting means 35' comprises a seventh filter (filter 7) 35e, a fifth optical detector (photodiode 5) 35d, and a first disconnect detection outputting means 35c.

The seventh filter 35e extracts residual pumping light (λ2PL) from a received transmission light, and outputs it. The fifth optical detector 35d detects residual pumping light (λ2PL) from the fifth filter 35e. The first disconnect detection outputting means 35c monitors the operation of the fifth optical detector 35d to output information relating to presence/absence of the residual pumping light (λ2PL). In FIG. 22, parts designated by like reference characters have like or coresponding functions described above, further descriptions of which are thus omitted.

In the first repeating station 30i shown in FIG. 22, inputted light (λ1L+λ2PL) from the transmitting station 20b is branched into the three directions; toward a first filter 31d, the first disconnect detecting means 35' and an isolator 33a, using an optical coupler 50 (not shown) or the like. Only λ1L is inputted to the first filter 31d, multiplexed with pumping light λ4PT, inputted to a first optical amplifier 31a, and transmitted along with residual pumping light to the second repeating station 30i'.

The seventh filter 35e of the first disconnect detecting means 35' extracts only residual pumping light λ2PL of the transmitting station 20b, and the fifth optical detector 35d monitors its input, and determines that the optical cable between the transmitting station 20b and the first repeating station 30i is cut when the input dies out.

Transmission light (λ1R"+λ5PT) is sent to the transmitting station 20b. When the optical cable between the transmitting station 20b and the first repeating station 30i is cut, the transmission light is returned as it is to the repeating station 30. In this case, the level of λ5PT does not fall, and λ1R" has the same wavelength as the transmission optical signal λ1L, so that they cannot be used as elements to detect cut.

On the other hand, λ2PL loses its supply source, thus its level falls. For this, cut of the optical cable is detected using λ2PL. Inputted light from the second repeating station 30i' is similar.

Figure 23:
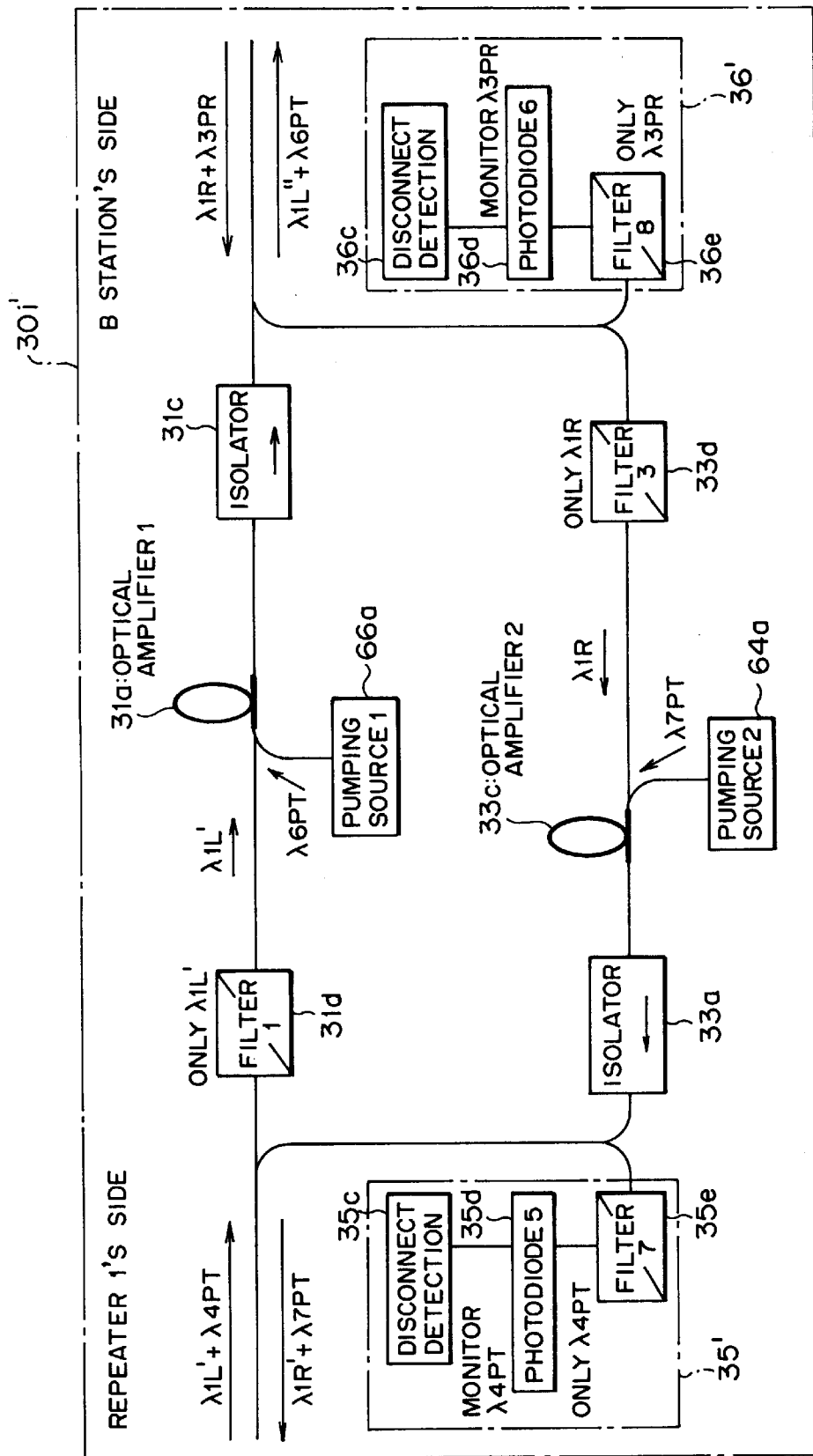
FIG. 23 is a diagram showing an internal structure of a second repeating station according to the ninth modification of the first embodiment of this invention.

FIG. 23 is a diagram showing an internal structure of the second repeating station 30i' according to the ninth modification of the first embodiment of this invention. In the second repeating station 30i' shown in FIG. 23, disconnect detection similar to that in the first repeating station 30i is performed.

A second disconnect detecting means 36' is similar to the above second disconnect detecting means 36, but a wavelength that the second disconnect detecting means 36' can detect is different. Namely, the second disconnect detecting means 36' is disposed at the entrance of a second optical fiber to detect cut of the second optical fiber. The second disconnect detecting means 36' comprises an eighth filter 36e, a sixth optical detector 36d and a second disconnect detection outputting means 36c.

The eighth filter 36e extracts residual pumping light (λ3PR) from a received optical signal, and outputs it. The sixth optical detector 36d detects the residual pumping light (λ3PR) from the eighth filter 36e. The second disconnect detection outputting means 36c monitors the operation of the sixth detector 36d, and outputs information relating to presence/absence of the residual pumping light (λ3PR). In FIG. 23, parts designated by like reference characters have like or corresponding functions, further descriptions of which are thus omitted.

With the above structure, inputted light (λ1L'+λ4PT) from the first repeating station 30i is branched into three directions; toward a first filter 31d, a first disconnect detecting means 35' and an isolator 33a, by an optical coupler 50 or the like (not shown). Only λ1L' is inputted to the first filter 31d, multiplexed with pumping light λ6PT, inputted to a first optical amplifier 31a, and transmitted along with the residual pumping light to the receiving station 40b. A seventh filter 35e of the first disconnect detecting means 35' extracts only residual pumping light λ4PT from the first repeating station 30i, and a fifth optical detector 35d monitors its input. When the input dies out, it is determined that the optical cable between the first repeating station 30i and the second repeating station 30i' is cut.

As shown in FIG. 22, transmission light (λ1R'+λ7PT) is transmitted to the first repeating station 30i. However, when the optical cable between the first repeating station 30i and the second repeating station 30i' is cut, this transmission light is returned as it is to the second repeating station 30i'. In such case, since the level of λ7PT does not fall, and λ1R' has the same wavelength as a transmission light optical signal λ1L from the transmitting station 20b, they cannot be used as elements to detect cut.

On the other hand, λ4PT loses its supply source, thus its level falls. By using this, cut of the optical cable is detected. Inputted light from the receiving station 40b is similar.

As this, the installation cost and maintenance cost of the optical cables are largely decreased, and each of the stations can detect cut of the optical cable, thus reliability and safety of the optical system 10g are remarkably improved.

(A10) Description of Tenth Modification of First Embodiment of the Invention

Figure 24:
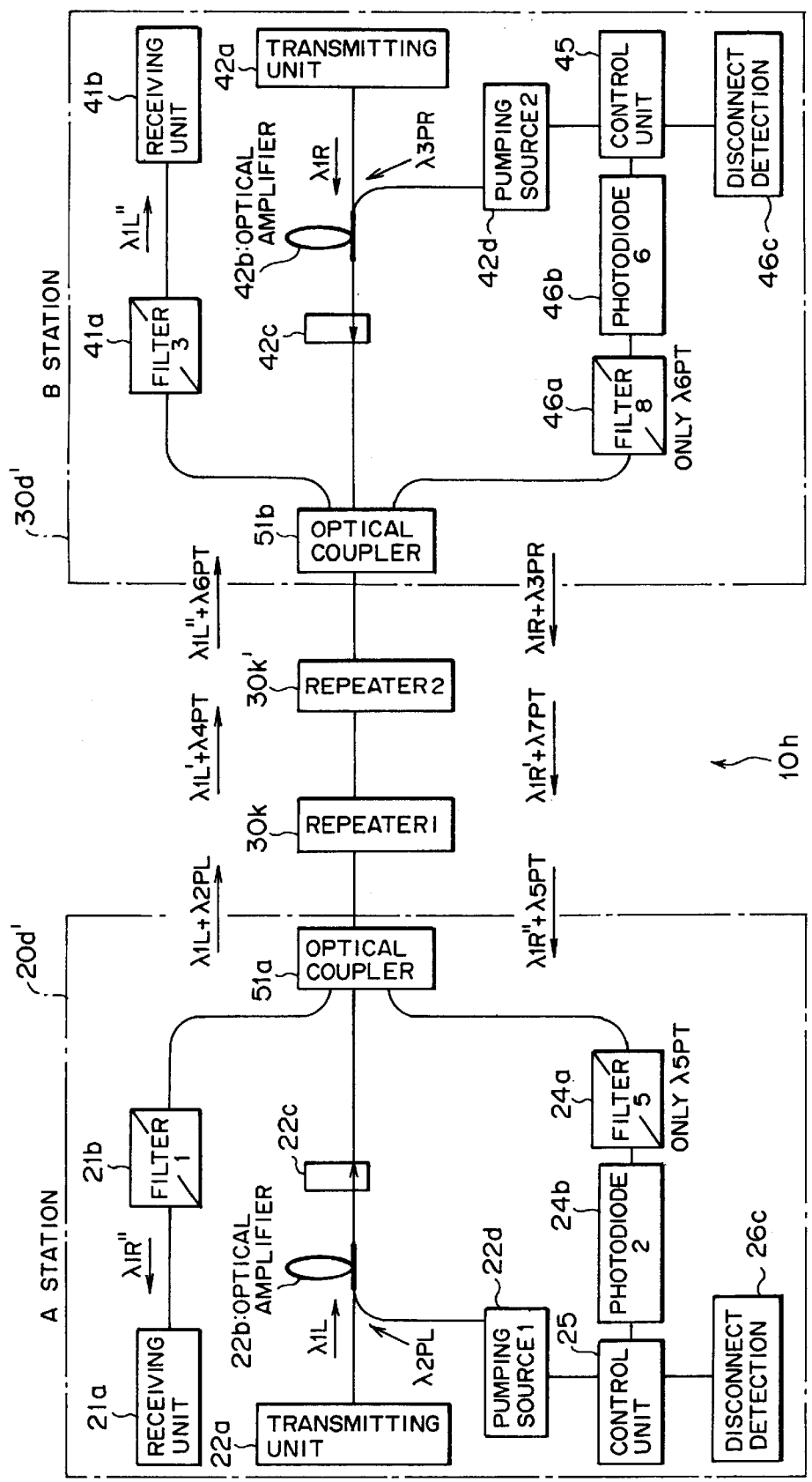
FIG. 24 is a diagram showing a structure of an optical system according to a tenth modification of the first embodiment of this invention.

FIG. 24 is a diagram showing a structure of an optical system according to a tenth modification of the first embodiment of this invention. An optical system 10h shown in FIG. 24 is similar to the optical system described above. A controlling means 25 in a transmitting station 20d' keep monitoring pumping light λ5PT from a first repeating station 30k at all times. When the reception level falls, the controlling means 25 determines that an optical cable between the transmitting station 20d' and the first repeating station 30k is cut, controls a first pumping source 22d in consideration of safety, and stops an output of the first pumping source 22d if necessary. The receiving station 40d' is similar. In FIG. 24, parts designated by like reference characters have like or corresponding functions described above, further descriptions of which are thus omitted.

Figure 25:
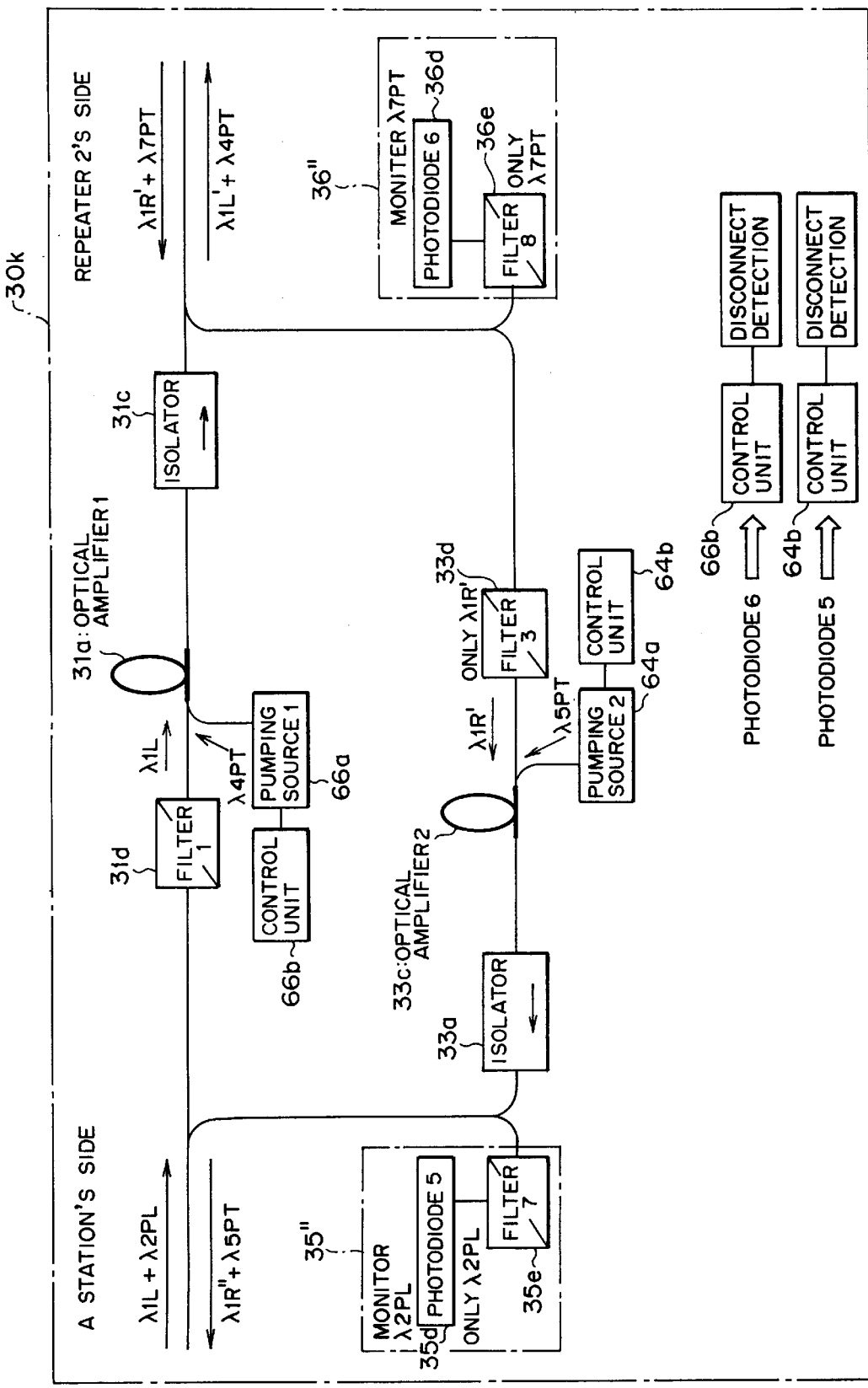
FIG. 25 is a diagram showing an internal structure of a first repeating station according to the tenth modification of the first embodiment of this invention.

FIG. 25 is a diagram showing an internal structure of the first repeating station 30k according to the tenth modification of the first embodiment of this invention. A first pumping light controlling means (control unit) 66b controls an output of a first pumping source (pumping source 1) 66a on the basis of a level of first pumping light (λ4PT) and a level of residual pumping light (λ4PT) in the second repeating station 30k'. A second pumping light controlling means 64b controls an output of a second pumping source 64a (pumping source 2) on the basis of a level of second pumping light (λ5PT) and a level of residual pumping light (λ5PT) in the transmitting station 20d'. In FIG. 25, parts designated by like reference characters have like or corresponding functions described above, further descriptions of which are thus omitted.

Figure 26:
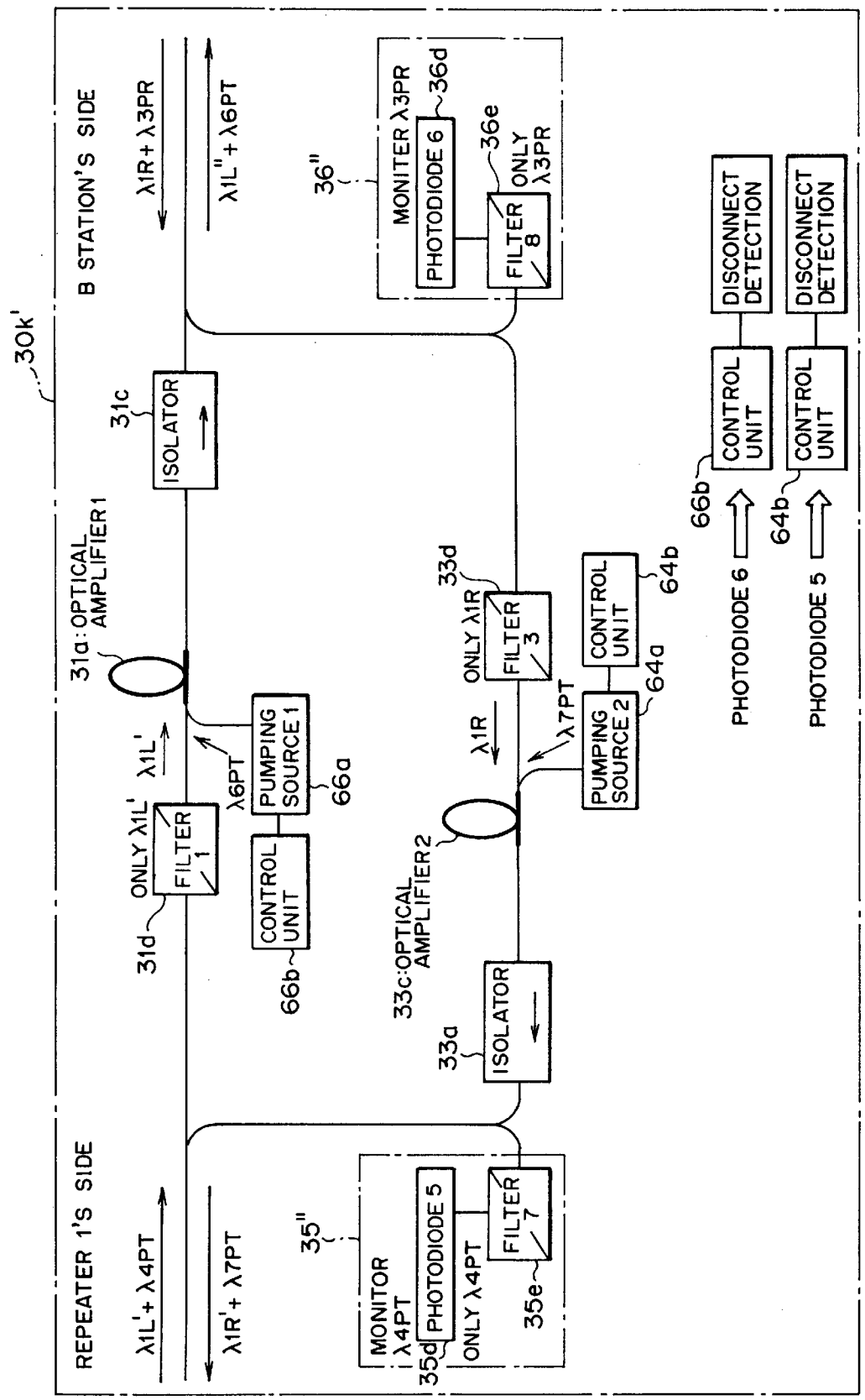
FIG. 26 is a diagram showing an internal structure of a second repeating station according to the tenth modification of the first embodiment of this invention.

FIG. 26 is a diagram showing an internal structure of the second repeating station 30k' according to the tenth modification of the first embodiment of this invention. The first pumping light controlling means (control unit) 66b stops an output of a first pumping source (pumping source 1) 66a when a reception level of first pumping light (λ3PR) falls, and a second pumping source controlling means 64b stops an output of a second pumping source 64a when a reception level of second pumping light (λ4PT) falls. In FIG. 26, parts designated by like reference characters have like same or corresponding functions described above, further descriptions of which are thus omitted.

In the first repeating station 30k shown in FIG. 25, a level of a fifth optical detector 35d (photodiode 5) is always monitored by the first pumping light controlling means 66b. when the reception level falls (when cut is detected), the first pumping light controlling means 66b stops an output of the first pumping source 66a in consideration of safety.

Similarly, a level of a sixth optical detector 36d (photodiode 6) is always monitored by the second pumping light controlling means 64b. When the reception level falls, the second pumping light controlling means 64b stops an output of the second pumping source 64a in consideration of safety.

In the first repeating station 30k' shown in FIG. 26, a level of the fifth optical detector 35d (photodiode 5) is always monitored by the first pumping light controlling means 66b. When the reception level falls, the first pumping light controlling means 66b stops an output of the first pumping source 66a in consideration of safety.

Similarly, a level of the sixth optical detector 36d (photodiode 6) is always monitored by the second pumping light controlling means 64b. When the reception level falls, the second pumping light controlling means 64b stops an output of the second pumping source 64a in consideration of safety.

As this, communication is performed among the stations using only optical cables in one system, and the output level of the pumping source is automatically controlled in each of the stations, which allows the optimum communication. Safe optical transmission becomes possible by the optical cable disconnect detecting function.

(B) Description of Second Embodiment of the Invention

Figure 27:
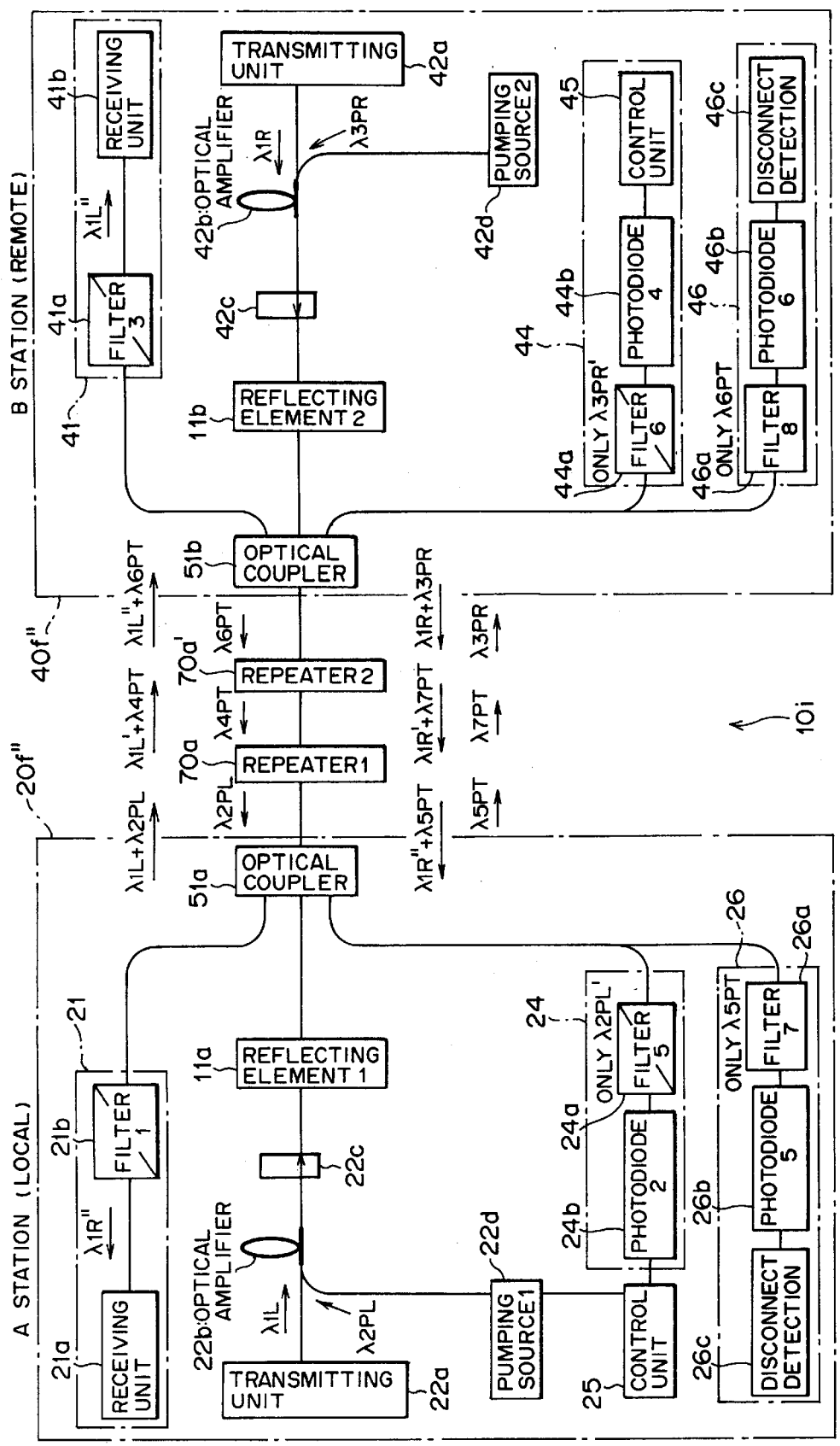
FIG. 27 is a diagram showing a structure of an optical system according to a second embodiment of this invention.

FIG. 27 is a diagram showing a structure of an optical system according to a second embodiment of this invention. An optical system 10*i* shown in FIG. 27 is a similar optical system to those described above. Structures of a transmitting station 20*f* " and a receiving station 40*f* " are equivalent to the transmitting station 20*f* and the receiving station 40*f* shown in FIG. 16 to which disconnect detecting means 26 and 46 are added, and a reflecting means (reflecting element 1) 11*a* and a reflecting means (reflecting element 2) 11*b* are disposed on outputs' side of isolators 22*c* and 42*c*, respectively. Each of these reflecting means 11*a* and 11*b* reflects an optical signal at a specific wavelength contained in a received optical signal, a specific wavelength reflecting element such as a fiber grating or the like being used therefor. In FIG. 27, parts designated by like reference characters have like or corresponding functions described above, further descriptions of which are thus omitted.

Figure 28:
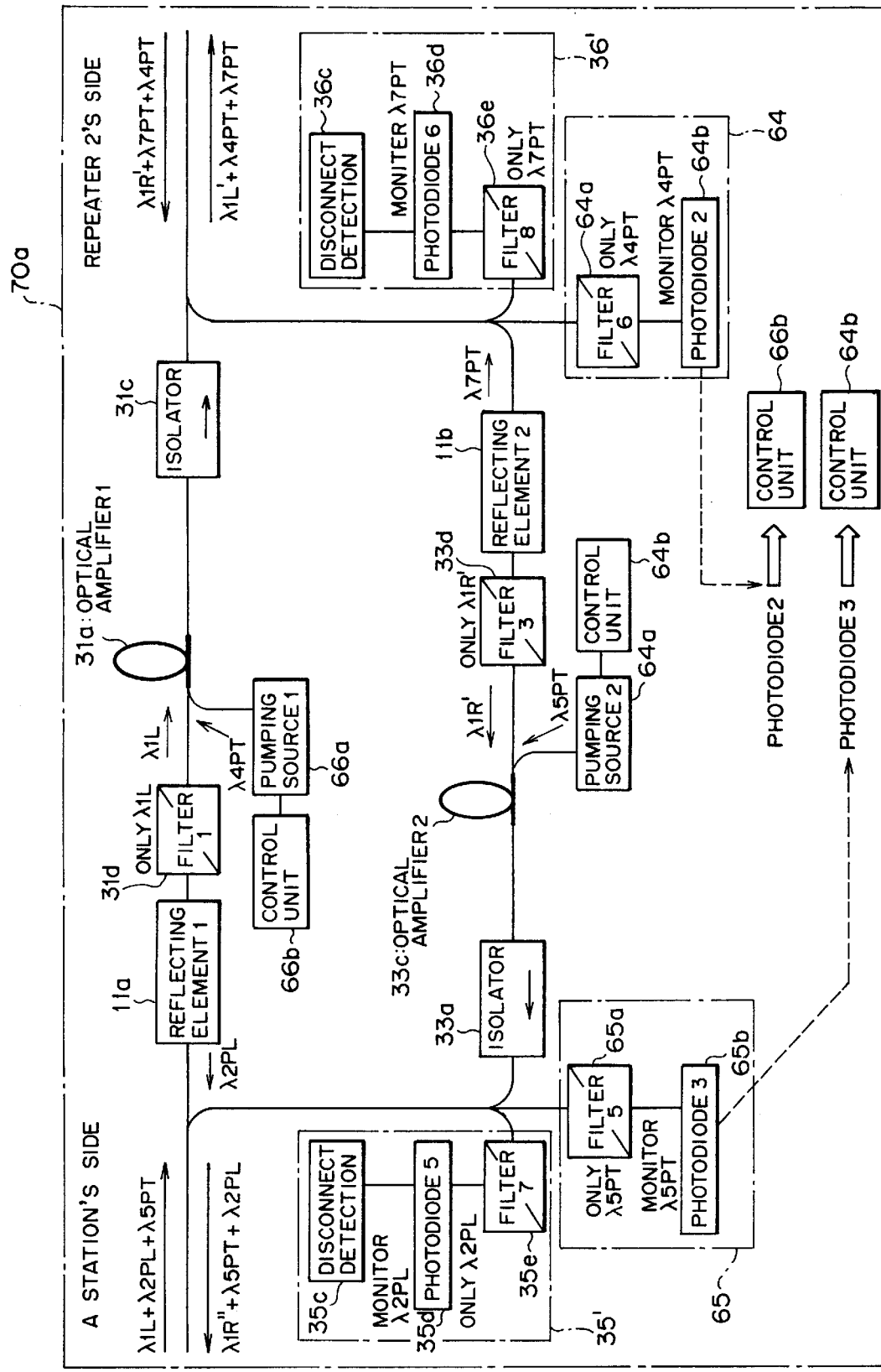
FIG. 28 is a diagram showing an internal structure of a first repeating station according to the second embodiment of this invention.
Figure 29:
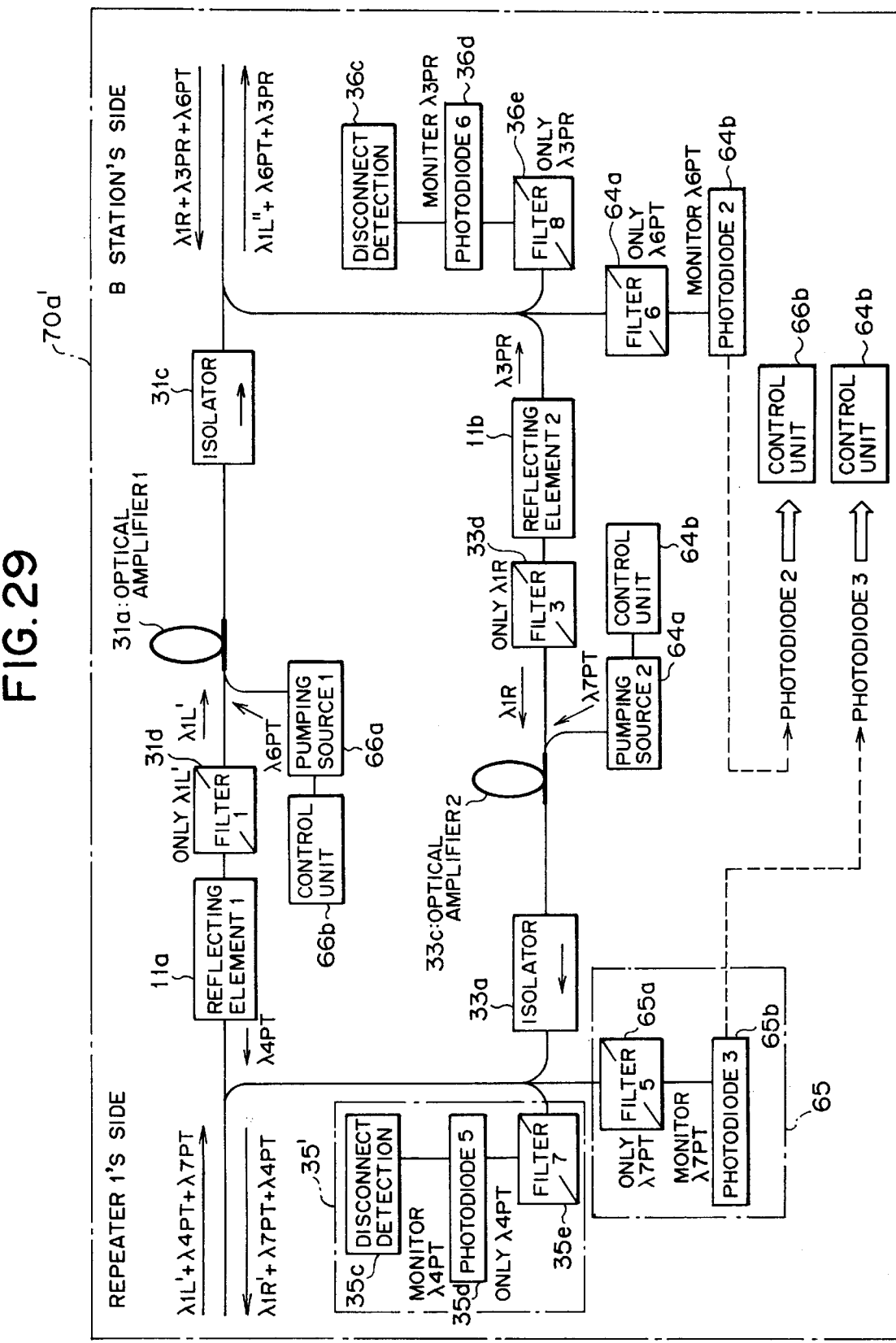
FIG. 29 is a diagram showing an internal structure of a second repeating station according to the second embodiment of this invention.

FIG. 28 is a diagram showing an internal structure of a first repeating station 70*a* according to the second embodiment of this invention. A first repeating station 70*a* shown in FIG. 28 comprises a reflecting means (reflecting element 1) 11*a* at an entrance leading to the transmitting station 20*f*". FIG. 29 is a diagram showing an internal structure of a second repeating station 70*a*' according to the second embodiment of this invention. A second repeating station 70*a*' is similar to the first repeating station 70*a*. In FIGS. 28 and 29, parts designated by like reference characters have like or corresponding functions described above, further descriptions of which are thus omitted.

The first repeating station 70*a* (refer to FIG. 28) comprises a first disconnect detecting means 35', a second disconnect detecting means 36', the reflecting means 11*a*, a first reflected light receiving means 65, a reflecting means (reflecting element 2) 11*b*, and a second reflected light receiving means 64.

The first disconnect detecting means 35' is disposed on the entrance's side of a first optical fiber to detect cut of the first optical fiber. The first disconnect detecting means 35' comprises a seventh filter (filter 7) 35*e*, a fifth optical detector (photodiode 5) 35*d*, and a first disconnect detection outputting means (disconnect detection) 35*c*. The seventh filter 35*e* extracts residual pumping light ($\lambda$2PL) from a received optical signal, and outputs it. The fifth optical detector 35*d* detects the residual pumping light ($\lambda$2PL) from the seventh filter 35*e*. The first disconnect detection outputting means 35*c* monitors the operation of the fifth optical detector 35*d*, and outputs information relating to presence/absence of the residual pumping light ($\lambda$2PL).

The second disconnect detecting means 36' is disposed on the entrance's side of a second optical fiber to detect cut of the second optical fiber. The second disconnect detecting means 36' comprises an eighth filter (filter 8) 36*e*, a sixth optical detector (photodiode 6) 36*d*, and a second disconnect detection outputting means (disconnect detection) 36*c*. The eighth filter 36*e* extracts residual pumping light ($\lambda$7PT) from a received optical signal, and outputs it. The sixth optical detector 36*d* detects the residual pumping light ($\lambda$7PT) from the eighth filter 36*e*. The second disconnect detection outputting means 36*c* monitors the operation of the sixth optical detector 36*d*, and outputs information relating to presence/absence of the residual pumping light ($\lambda$7PT).

The reflecting means 11*a* is disposed on the input's side of a first optical amplifier 31*a* to reflect an optical signal ($\lambda$2PL) at a specific wavelength contained in a received optical signal, a specific wavelength reflecting element such as a fiber grating or the like being used therefor.

The first reflected light receiving means 65 is disposed on the input's side of the first optical amplifier 31*a* to detect residual pumping light ($\lambda$5PT) contained in a received optical signal, thereby detecting a level of the residual pumping light ($\lambda$5PT). The first reflected light receiving means 65 comprises a fifth filter (filter 5) 65*a*, and a third optical detector (photodiode 3) 65*b*.

The fifth filter 65*a* is disposed on the input's side of the first optical amplifier 31*a* to detect residual pumping light ($\lambda$5PT) contained in a received optical signal. The third optical detector 65*b* detects a level of the residual pumping light ($\lambda$5PT) outputted from the fifth filter 65*a*.

The reflecting means 11*b* is disposed on the input's side of a second optical amplifier 33*c* to reflect an optical signal ($\lambda$7PT) at a specific wavelength contained in the received optical signal, a specific wavelength reflecting element such as a fiber grating or the like being used therefor.

The second reflected light receiving means 64 is disposed on the input's side of the second optical amplifier 33*c* to detect residual pumping light ($\lambda$4PT) contained in a received optical signal, thereby detecting a level of the residual pumping light ($\lambda$4PT). The second reflected light receiving means 64 comprises a sixth filter (filter 6) 64*a*, and a second optical detector (photodiode 2) 64*b*.

The sixth filter 64*a* is disposed on the input's side of the second optical amplifier 33*c* to detect residual pumping light ($\lambda$4PT) contained in a received optical signal. The second optical detector 64*b* detects a level of the residual pumping light ($\lambda$4PT).

Whereby, $\lambda$5PT (pumping light inside the first repeating station 70*a*, for amplifying a signal from the receiving station 40*f*") is sent back to the first repeating station 70*a* by the reflecting means 11*a* in the transmitting station 20*f*". Similarly, $\lambda$6PT (pumping light inside the second repeating station 70*a*', for amplifying a signal from the transmitting station 20*f*") is sent back to the second repeating station 70*a*' by the reflecting means 11*b* in the receiving station 40*f*".

To detect cut of the optical fiber between the transmitting station 20*f*" and the first repeating station 70*a*, residual pumping light $\lambda$5PT from the first repeating station 70*a* is monitored by the fifth filter 65*a*, and it is determined that the optical cable is cut when the input dies out.

In the transmitting station 20*f*", a level of residual pumping light $\lambda$2PL reflected by the reflecting means 11*a* in the first repeating station 70*a* is monitored by the second optical detector 64*b*, an actual transmission loss between the transmitting station 20*f*" and the first repeating station 70*a* is calculated, a first pumping source 22*d* is adjusted by a controlling means 25 so as to yield the optimum amplification factor, whereby the output level to the first repeating station 70*a* is controlled.

In FIG. 28, inputted light ($\lambda$1L+$\lambda$2PL+$\lambda$5PT) from the transmitting station 20*f*" is branched into three directions; toward the reflecting means 11*a*, the fifth filter 65*a* and the seventh filter 35*e*, by an optical coupler 50 or the like (not shown). A $\lambda$2PL component of the light toward the reflecting means 11*a* is reflected by the reflecting means 11*a*, thus only ($\lambda$1L+$\lambda$5PT) components are inputted to a first filter 31*d*. Only an optical signal component $\lambda$1L is extracted by the first filter 31*d*, and multiplexed with pumping light $\lambda$4PT. The multiplexed optical component is inputted to the first optical amplifier 31*a*, and transmitted along with residual pumping light to the second repeating station 70*a*'.

In the second direction, only the residual pumping light $\lambda$5PT reflected by the reflecting means 11*a* in the transmitting station 20$f''$ is extracted by the fifth filter 65$a$, an input level thereof is monitored by the third optical detector 65$b$. This monitor value is read by a second pumping light controlling means 64$b$, an actual transmission loss between the transmitting station 20$f''$ and the first repeating station 70$a$ is calculated by a second pumping light controlling means 64$b$, and a second pumping source 64$a$ is so adjusted as to yield the optimum amplification factor. Whereby, the output level to the transmitting station 20$f''$ is controlled.

In the third direction, only the residual pumping light $\lambda$2PL of the transmitting station 20$f''$ is extracted by the seventh filter 35$e$, and an input thereof is monitored by the fifth optical detector 35$d$. When the input dies out, it is determined that the optical cable between the transmitting station 20$f''$ and the first repeating station 70$a$ is cut.

In FIG. 29, between the receiving station 40$f''$ and the second repeating station 70$a'$, the residual pumping light $\lambda$3PR from the receiving station 40$f''$ is monitored by a sixth optical detector 36$d$ (photodiode 6), and it is determined that the optical cable disconnects when the input goes out, as well.

Inputted light ($\lambda$1L L'+$\lambda$4PT+$\lambda$7PT) from the first repeating station 70$a$ is branched into three directions; toward a reflecting means 11$a$, a fifth filter 65$a$ and a seventh filter 35$e$, by an optical coupler 50 or the like (not shown).

In the first direction, only $\lambda$4PT is reflected by the reflecting means 11$a$, and only ($\lambda$1L'+$\lambda$7PT) components are inputted to a first filter 31$d$. Only an optical signal component $\lambda$1L' is extracted by the first filter 31$d$, multiplexed with pumping light $\lambda$6PT, inputted to a first optical amplifier 31$a$, and transmitted along with residual pumping light to the receiving station 40$f'''$.

In the second direction, only the residual pumping light $\lambda$7PT reflected by the reflecting means 11$b$ in the first repeating station 70$a$ is extracted by the fifth filter (filter 5) 65$a$, an input level thereof is monitored by the third optical detector 65$b$, an actual transmission loss between the first repeating station 70$a$ and the second repeating station 70$a'$ is calculated, a second pumping source 64$a$ is adjusted by the second pumping source controlling means 64$b$ so as to yield the optimum amplification factor, whereby the output level to the first repeating station 70$a$ is controlled.

In the third direction, only the residual pumping light $\lambda$4PT in the first repeating station 70$a$ is extracted by the seventh filter (filter 7) 35$e$, the input thereof is monitored by the fifth filter 65$a$. When the input dies out, it is determined that the optical fiber between the first repeating station 70$a$ and the second repeating station 70$a'$ is cut.

With the above structure, transmission light to the transmitting station 20$f''$ has three components; $\lambda$1R'', $\lambda$5PT and $\lambda$2PL, and they are returned as they are when the optical cable between the transmitting station 20$f''$ and the first repeating station 70$a$ is cut. In such case, a level of $\lambda$5PT does not fall and $\lambda$1R'' is at the same wavelength as the transmission optical signal $\lambda$1L from the transmitting station 20$f''$, hence they can not be used as detecting elements to detect cut.

On the other hand, $\lambda$2PL loses its supply source, and its level falls. By detecting disconnection of inputs of $\lambda$2PL, it is possible to detect cut of the optical cable. Incidentally, inputted light from the first repeating station 70$a$ is similar.

By inserting the specific wavelength reflecting elements (reflecting means 11$a$ and 11$b$), it is possible to calculate an actual transmission loss between the stations irrespective of a gain control in the opposite station, and a gain control on the transmission light suitable for it becomes possible.

In FIG. 29, transmission light to the first repeating station 70$a$ has $\lambda$1R', $\lambda$7PT and $\lambda$4PT, and they are returned as they are to the second repeating station 70$a'$ when the optical cable between the first repeating station 70$a$ the second repeating station 70$a'$ is cut. In such case, the level of $\lambda$7PT does not fall, and $\lambda$1R' is at the same wavelength as the optical signal $\lambda$1L' from the first repeating station 70$a$, thus they cannot be used as detecting elements to detect cut. On the other hand, $\lambda$4PT loses its supply source, thus its level falls. By detecting disconnection of the inputs of $\lambda$4PT, it is possible to detect cut of the optical cable. Incidentally, inputted light from the receiving station 40$f'''$ is similar.

As above, communication is performed among the stations using only the optical cables in one system, and the output level of the pumping source is automatically controlled in each of the stations, which allows the optimum communication.

As this, the installation cost and maintenance cost of the optical cables are largely decreased, and each of the stations can detect cut of the optical cable, so that reliability and safety of the optical system 10$i$ is remarkably improved.

(B1) Description of First Modification of Second Embodiment of the Invention

Figure 30:
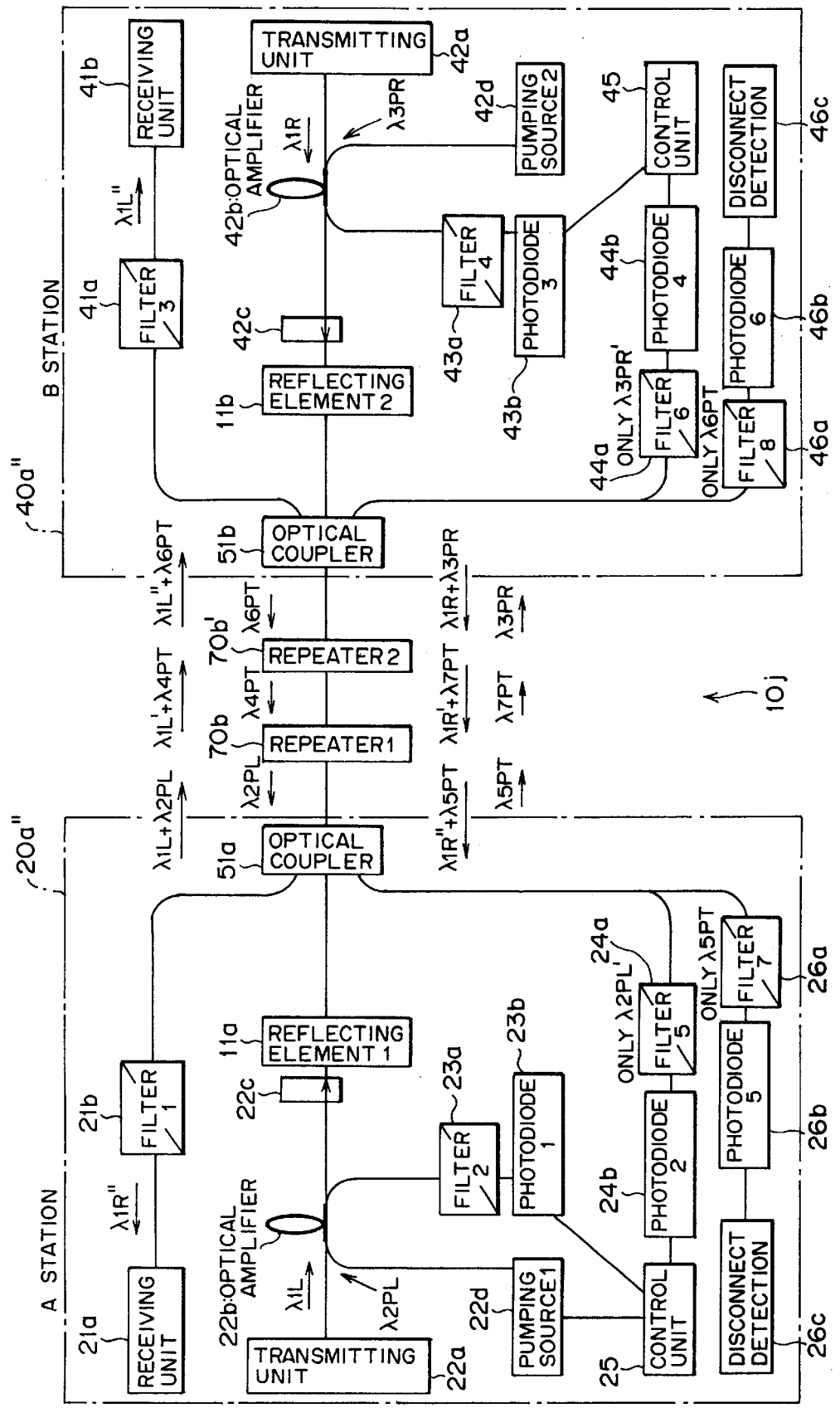
FIG. 30 is a diagram showing a structure of an optical system according to a first modification of the second embodiment of this invention.

FIG. 30 is a diagram showing a structure of an optical system according to a first modification of the second embodiment of this invention. An optical system 10$j$ shown in FIG. 30 is similar to that described above. A transmitting station 20$a''$ and a receiving station 40$a''$ shown in FIG. 30 are similar to the transmitting station 20$a$ and the receiving station 40$a$ described in the second modification (refer to FIG. 5) of the first embodiment. In the transmitting station 20$a$, a reflecting means (reflecting element 1) 11$a$ is provided on the output's side of the optical amplifier 22$b$. In the receiving station 40$a$, a reflecting means (reflecting element 2) 11$b$ is provided on the output's side of the optical amplifier 42$b$.

Figure 31:
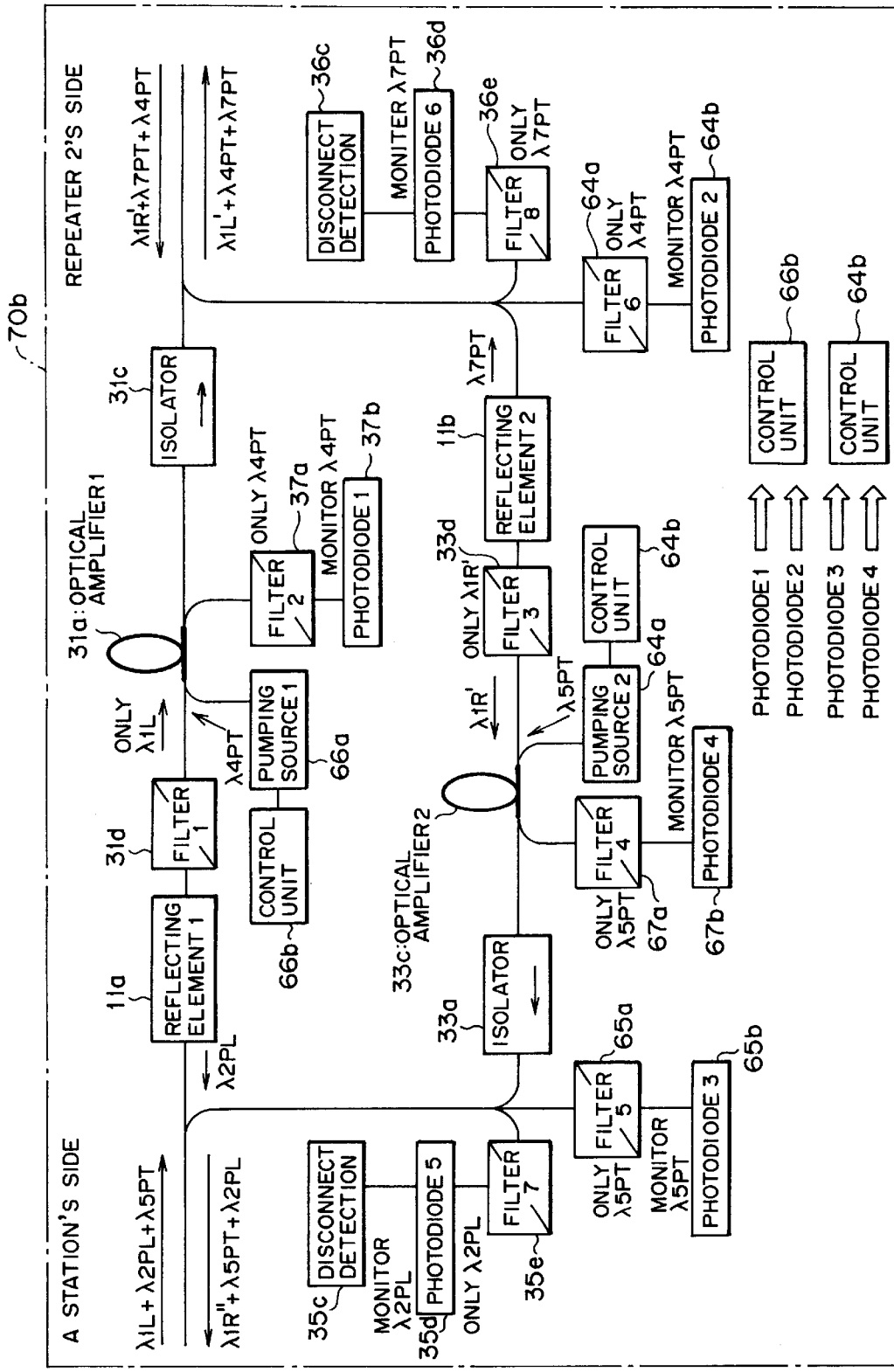
FIG. 31 is a diagram showing an internal structure of a first repeating station according to the first modification of the second embodiment of this invention.
Figure 32:
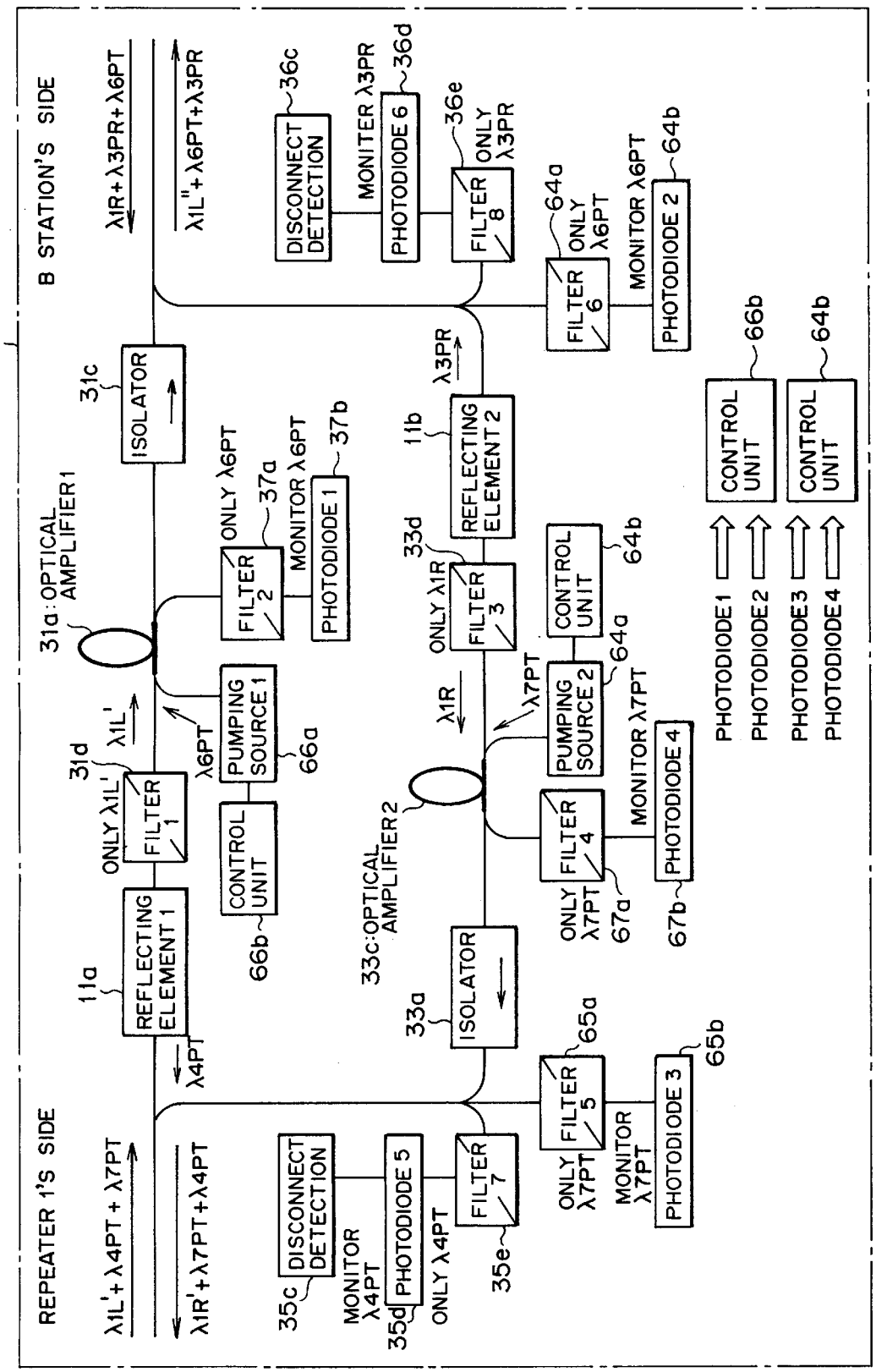
FIG. 32 is a diagram showing an internal structure of a second repeating station according to a first modification of the second embodiment of this invention.

FIG. 31 is a diagram showing an internal structure of a first repeating station 70$b$ according to the first modification of the second embodiment of this invention. FIG. 32 is a diagram showing an internal structure of a second repeating station 70$b'$ according to the first modification of the second embodiment of this invention. The stations shown in FIGS. 31 and 32 are similar to those shown in FIGS. 28 and 29, respectively, in each of which monitoring means are provided on the outputs' side of a first optical amplifiers 31$a$ and a second optical amplifier 33$c$. The first repeating station 70$b$ comprises a second filter (filter 2) 37$a$, a first optical detector (photodiode 1) 37$b$, a fourth filter (filter 4) 67$a$ and a fourth optical detector (photodiode 4) 67$b$.

The second filter 37$a$ is disposed on the output's side of the first optical amplifier 31$a$ to extract first pumping light ($\lambda$4PT), and outputs it. The first optical detector 37$b$ displays a level of a first transmission light ($\lambda$4PT) outputted from the second filter 37$a$. The fourth filter 67$a$ is disposed on the output's side of the second optical amplifier 33$c$ to extract second pumping light ($\lambda$5PT), and outputs it. The fourth optical detector 67$b$ displays a level of the second transmission light ($\lambda$5PT) extracted by the fourth filter 67$a$.

Namely, the first repeating station 70$b$ comprises the second filter 37$a$ disposed on the output's side of the first optical amplifier 31$a$ to extract the first pumping light ($\lambda$4PT) and output it, the first optical detector 37$b$ displaying a level of the first transmission light ($\lambda$4PT) outputted from the second filter 37$a$, the fourth filter 67$a$ disposed on the output's side of the second optical amplifier 33$c$ to extract the second pumping light ($\lambda$5PT) and output it, and a fourth optical detector 67$b$ displaying a level of the second transmission light ($\lambda$5PT) extracted by the fourth filter 67$a$.

In FIGS. 30 and 31, parts designated by like reference characters have like or corresponding functions described above, further descriptions of which are thus omitted.

Inputted light ($\lambda$1L+$\lambda$2PT +$\lambda$5PT) from the transmitting station 20a" is branched into three directions; toward a reflecting means 11a, a fifth filter 65a and a seventh filter 35e, by an optical coupler 50 or the like (not shown).

Since the reflecting means 11a reflects only $\lambda$2PT, only ($\lambda$1L+$\lambda$5PT) components are inputted to a first filter 31d. Only an optical signal component $\lambda$1L is extracted by the first filter 31d, multiplexed with pumping light $\lambda$4PT, inputted to the first optical amplifier 31a, and transmitted along with residual pumping light to the second repeating station 70c.

The residual pumping light $\lambda$5PT reflected by the reflecting means 11a in the transmitting station 20a" is extracted by the fifth filter 65a, and an input level thereof is monitored by a third optical detector 65b.

Only the residual pumping light $\lambda$2PL of the transmitting station 20a" is extracted by the seventh filter 35e, and an input thereof is monitored by a fifth optical detector 35d. When the input dies out, it is determined that the optical cable between the transmitting station 20a" and the first repeating station 70b is cut. Transmission light to the transmitting station 20a" has ($\lambda$1R"+$\lambda$5PT+$\lambda$2PL) components. When the optical cable between the transmitting station 20a" and the first repeating station 70b is cut, these components are returned as they are to the first repeating station 70b. In which case, a level of $\lambda$5PT does not fall, and $\lambda$1R" is at the same wavelength as the transmission optical signal $\lambda$1L from the transmitting station 20a", hence they cannot be used as detecting elements to detect cut.

On the other hand, $\lambda$2PL loses its supply source, and its level falls. Accordingly, by detecting disconnection of inputs of $\lambda$2PL, it is possible to detect cut of the optical cable. When an input of $\lambda$7PT dies out, it is determined that the optical cable is cut, as well as inputted light from the second repeating station 70b'.

In the second repeating station 70b' shown in FIG. 32, inputted light ($\lambda$1L'+$\lambda$4PT +$\lambda$7PT) from the first repeating station 70b is branched into three directions; toward a reflecting means 11a, a fifth filter 65a and a seventh filter 35e, by an optical coupler 50 or the like (not shown).

The reflecting means 11a reflects only $\lambda$4PT, thus only ($\lambda$1L'+$\lambda$7PT) components are inputted to a first filter 31d. Only an optical signal component $\lambda$1L' is extracted by the first filter 31d, multiplexed with pumping light $\lambda$6PT, inputted to the first optical amplifier 31a, and transmitted along with residual pumping light to the receiving station 40a".

Only the residual pumping light $\lambda$7PT reflected by the reflecting means 11b in the first repeating station 70b is extracted by the fifth filter 65a, and an input level thereof is monitored by a third optical detector 65b.

Only the residual pumping light $\lambda$4PT of the first repeating station 70b is extracted by the seventh filter 35e, and input thereof is monitored by a fifth optical detector 35d. When the input dies out, it is determined that the optical cable between the first repeating station 70b and the second repeating station 70c is cut.

Transmission light to the first repeating station 70b has ($\lambda$1R'+$\lambda$7PT+$\lambda$4PT) components. When the optical cable between the first repeating station 70b and the second repeating station 70c is cut, the transmission light are returned as it is to the second repeating station 70c. In which case, the level of $\lambda$7PT does not fall, and $\lambda$1R' is at the same wavelength as the transmission optical signal $\lambda$1L' from the first repeating station 70b, hence they cannot be used as detecting elements to detect cut.

On the other hand, $\lambda$4PT loses its supply source, thus the level thereof falls. Accordingly, by detecting disconnection of inputs of $\lambda$PT, it is possible to detect cut of the optical cable. Inputted light from the receiving station 40a" is similar.

With the above structure in FIG. 30, $\lambda$5PT (pumping light for amplifying a signal from the receiving station 40a", inside the first repeating station 70b) is looped back by the reflecting means 11a in the transmitting station 20a" to the first repeating station 70b. Similarly, $\lambda$6PT (pumping light for amplifying a signal from the transmitting station 20a", inside the second repeating station 70b") is looped back to the second repeating station 70b" by the reflecting means 11b in the receiving station 40a".

Residual pumping light $\lambda$5PT from the first repeating station 70b is kept to be monitored by a fifth optical detector 35d. When input thereof dies out, it is determined that the optical cable between the transmitting station 20a" and the first repeating station 70b is cut.

Residual pumping light $\lambda$6PT from the second repeating station 70b' is kept to be monitored by a sixth optical detector 36d between the receiving station 40a" and the second repeating station 70b', as well. When input thereof dies out, it is determined that the optical cable is cut.

As this, since an amplified optical level is determined from not a theoretical value but a measured value, a more accurate gain control becomes possible. Communication is performed among the stations using only optical cables in one system, and the output level of the pumping source is automatically controlled in each of the stations, which allows the optimum communication.

As this, the installation cost and maintenance cost of the optical cables are largely decreased, and each of the stations can detect cut of the optical cable, which allows reliability and safety of the optical system 10j to be remarkably improved.

(B2) Description of Second Modification of Second Embodiment of the Invention

Figure 33:
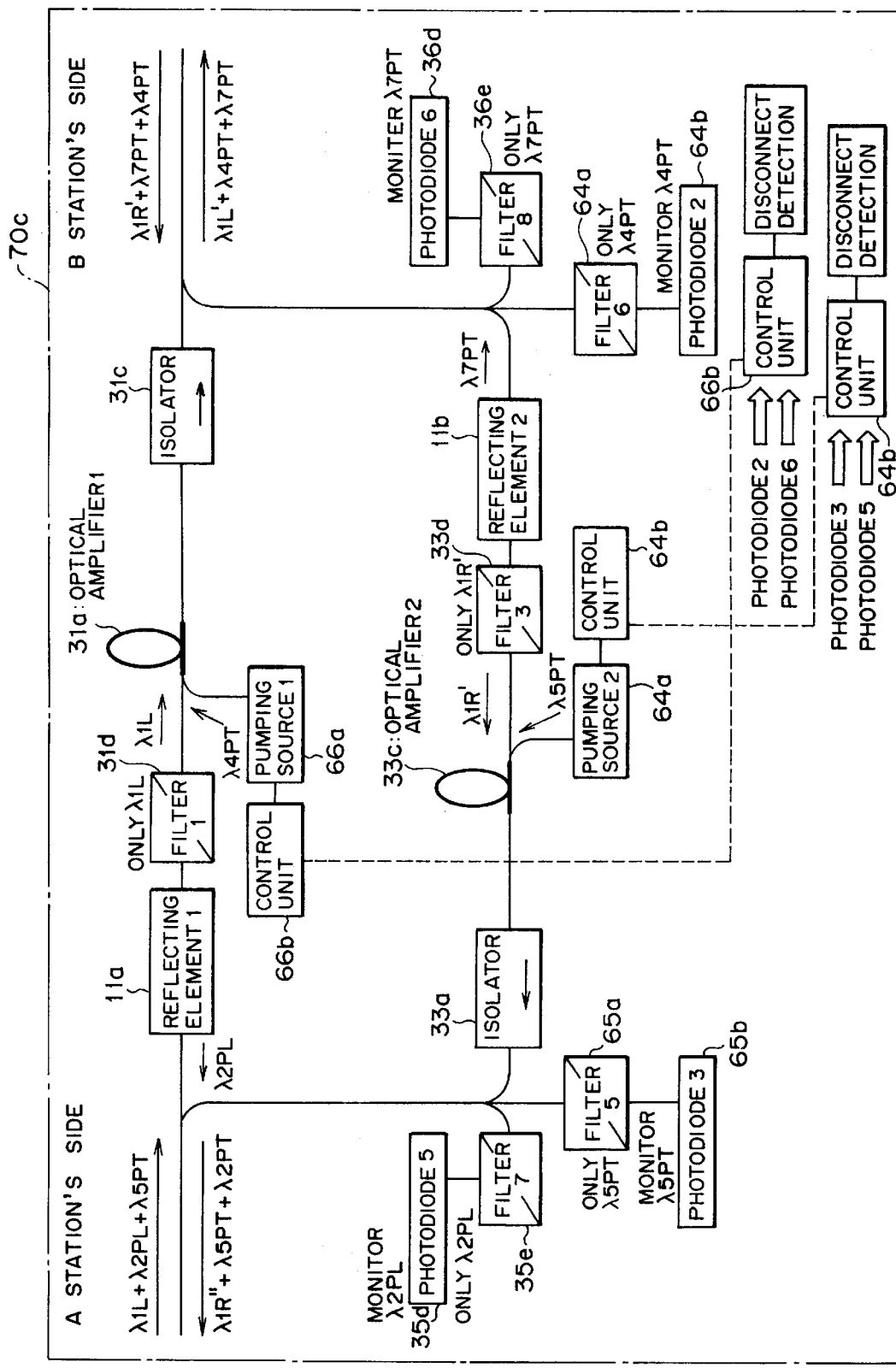
FIG. 33 is a diagram showing a structure of a first repeating station according to a second modification of the second embodiment of this invention.

FIG. 33 is a diagram showing a structure of a first repeating station according to a second modification of the second embodiment of this invention. A first repeating station 70c (and a second repeating station 70c') shown in FIG. 33 performs a transmission level control between the stations. As the disconnect detecting method, a relationship of fluctuations in output level of a first pumping source 66a is confirmed, then cut of the optical cable is determined. Incidentally, the optical system according to this modification is identical to the optical system 10i shown in FIG. 27.

The first repeating station 70c (or the second repeating station 70c') comprises a reflecting means (reflecting element 1) 11a, a fifth filter (filter 5) 65a, a third optical detector (photodiode 3) 65b, a seventh filter (filter 7) 35e, a fifth optical detector (photodiode 5) 35d, a reflecting means (reflecting element 2) 11b, a sixth filter (filter 6) 64a, a second optical detector (photodiode 2) 64b, an eighth filter (filter 8) 36e, and a sixth optical detector (photodiode 6) 36d.

The reflecting means 11a is disposed on the input's side of a first filter 31d to reflect light at a specific wavelength contained in a received optical signal. The fifth filter 65a extracts residual pumping light ($\lambda$5PT) from an optical signal from an optical transmitting apparatus's side (refer to the transmitting station 20f" in FIG. 27), and outputs it. The third optical detector 65b detects the residual pumping light ($\lambda$5PT) from the fifth filter 65a.

The seventh filter 35e extracts residual pumping light ($\lambda$2PL) from an optical signal from the optical transmitting apparatus's side, and outputs it. The fifth optical detector 35d detects the residual pumping light ($\lambda$2PL) outputted from the filter 35e. The reflecting means 11b is disposed on the input's side of a filter 33d to reflect light at a specific wavelength.

The sixth filter 64a extracts residual pumping light (λ4PT) from an optical signal from the optical receiving apparatus's side, and outputs it. The second optical detector 64b detects the residual pumping light (λ4PT) from the filter 64a. The eighth filter 36e extracts residual pumping light (λ7PT) from an optical signal from the optical receiving apparatus's side, and outputs it. The sixth optical detector 36d detects the residual pumping light (λ7PT) outputted from the eighth filter 36e.

In FIG. 33, parts designated by like reference characters have like or corresponding functions described above, further descriptions of which are thus omitted.

Flows of operations of the first pumping source 66a and a first pumping light controlling means 66b are as follows. Incidentally, the second pumping light controlling means 64b is similar.

First, a level of reception light of the second optical detector 64b is detected, and a reception level of the sixth optical detector 36d is monitored.

While cut is not detected, the reception level of the sixth optical detector 36d is constant, an actual transmission loss between the first repeating station 70c and the second repeating station 70c' is calculated on the basis of an input level of the second optical detector 64b, and the first pumping source 66a is such controlled as to yield the optimum optical amplified output.

When cut is detected, the reception level of the sixth optical detector 36d falls, which causes fluctuation in bias current or the like of the first pumping source 66a. This fluctuation causes fluctuation in output level of the pumping light λ4PT. For this, a relationship between the fluctuation in optical level (optical level reflected by a cross section of the optical fiber and returned) detected by the second optical detector 64b and the fluctuation in pumping light output level is confirmed, then it is determined that the optical cable disconnects.

With the above structure, an example of operation of the first pumping light controlling means 66b is as described in (r1) through (r3) below. Incidentally, the second pumping light controlling means 64b is similar.

(r1) A level of reception light of the second optical detector 64b is detected, and a reception level of the sixth optical detector 36d is kept monitored.

(r2) When the reception level of the sixth optical detector 36d is constant (while cut is not detected) an actual transmission loss between the first repeating station 70c and the second repeating station 70c' is calculated on the basis of an input level of the second optical detector 64b, and the first pumping source 22d is such controlled as to yield the optimum optical amplified output.

(r3) When the reception level of the sixth optical detector 36d falls (when cut is detected), the bias current or the like of the first pumping source 22d is fluctuated, whereby the output level of the pumping light λ4PT is fluctuated. Therefore, a relationship between the fluctuation in optical level (optical level reflected by a cross section of the optical cable and returned) detected by the second optical detector 64b and the fluctuation in pumping light output level is confirmed, cut of the optical cable is then detected.

As this, after a relationship of fluctuation in output level of the first pumping source 66a is confirmed, cut of the optical cable is determined, and the control is performed by calculating an amplified optical level with a theoretical value. This allows an accurate control.

(B3) Description of Third Modification of Second Embodiment of the Invention

Figure 34:
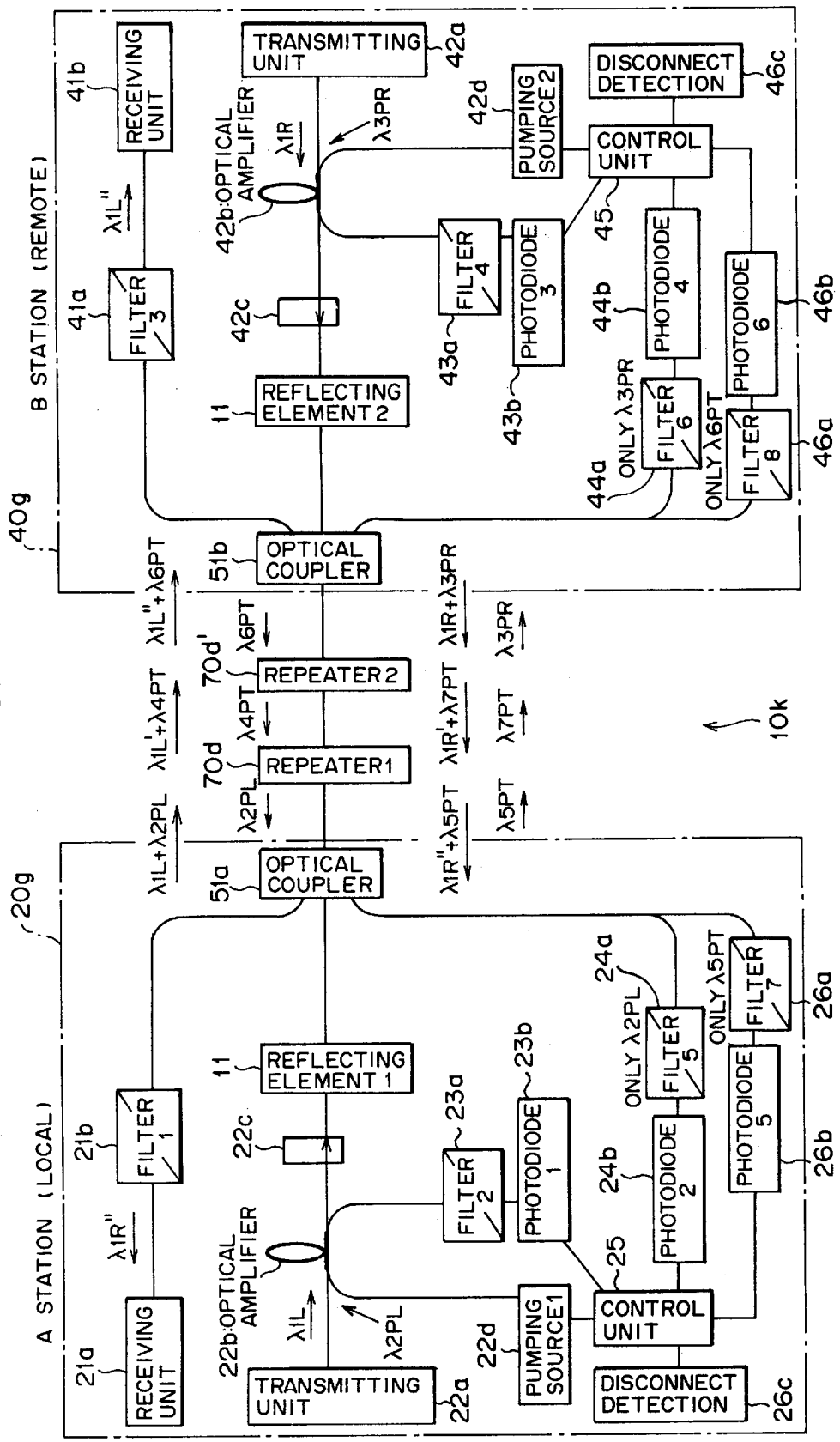
FIG. 34 is a diagram showing a structure of an optical system according to a third modification of the second embodiment of this invention.

FIG. 34 is a diagram showing a structure of an optical system according to a third modification of the second embodiment of this invention. An optical system 10k shown in FIG. 34 comprises a transmitting station 20g, a first repeating station 70d, a second repeating station 70d' and a receiving station 40g. The optical system 10k is equivalent to the optical system 10i (refer to FIG. 27) in which an output monitoring function is additionally provided to the transmitting side and the receiving side.

Figure 35:
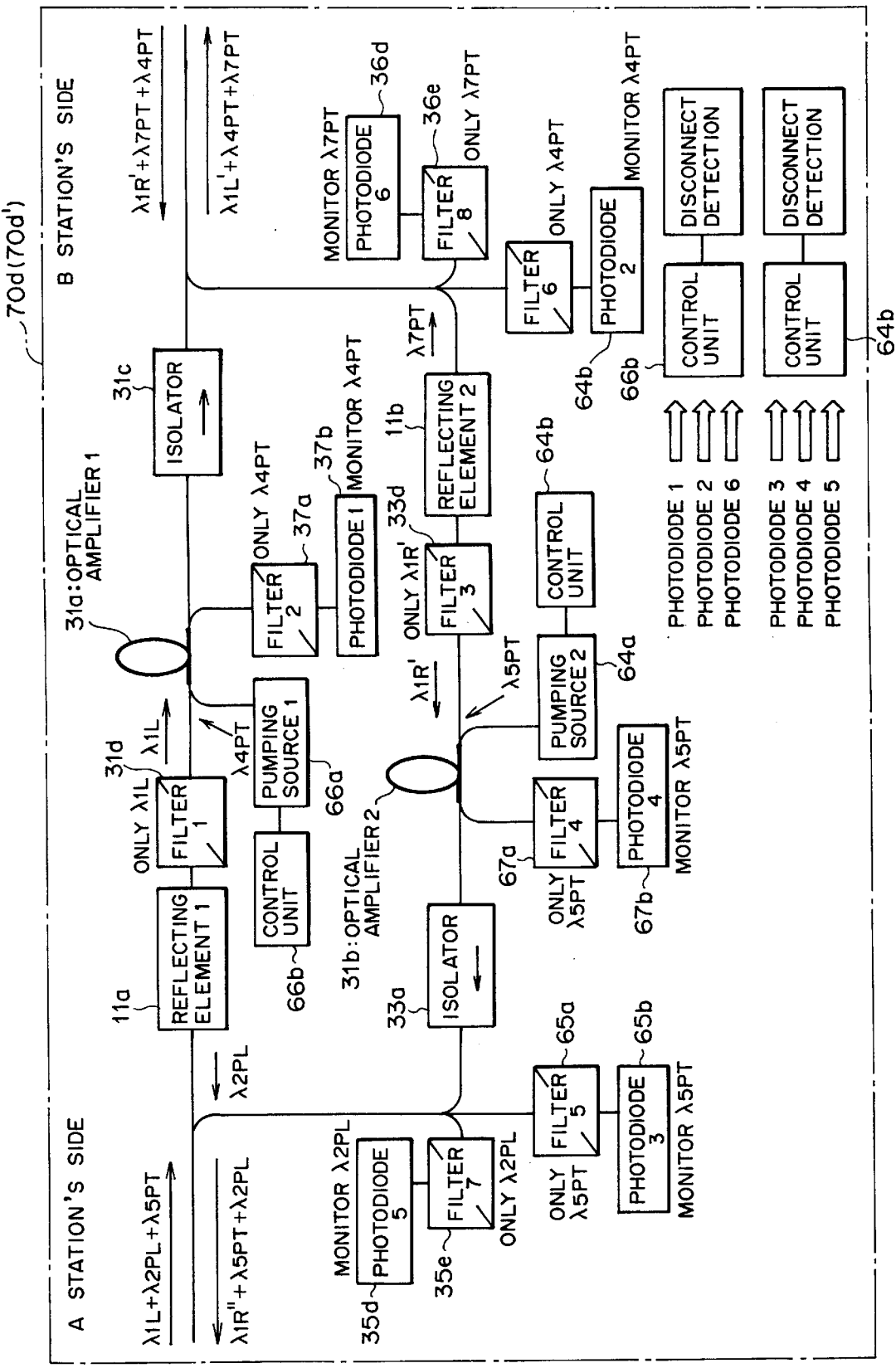
FIG. 35 is a diagram showing an internal structure of a first repeating station according to the third modification of the second embodiment of this invention.

FIG. 35 is a diagram showing an internal structure of the first repeating station 70d (or the second repeating station 70d') according to the third modification of the second embodiment of this invention.

The first repeating station 70d comprises a second filter (filter 2) 37a, a first optical detector (photodiode 1) 37b, a fourth filter (filter 4) 67a, and a fourth optical detector (photodiode 4) 67b. The second filter 37a is disposed on the output's side of a first optical amplifier 31a to extract first pumping light (λ4PT) outputted from the first optical amplifier 31a. The first optical detector 37b detects a level of the first pumping light (λ4PT) outputted from the second filter 37a. The fourth filter 67a is disposed on the output's side of a second optical amplifier 33c to extract second pumping light (λ5PT) outputted from the second optical amplifier 33c. The fourth optical detector 67b detects a level of the second pumping light (λ5PT) outputted from the fourth filter 67a.

The eighth filter (filter 8) 36e extracts residual pumping light (λ7PT) from a received optical signal, and outputs it. A sixth optical detector (photodiode 6) 36d detects the residual pumping light (λ7PT) from the eighth filter 36e. An output level of the first optical amplifier 31a is controlled on the basis of a detected level of the first optical detector 37b, a detected level of the second optical detector 64b and a detected level of the sixth optical detector 36d.

A seventh filter (filter 7) 35e extracts residual pumping light (λ2PT) from a received optical signal, and outputs it. The fifth optical detector (photodiode 5) 35d detects the residual pumping light (λ2PT) from the seventh filter 35e. An output level of the second optical amplifier 33c is controlled on the basis of a detected level of the fourth optical detector (photodiode 4) 67b, a detected level of a third optical detector 65b and a detected level of the fifth optical detector 35d.

In FIGS. 34 and 35, parts designated by like reference characters have like or corresponding functions described above, further descriptions of which are thus omitted.

With the above structure, the control is performed as described in (r4) through (r6) below. Incidentally, although the following is a case of the first pumping light controlling means 66b, a case of the second pumping light controlling means 64b is similar.

(r4) A difference in reception light level between the first optical detector (photodiode 1) 37b and a second optical detector (photodiode 2) 64b is detected. A reception level of the sixth optical detector 36d is monitored.

(r5) when the reception level of the sixth optical detector 36d is constant (while cut is not detected), an actual transmission loss between the first repeating station 70d and the second repeating station 70d' is calculated on the basis of (r4), and the first pumping source 22d in the transmitting station 20g is such controlled as to yield the optimum optical amplified output.

(r6) When the reception level of the sixth optical detector 36d falls (while cut is detected), the bias current or the like of a first pumping source 66a is fluctuated, whereby output level of the pumping light λ4PT is fluctuated. After a relationship between the fluctuation in optical level (optical level reflected by a cross section of the optical cable and returned) of the second optical detector 64b and the fluctuation in output level of the pumping light is confirmed, cut of the optical cable is determined.

As this, a more accurate gain control is possible by determining an amplified optical level in actual measurement.

As this, communication among the stations is performed using only the optical cables in one system, and the output level of the pumping source is automatically controlled in each of the stations, which allows the optimum communication.

In the above manner, the installation cost and maintenance cost of the optical cables are largely decreased, and each of the stations can detect cut of the optical cable, which allows reliability and safety of the optical system to be remarkably improved.

(C) Description of Third Embodiment of the Invention

Figure 36:
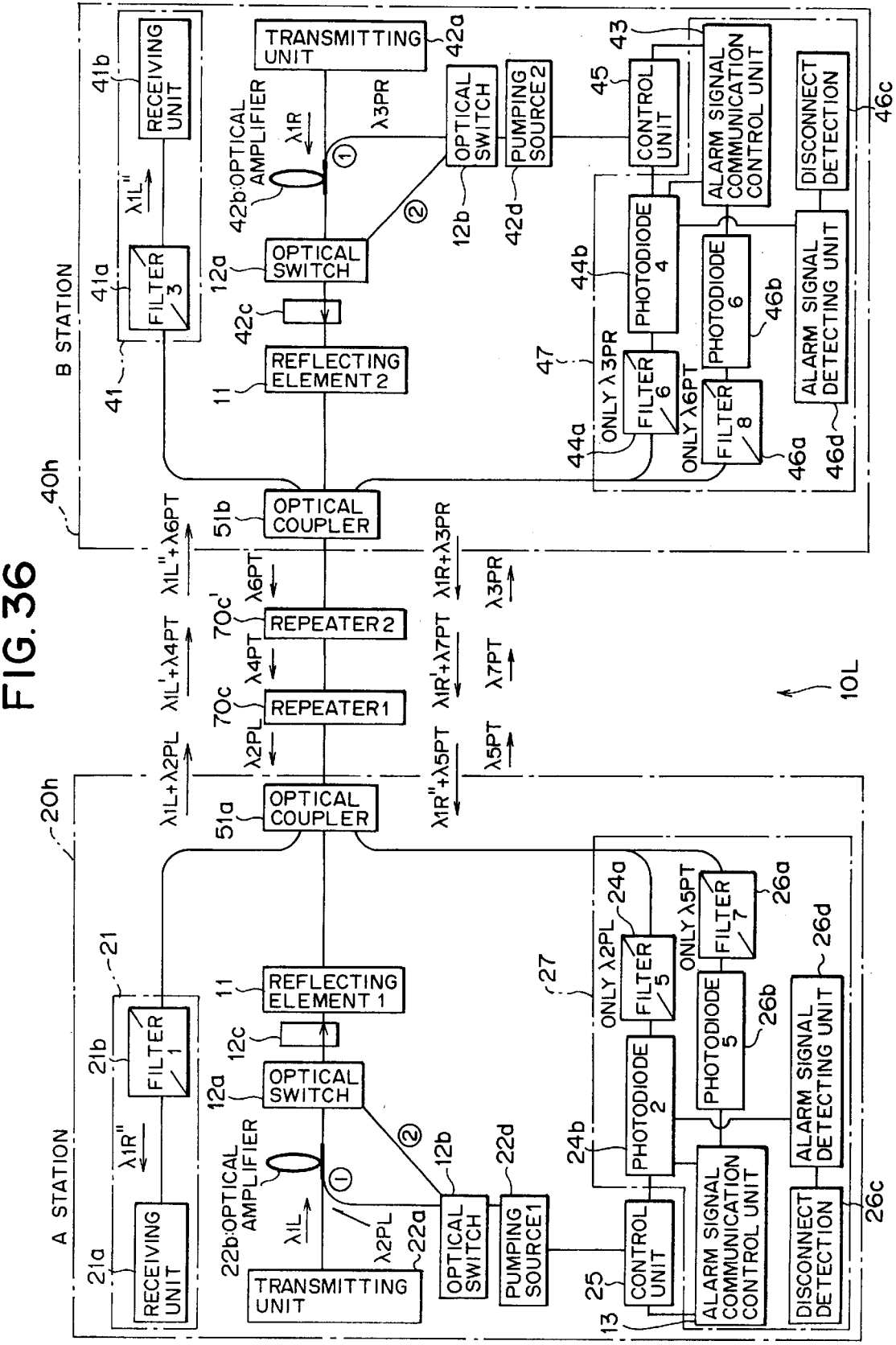
FIG. 36 is a diagram showing a structure of an optical system according to a third embodiment of this invention.

FIG. 36 is a diagram showing a structure of an optical system according to a third embodiment of this invention. An optical system 10L shown in FIG. 36 comprises a transmitting station 20h, a first repeating station 70c, a second repeating station 70c' and a receiving station 40h. The optical system 10L is equivalent to the optical system 10i (refer to FIG. 27) in which an output monitoring function is added to the transmitting side and the receiving side.

In this modification, an alarm signal is sent to a transmission path by modulating a pumping source, returning of the alarm signal is confirmed, then cut of the optical cable is determined.

Figure 37:
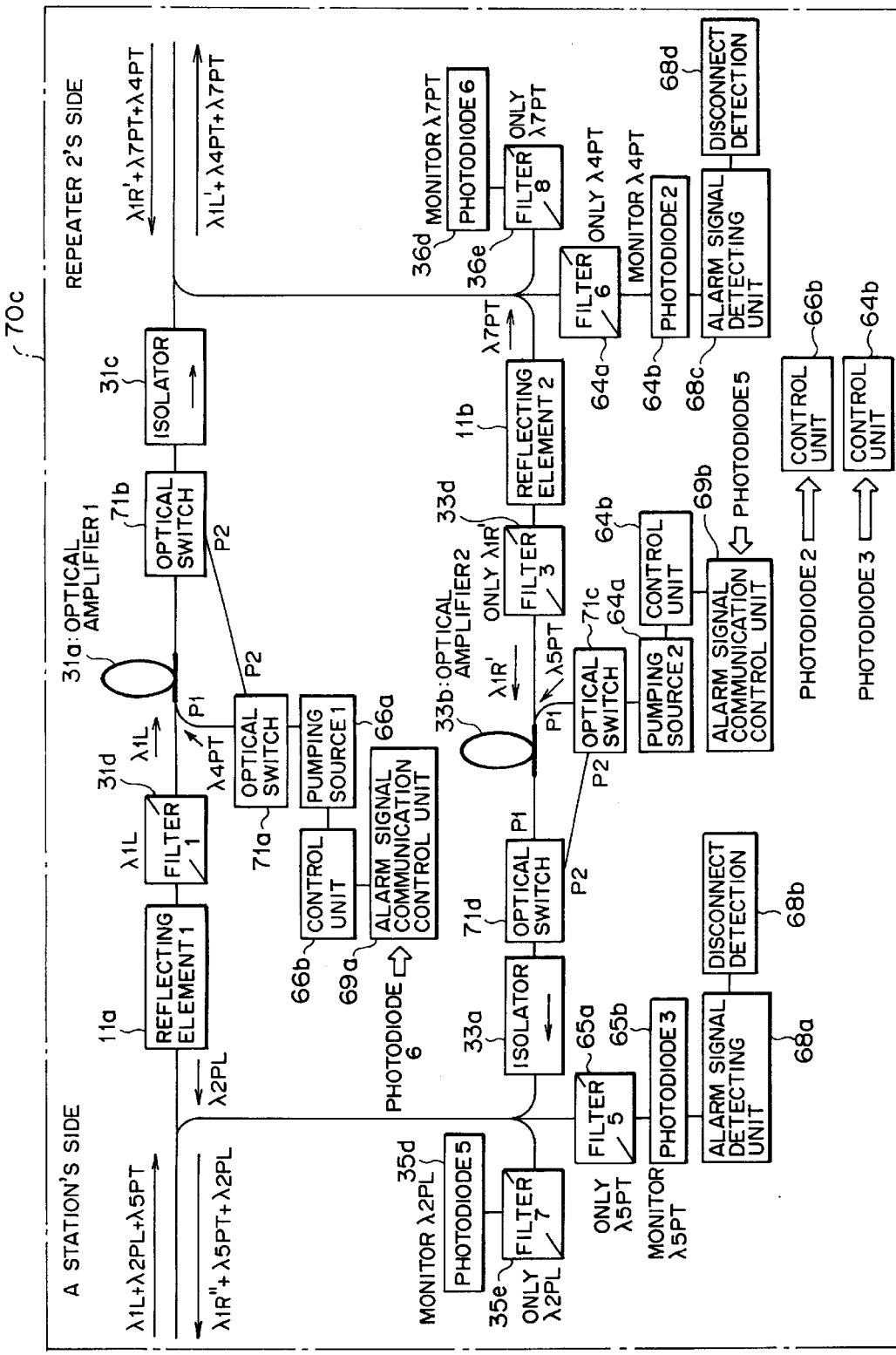
FIG. 37 is a diagram showing a structure of a first repeating station according to the third embodiment of this invention.

FIG. 37 is a diagram showing a structure of the first repeating station according to the third embodiment of this invention. In the first repeating station 70c shown in FIG. 37, a unit for superimposing a modulation signal as an alarm signal and transmitting it is added to the first repeating station 70c shown in FIG. 33. The first repeating station 70c comprises a first alarm signal communication controlling means 69b, first optical switches 71c and 71d, a first alarm signal detecting means 68a, a second disconnect detecting means 68b, a second alarm signal communication controlling means 69a, second optical switches 71a and 71b, a second alarm signal detecting means 68c, and a fourth disconnect detecting means 68d.

The first alarm signal communication controlling means 69b outputs a port switching signal in order to superimpose a modulation signal on a second pumping source 64a and output it when detecting that residual pumping light ($\lambda$2PL) is not inputted to the fifth optical detector 35d. The first optical switches 71c and 71d are connected to the second pumping source 64a to select according to the port switching signal outputted from the first alarm signal communication controlling means 69b whether second pumping light ($\lambda$5PL) from the second pumping source 64a is led to the input's side of a second optical amplifier 33c or the second pumping light ($\lambda$5PL) on which the modulation signal has been superimposed is led to the output's side of the second optical amplifier 33c. The first alarm signal detecting means 68a is connected to a third optical detector 65b to detect the second pumping light ($\lambda$5PL), on which modulation signal has been superimposed, looped back and inputted from the optical transmitting apparatus's side (the transmitting station 20h in FIG. 36), and outputs a first alarm signal to the outside. The second disconnect detecting means 68b detects that the first alarm signal is outputted from the first alarm signal detecting means 68a. The second alarm signal communication controlling means 69a outputs a port switching signal in order to superimpose a modulation signal on the first pumping source 66a and output it when detecting that residual pumping light ($\lambda$7PT) is not inputted to a sixth optical detector 36d.

The second optical switches 71a and 71b are connected to a first pumping source 66a to select according to a port switching signal outputted from the second alarm signal communication controlling means 69a whether first pumping light ($\lambda$4PT) from the first pumping source 66a is led to the input's side of a first optical amplifier 31a or the first pumping light ($\lambda$4PT) on which the modulation signal has been superimposed is led to the output's side of the first optical amplifier 31a. The second alarm signal detecting means 68c is connected to a second optical detector 64b to detect the first pumping light ($\lambda$4PT), on which the modulation signal has been superimposed, looped back and inputted from the optical receiving apparatus's side, and outputs a second alarm signal to the outside. The fourth disconnect detecting means 68d detects that the second alarm signal is outputted from the second alarm signal detecting means 68c.

In FIGS. 36 and 37, parts designated by like reference characters have like or corresponding functions described above, further descriptions of which are thus omitted.

With the above structure, in the transmitting station 20h, a level of reception light (light of pumping light $\lambda$2PL of its own station, returned from the first repeating station 70c) of the second optical detector 64b is detected in the normal state, an actual transmission loss between the transmitting station 20h and the first repeating station 70c is calculated, and a first pumping source 22d is such controlled as to yield the optimum optical amplified output. The reception level of the fifth optical detector 35d is monitored.

When the reception level of the fifth optical detector 35d is constant, cut is not detected. For this, the above operation is performed. When the reception level of the fifth optical detector 35d falls (while cut is detected), an alarm signal communication control unit 13 (in the transmitting station 20h) controls optical switches 12a and 12b to switch a route ① in the normal state to a route ②, modulates the pumping source 22d, and transmits an alarm signal in a specific pattern to the first repeating station 70 along the route ②.

An alarm signal detecting unit 26d monitors whether the alarm signal is inputted to the second optical detector 64b. When the optical cable is cut, the light is reflected by the cross section, and a modulated pumping light alarm signal is returned to its own station. Whereby, disconnection of the optical signal is determined when the alarm signal is detected.

The second repeating station 70c' (similar to that shown in FIG. 37, although the detailed drawing is not shown) is similar. Inputted light ($\lambda$1L'+$\lambda$4PT+$\lambda$7PT) from the first repeating station 70c is branched into three directions; toward a reflecting means 11a, a fifth filter 65a and a seventh filter 35e, by an optical coupler 50 or the like (not shown).

The reflecting means 11a reflects only $\lambda$4PT, and only ($\lambda$1L'+$\lambda$7PT) components are inputted to a first filter 31d. Only an optical signal component $\lambda$1L' is extracted by the first filter 31d, multiplexed with pumping light $\lambda$6PT, inputted to a first optical amplifier 31a, then transmitted along with residual pumping light to the receiving station 40h.

An actual transmission loss between the second repeating station 70c' and the receiving station 40h is calculated from returned pumping light $\lambda$6PT from the receiving station 40h (monitored by a second optical detector 64b), and an output of a first pumping source 66a is such controlled by a first pumping light controlling means 66b that the output becomes optimum. Only the residual pumping light $\lambda$7PT reflected by the reflecting means 11a in the first repeating station 70c is extracted by the fifth filter 65a, the input level is monitored by a third optical detector 65b, an actual transmission loss between the first repeating station 70c and the second repeating station 70c' is calculated by the second pumping light controlling means 64b, and an output of the second pumping source 64a is controlled to be optimum.

Only the residual pumping light λ4PT of the first repeating station 70c is extracted by the seventh filter 35e, and an input thereof is monitored by a fifth optical detector 35d. When the input dies out, an alarm signal communication control unit 69b controls optical switches 71c and 71d, switches a port P1 in the normal state to a port P2 to modulate the pumping light, and transmits an alarm signal in a specific pattern to the first repeating station 70c from the port P2.

On the other hand, an alarm signal detecting unit 68a monitors whether the alarm signal is inputted to the third optical detector 65b. When the optical cable is cut, the alarm signal obtained by modulating the pumping light is reflected by the cross section, and returned to its own station. After detection of the alarm signal is confirmed, it is determined that the optical cable is cut.

As this, communication is performed among the stations using only the optical cables in one system, and the output level of the pumping source is automatically controlled, which allows the optimum communication.

As this, the installation cost and maintenance cost of the optical cables are largely decreased, and each of the station scan detect cut of the optical cable. This largely improves reliability and safety of the optical system 10b.

(C1) Description of First Modification of Third Embodiment of the Invention

Figure 38:
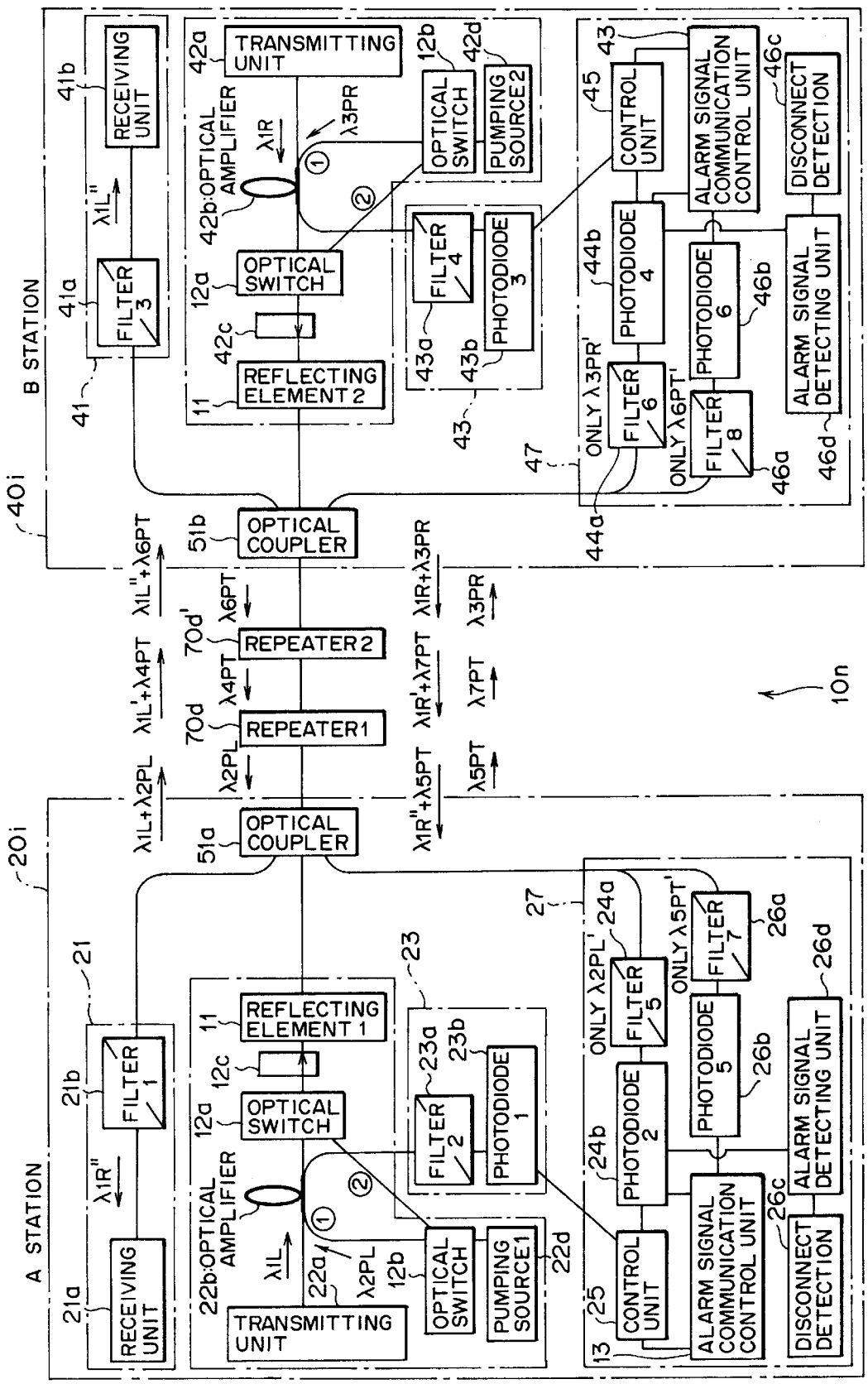
FIG. 38 is a diagram showing a structure of an optical system according to a first modification of the third embodiment of this invention.
Figure 39:
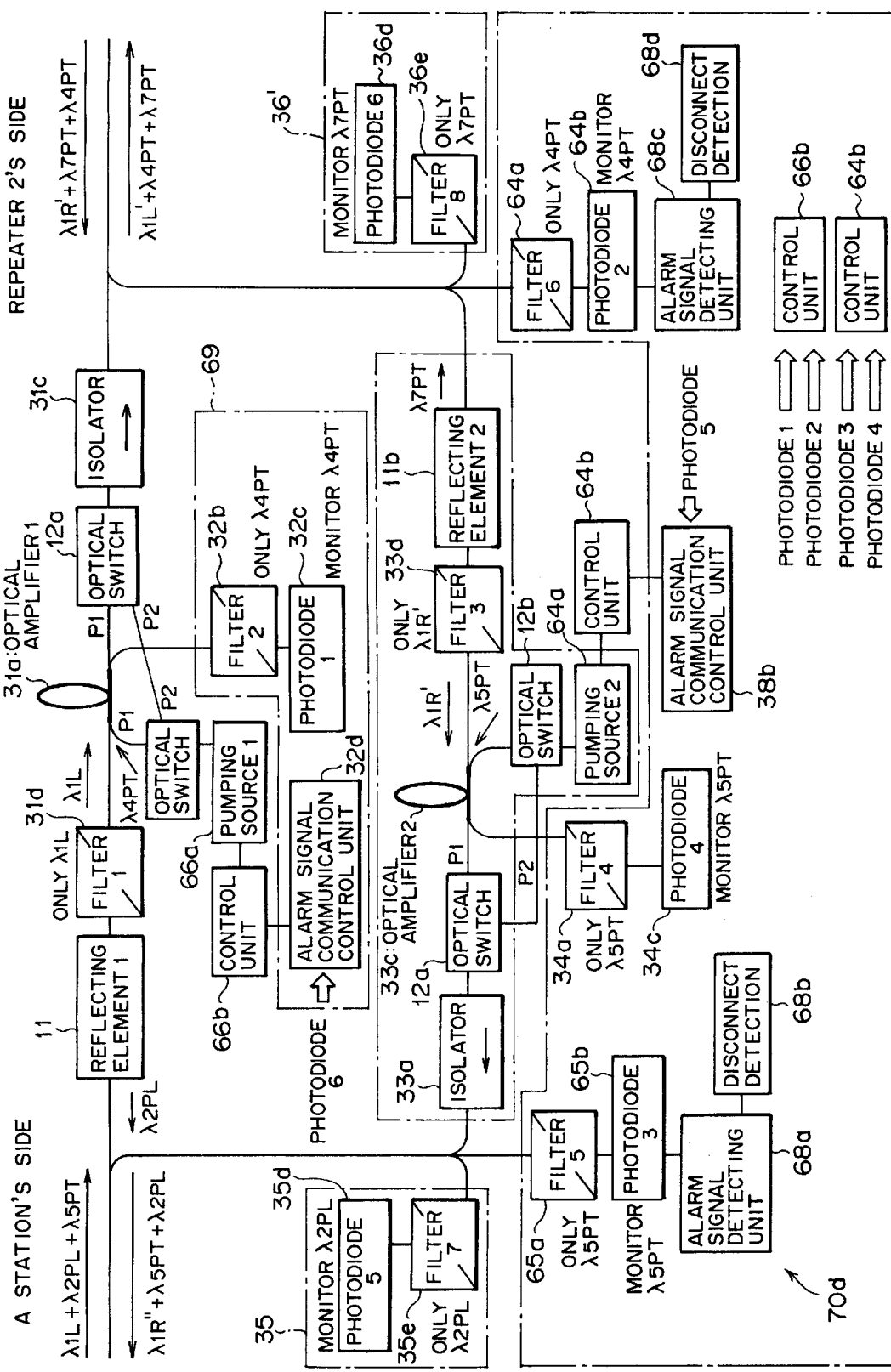
FIG. 39 is a diagram showing an internal structure of a first repeating station according to the first modification of the third embodiment of this invention.

FIG. 38 is a diagram showing a structure of an optical system according to a first modification of the third embodiment of this invention. An optical system 10n shown in FIG. 38 comprises a transmitting station 20i, a first repeating station 70d, a second repeating station 70d' and a receiving station 40i. FIG. 39 is a diagram showing an internal structure of the first repeating station 70d according to the first modification of the third embodiment of this invention. This modification is that a function of modulating pumping light, sending an alarm signal to the transmission path, confirming returning of it, and determining cut of the optical cable is added to the above third embodiment.

There are provided a second filter (filter 3) 32b disposed on the output's side of a first optical amplifier 31a to extract first pumping light (λ4PT) outputted from the first optical amplifier 31a, a first optical detector (photodiode 1) 32c detecting a level of the fist pumping light (λ4PT) outputted from the second filter 32b, a fourth filter (filter 4) 34a disposed on the output's side of a second optical amplifier 33c to extract second pumping light (λ5PT) outputted from the second optical amplifier 33c, and a fourth optical detector (photodiode 4) 34c detecting a level of the second pumping light (λ5PT) outputted from the fourth filter 34a.

In FIG. 38, parts designated by like reference character have like or corresponding functions described above, further descriptions of which are thus omitted.

With the above structure, the transmitting station 20i (refer to FIG. 38) detects a difference in reception light level between a first optical detector (photodiode 1) 23b and a second optical diode (photodiode 2) 24b, calculates an actual transmission loss between the transmitting station 20i and the first repeating station 70d, and such controls a first pumping source 22d as to yield the optimum optical amplified output. A reception level of a fifth optical detector 26b (photodiode 5, corresponding to the first transmitting side monitoring means 26b in FIG. 5) is monitored. When the reception level of the fifth optical detector 26b is constant, cut is not detected. Accordingly, the above operation is performed. When the reception level of the fifth optical detector 26b falls (while cut is detected), an alarm signal communication control unit 13 controls optical switches 12a and 12b to switch a route ① in the normal state to a route ②, modulates pumping light, and transmits an alarm signal in a specific pattern to the first repeating station 70d along the route ②.

An alarm signal detecting unit 26d monitors whether the alarm signal is inputted to the second optical detector 24b. When the optical cable is cut, the alarm signal obtained by modulating the pumping light is reflected by the cross section, and returned to its own station, thus cut of the optical cable is determined after detection of the alarm signal is confirmed.

In FIG. 39, inputted light (λ1L+λ2PL+λ5PT) from the transmitting station 20i is branched into three directions; toward a reflecting means 11a, a fifth filter 65a and a seventh filter 35e, by an optical coupler 50 or the like (not shown). Since the reflecting means 11a reflects only λ2PL, only (λ1L+λ5PT) components are inputted to a first filter 31d. An optical signal component λ1L is extracted by the first filter 31d, multiplexed with pumping light λ4PT, inputted to the first optical amplifier 31a, and transmitted along with residual pumping light to the second repeating station (not shown).

At this time, only a λ4PT component is extracted by a sixth filter 64a, a level of the λ4PT light is monitored by a second optical detector 64b, an actual transmission loss between the first repeating station 70d and the second repeating station is calculated on the basis of a difference in level between it and returned pumping light λ4PT (monitored by the second optical detector 64b) from the second repeating station, and a first pumping light controlling means 66b such controls that an output of a first pumping source 66a become optimum.

A fifth filter 35a extracts only residual pumping light λ5PT reflected by a reflecting means 11a in the transmitting station 20i, a third optical detector 65b monitors an input level thereof, the second pumping light controlling means 64b calculates an actual transmission loss between the transmitting station 20i and the first repeating station 70d, and an output of a second pumping source 64a is controlled to be optimum.

The seventh filter 35e extracts only residual pumping light λ2PL of the transmitting station 20i, and a fifth optical detector 35d monitors an input of the residual pumping light λ2PL. When the input dies out, an alarm signal communication control unit 32d controls optical switches 12a and 12b to switch a port P1 in the normal state to a port 2, modulates the pumping light, and transmits an alarm signal in a specific pattern to the second repeating station. An alarm signal detecting unit 68c monitors whether the alarm signal is inputted to the second optical detector 64b. When the optical cable is cut, the light is reflected by the cross section, and the alarm signal that is the modulated pumping light is returned to its own station. It is thereby determined that the cut is detected.

As this, communication is performed among the stations using only the optical cables in one system, and the output level of the pumping source is automatically controlled, which allows the optimum communication.

As this, the installation cost and maintenance cost of the optical cables are largely decreased, and each of the stations can detect disconnect of the optical cable. This largely improves reliability and safety of the optical system 10n.

(C2) Description of Second Modification of Third Embodiment of the Invention

Figure 40:
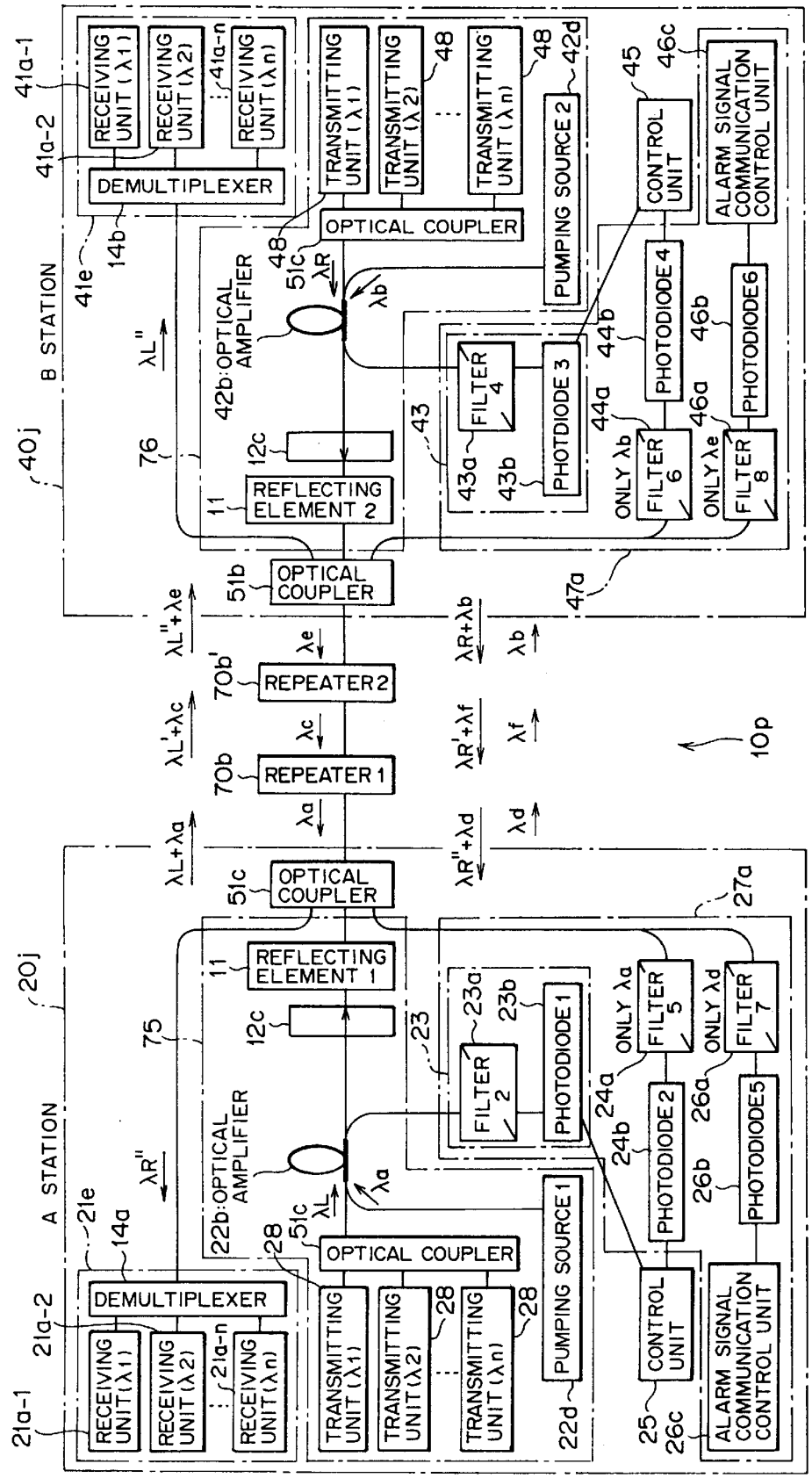
FIG. 40 is a diagram showing a structure of an optical system according to a second modification of the third embodiment of this invention.

FIG. 40 is a diagram showing a structure of an optical system according to a second modification of the third embodiment of this invention. An optical system 10$p$ shown in FIG. 40 collectively amplifies optical signals at multiple wavelength, and transmits them (hereinafter referred as a multiple wavelength collective amplification system, occasionally), which comprises a transmitting station 20$j$, a first repeating station 70$b$, a second repeating station 70$b'$ and a receiving station 40$j$. A difference from the above first modification of the third embodiment is that this modification is required to select a wavelength of each pumping light because of the multiple wavelength collective amplification system.

Each of the transmitting station 20$j$ and the receiving station 40$j$ has multiplexing and demultiplexing functions for multiple wavelength collective amplification along with the functions of the transmitting station 20$a$" and the receiving station 40$a$" (refer to FIG. 30) described above. Namely, the transmitting station 20$j$ comprises an optical coupler 51$c$, and a plurality of transmitting units 28 as an optical transmitting means 75. Here, n is an integer. Each of the plural transmitting units 28 named a transmitting unit 1 ($\lambda$1), a transmitting unit 2 ($\lambda$2), . . . , and a transmitting unit n ($\lambda$n) has the same function as the above transmitting unit 22$a$. The optical coupler 50$c$ is connected to the plural transmitting units 28 and an optical amplifier 22$b$ to collectively amplify optical signals at multiple wavelengths sent from the plural transmitting units 28, and sends them.

The transmitting station 20$j$ further comprises an optical demultiplexer 14$a$ and receiving units 21$a$-1, 21$a$-2, . . . , and 21$a$-n, as an optical receiving means 21$e$. The optical demultiplexer 14$a$ selects reception light containing optical signals at multiple wavelengths for each wavelength, and outputs it. Receiving unit 1 ($\lambda$1), a receiving unit 2 ( ($\lambda$2), . . . , a receiving unit n ($\lambda$n) represent the receiving units 21$a$-1, 21$a$-2, . . . and 21$a$-n, respectively, each of which has the same function as the above receiving unit 21$a$.

The receiving station 40$j$ comprises a plurality of transmitting units 48 and an optical coupler 51$c$, as an optical transmitting means 76, to be able to collectively amplify optical signals at multiple wavelengths, and sent them. Each of the plural transmitting units 48 named a transmitting unit 1 ($\lambda$1), a transmitting unit 2 ($\lambda$2), . . . , and a transmitting unit n ($\lambda$n) has the same function as the above transmitting unit 42$a$. The receiving station 40$j$ further comprises an optical demultiplexer 14$b$ and receiving units 41$a$-1, 41$a$-2, . . . , and 41$a$-n each of which has the same function as the receiving unit 41$b$ (refer to FIG. 1), as an optical receiving means 41$e$ to be able to select reception light at each wavelength contained in an optical signal at multiple wavelengths, and output it.

Incidentally, the first repeating station 70$b$ and the second repeating station 70$b'$ are almost the same as those described in the first modification (refer to FIG. 31) of the second embodiment of this invention, but monitor different wavelengths. In FIG. 40, parts designated by like character have like or corresponding functions described above, further descriptions of which are thus omitted.

Wavelengths of transmission light of the transmitting station 20$j$ are $\lambda$1 to $\lambda$n (n being an integer), which are multiplexed in one optical cable by the optical coupler 51$c$, collected into an optical signal at a wavelength $\lambda$L, multiplexed with a pumping source (not shown) having a wavelength $\lambda$a for collective pumping, and inputted to the optical amplifier 22$b$ for collective amplification. Here, $\lambda$a differs from any wavelength in $\lambda$1L.

Figure 41:
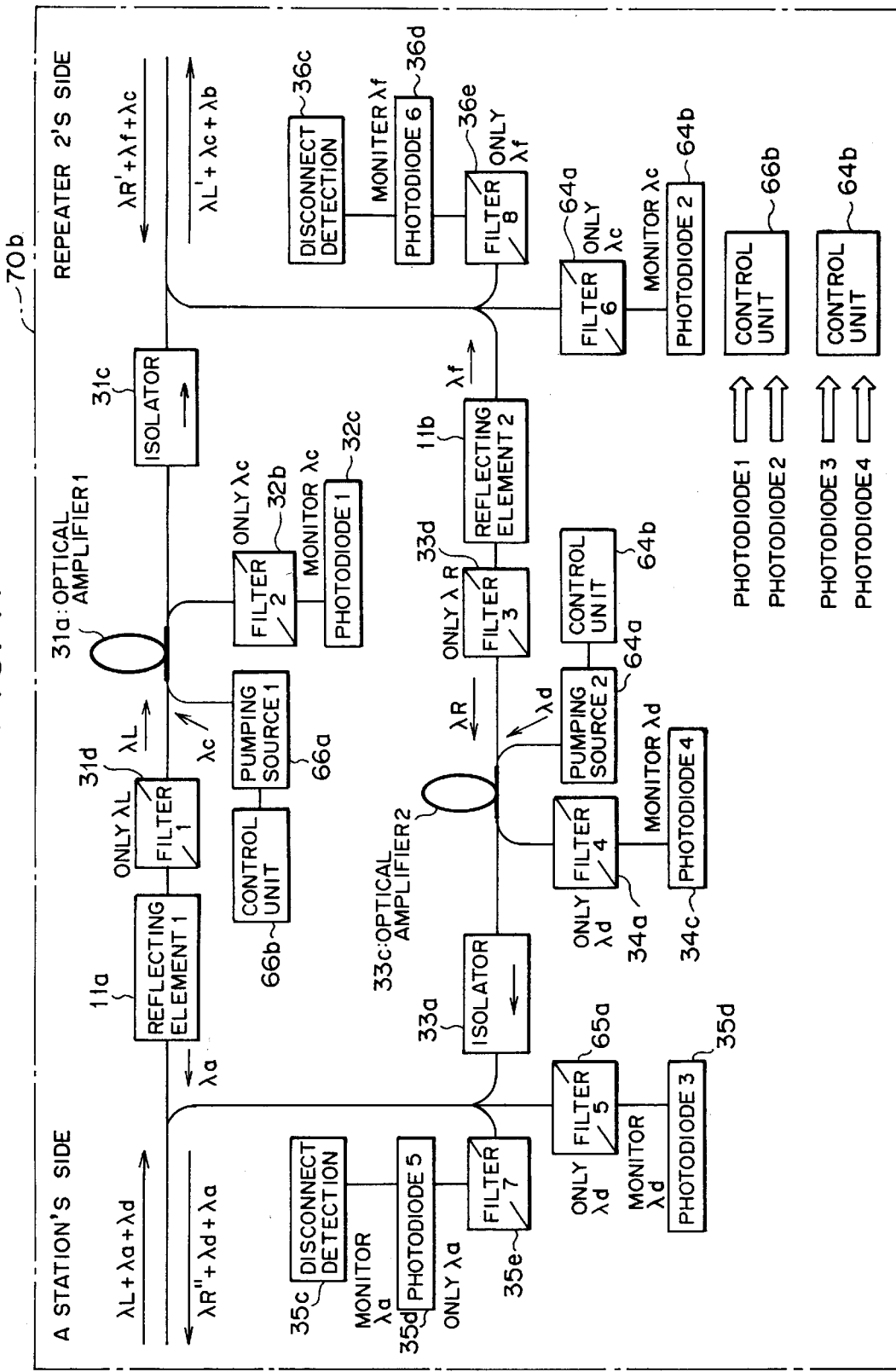
FIG. 41 is a diagram showing an internal structure of a first repeating station according to the second modification of the third embodiment of this invention.

FIG. 41 is a diagram showing an internal structure of the first repeating station 70$b$ according to the second modification of the third embodiment of this invention. In FIG. 41, parts designated by like reference characters have like or corresponding functions described above, further descriptions of which are thus omitted.

Inputted light ($\lambda$L+$\lambda$a+$\lambda$d) from the transmitting station 20$j$ is branched into three directions; toward a reflecting means (reflecting element 1) 11$a$, a fifth filter (filter 5) 65$a$ and a seventh filter (filter 7) 35$e$, by an optical coupler 50 (not shown). The reflecting means 11$a$ reflects only $\lambda$a, thus only ($\lambda$1L+$\lambda$d) components are inputted to a first filter 31$d$. Only an optical signal component $\lambda$L is extracted by the first filter 31$d$, multiplexed with pumping light $\lambda$c, multiple-wavelength collective-optical-amplified by a first optical amplifier 31$a$, and transmitted along with residual pumping light to the second repeating station 70$b'$.

The residual pumping light $\lambda$d reflected by the reflecting means 11$a$ in the transmitting station 20$j$ is extracted by the fifth filter 65$a$, and its input level is monitored by a third optical detector 65$b$.

Only residual pumping light $\lambda$a of the transmitting station 20$j$ is extracted by the seventh filter 35$e$, and its input is monitored by a fifth optical detector 35$d$. When the input dies out, it is determined that the optical cable between the transmitting station 20$j$ and the first repeating station 70$b$ is cut. As shown in FIG. 41, transmission light to the transmitting station 20$j$ has ($\lambda$R"+$\lambda$d+$\lambda$a) components. When the optical cable between the transmitting station 20$j$ and the first repeating station 70$b$ is cut, this transmission light is returned as it is to the first repeating station 70$b$. In such case, a level of $\lambda$d does not fall. Additionally, $\lambda$R" has the same wavelength as the transmission optical signal $\lambda$L from the transmitting station 20$j$. For this, they cannot be used as elements to detect cut.

On the other hand, $\lambda$a loses its supply source, thus its level falls. For this, by detecting disconnection of this $\lambda$a component, it is possible to detect cut of the optical cable. Incidentally, inputted light from the first repeating station 70$b$ is similar.

Figure 42:
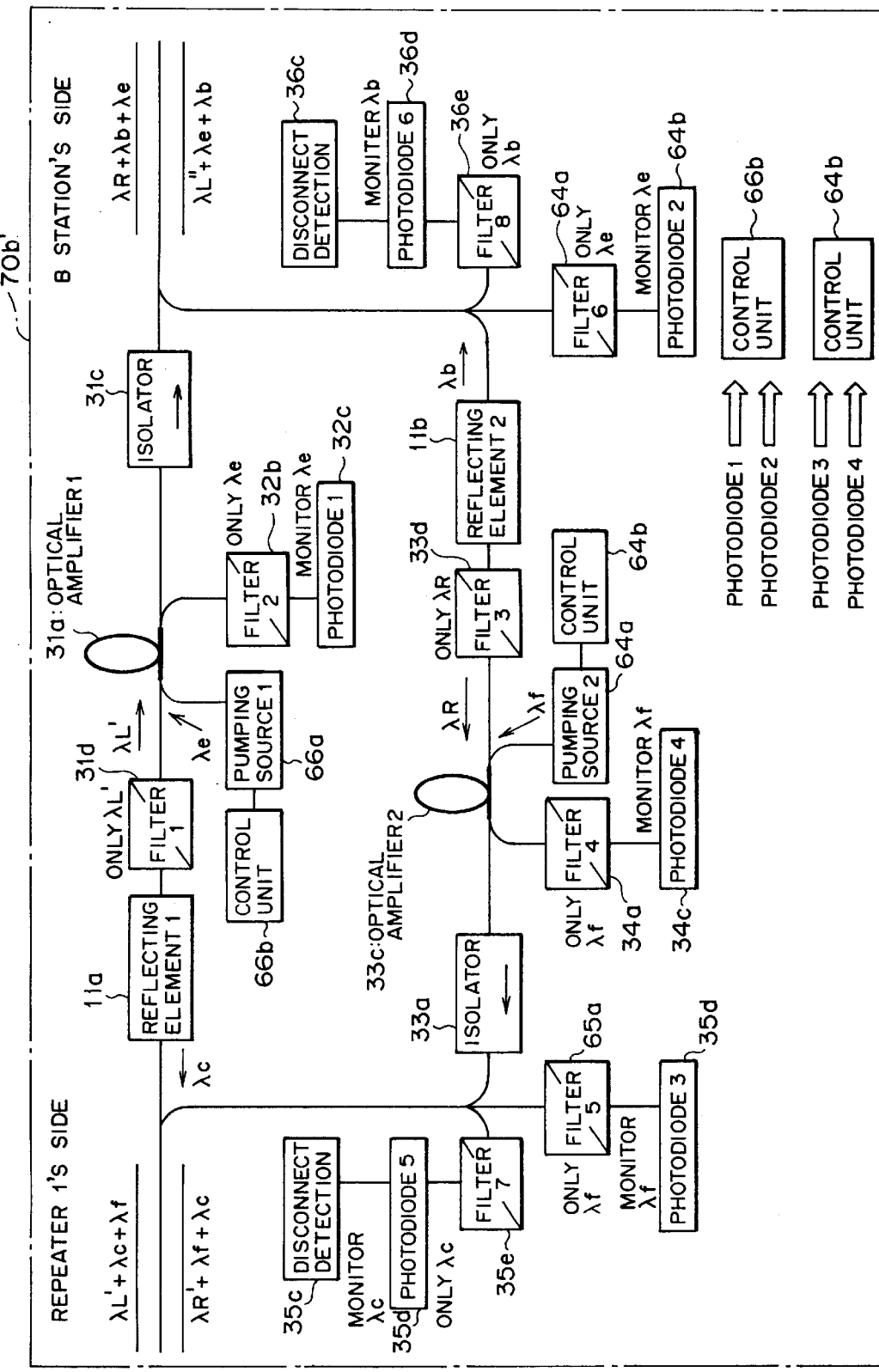
FIG. 42 is a diagram showing an internal structure of a second repeating station according to the second modification of the third embodiment of this invention.

FIG. 42 is a diagram showing an internal structure of the second repeating station 70$b'$ according to the second modification of the third embodiment of this invention. In FIG. 42, parts designated by like reference characters have like or corresponding functions described above, further descriptions of which are thus omitted.

Inputted light ($\lambda$L'+$\lambda$c+$\lambda$f) from the first repeating station 70$b$ is branched into three directions; toward a reflecting means (reflecting element 1) 11$a$, a fifth filter (filter 5) 65$a$ and a seventh filter (filter 7) 35$e$, by an optical coupler 50 (not shown) disposed at the entrance's side. The reflecting means 11$a$ reflects only $\lambda$c, thus only ($\lambda$L'+$\lambda$f) are inputted to a first filter 31$d$. Only an optical signal component $\lambda$L' is extracted by the first filter 31$d$, multiplexed with pumping light $\lambda$e, inputted to a first optical amplifier 31$a$, multiple-wavelength-collective-amplified, and transmitted along with residual pumping light to the receiving station 40. Residual pumping light $\lambda$f reflected by the reflecting means 11$b$ in the first repeating station 70$b$ is extracted by the fifth filter 65$a$, and its input level is monitored by a third optical detector 65$b$.

Only the residual pumping light $\lambda$c of the first repeating station 70$b$ is extracted by the seventh filter 35$e$, and an input thereof is monitored by a fifth optical detector 35$d$. When the input dies out, it is determined that the optical cable between the first repeating station 70$b$ and the second repeating station 70$b'$ is cut. Transmission light ($\lambda$R'+$\lambda$f+$\lambda$a) is sent to the first repeating station 70*b*. When the optical cable between the first repeating station 70*b* and the second repeating station 70*b*' is cut, this transmission light is returned as it is to the second repeating station 70*b*'. In such case, the level of λf does not fall. Additionally, λR' has the same wavelength as the transmission light optical signal λL' from the first repeating station 70*b*. For this, they cannot be used as elements to detect cut. On the other hand, λc loses its supply source, and its level falls. By detecting disconnection of inputs of λc, it is possible to detect cut of the optical cable. Inputted light from the receiving station 40 is similar.

With the above structure, the transmitting station 20*j* (refer to FIG. 40) performs a process with optical signals as follows. The transmitting station 20*j* collectively amplifies and transmits transmission light λL to the first repeating station 70*b*. Only a λa component is extracted by a first loopback filter 23*a*, the output optical level is monitored by a first optical detector 23*b*, returned light λa from the first repeating station 70*b* is extracted by a fifth filter 24*a* and monitored by a second optical detector 24*b*, an actual transmission loss is calculated on the basis of a difference in optical level between the first optical detector 23*b* and the second optical detector 24*b*, and the output level of the first pumping source 22*d* is adjusted by the controlling means 25 so as to yield the optimum optical output level.

With regard to reception, reception light λR" (transmission light from the opposite station being collectively referred as λR) from the opposing first repeating station 70*b* is inputted to an optical coupler 51, and split into each wavelength. The optical signals are inputted to the receiving unit 21*a*-1, the receiving unit 21*a*-2, . . . , and the receiving unit 21*a*-n, respectively, whereby communication between the transmitting station 20*j* and the receiving station 40*j* is established.

Further, pumping light λd to the transmitting station 20*j* is reflected by the reflecting means 11*a* in the first repeating station 70*b*, and the reflected λd is monitored by a fifth optical detector (photodiode 5) 26*b*. When its input level falls, cut of the optical cable between the transmitting station 20*j* and the first repeating station 70*b* is detected.

As this, communication is performed among the stations using only the optical cables in one system, and the output level of the pumping source is automatically controlled in each of the stations, which allows the optimum communication.

As this, the installation cost and maintenance cost of the optical cables are largely decreased, and each of the stations can detect cut of the optical cable. This remarkably improves reliability and safety of the optical system 10*p*.

(C3) Description of Third Modification of Second Embodiment of the Invention

Figure 43:
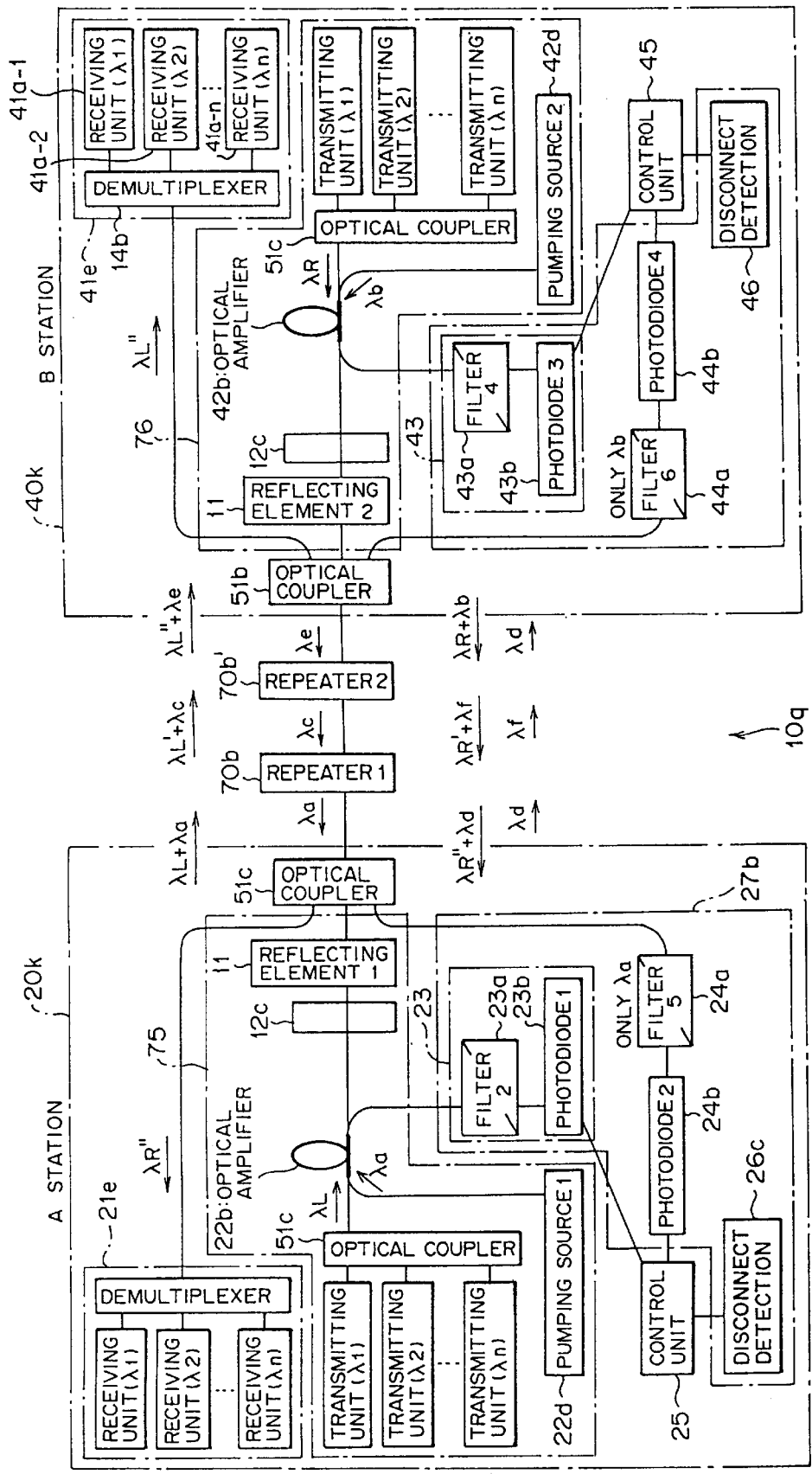
FIG. 43 is a diagram showing a structure of an optical system according to a third modification of the third embodiment of this invention.
Figure 44:
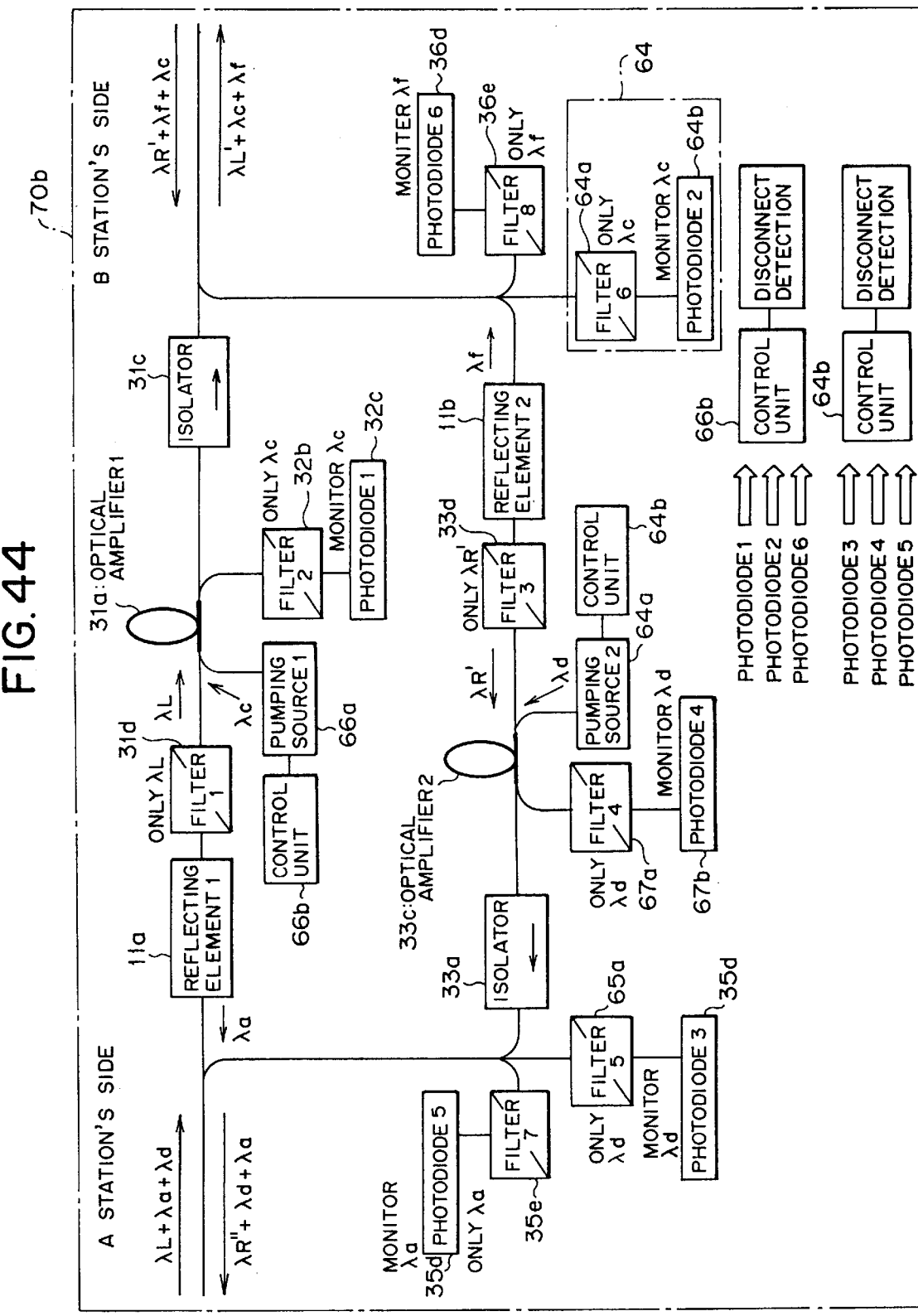
FIG. 44 is a diagram showing an internal structure of a first repeating station according to the third modification of the third embodiment of this invention.

FIG. 43 is a diagram showing a structure of an optical system according to a third modification of the third embodiment of this invention. An optical system 10*q* shown in FIG. 43 is in the multiple wavelength collective amplification system, which comprises a transmitting station 20*k*, a first repeating station 70*b*, a second repeating station 70*b*' and a receiving station 40*k*. FIG. 44 is a diagram showing an internal structure of the first repeating station 70*b* according to the third modification of the third embodiment of this invention.

The first repeating station 70*b* differs from that according to the second modification of the second embodiment described above in that data for monitoring a reception level of a fifth optical detector 35*d* and data for monitoring a reception level of a sixth optical detector 36*d* are inputted to both a first pumping light controlling means 66*b* and a second pumping light controlling means 64*b*. Whereby, cut of the optical cable can be detected.

A second filter 32*b* is disposed on the output's side of a first optical amplifier 31*a* to extract first pumping light (λc) outputted from the first optical amplifier 31*a*. A first optical detector 32*c* detects a level of the first pumping light (λc) outputted from the second filter 32*b*. An eighth filter 36*e* extracts residual pumping light (λf) from a received optical signal, and outputs it. The sixth optical detector 36*d* detects the residual pumping light (λf) from the eighth filter 36*e*. Likewise, an output level of the first optical amplifier 31*a* is controlled on the basis of a detected level of the first optical detector 32*c*, a detected level of a second optical detector 64*b* and a detected level of the sixth optical detector 36*d*.

Similarly, a fourth filter (filter 4) 67*a* is disposed on the output's side of a second optical amplifier 33*c* to extract second pumping light (λd) outputted from the second optical amplifier 33*c*. A fourth optical detector (photodiode 4) 67*b* detects a level of the second pumping light (λd) outputted from the fourth filter 67*a*. A seventh filter 35*e* extracts residual pumping light (λa) from a received optical signal, and outputs it. A fifth optical detector 35*d* detects the residual pumping light (λa) from the seventh filter 35*e*. An output level of the second optical amplifier 33*c* is controlled on the basis of a detected level of the fourth optical detector 67*b*, a detected level of the third optical detector 65*b* and a detected level of the fifth optical detector 35*d*.

In FIGS. 43 and 44, parts designated by like reference characters have like or corresponding functions described above, further descriptions of which are thus omitted.

Flow of an operation of the first pumping light controlling means 66*b* shown in FIG. 44 is as described in (s1) to (s6) below. Flow of an operation of the second pumping light controlling means 64*b* is similar. (s1) The first pumping light controlling means 66*b* detects a difference in reception light level between the first optical detector 32*c* and the second optical detector 64*b*, and monitors a reception level of the sixth optical detector 36*d*. (s2) When the reception level of the sixth optical detector 36*d* is constant (while cut is not detected), the first pumping light controlling means 66*b* calculates an actual transmission loss between the first repeating station 70*b* and the second repeating station 70*b*' from (s1), and so controls a first pumping source 66*a* as to yield the optimum optical amplified output. (s3) When the reception level of the sixth optical detector 36*d* falls (while cut is detected), the first pumping light controlling means 66*b* fluctuates the bias current or the like of the first pumping source 66*a*. The output level of the pumping light λc thereby fluctuates, it is determined that the optical cable is cut after a relationship between the fluctuation in optical level of the second optical detector 64*b* (optical level reflected by the cross section of the optical cable and returned) and the fluctuation in level of the pumping light output.

As this, an accurate control becomes possible, and a more precise operation becomes possible. Further, communication is performed among the stations using only the optical cables in one system, and the output level of the pumping source is automatically controlled in each of the stations, which allows the optimum communication.

As this, the installation cost and maintenance cost of the optical cables are largely decreased, and each of the stations can detect cut of the optical cable. This remarkably improves reliability and safety of the optical system 10*q*.

(C4) Description of Fourth Modification of Third Embodiment of the Invention

Figure 45:
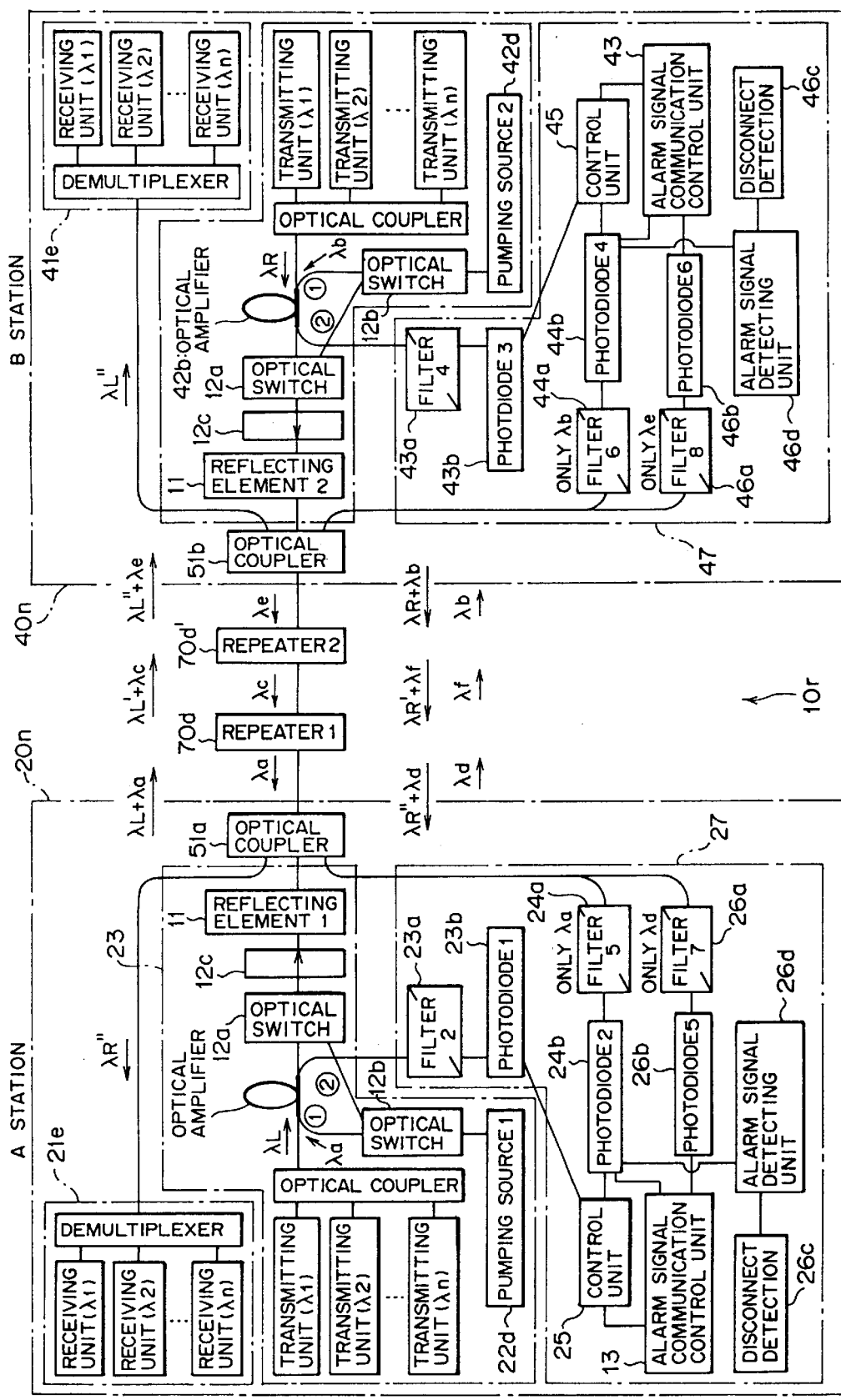
FIG. 45 is a diagram showing a structure of an optical system according to a fourth modification of the third embodiment of this invention.
Figure 46:
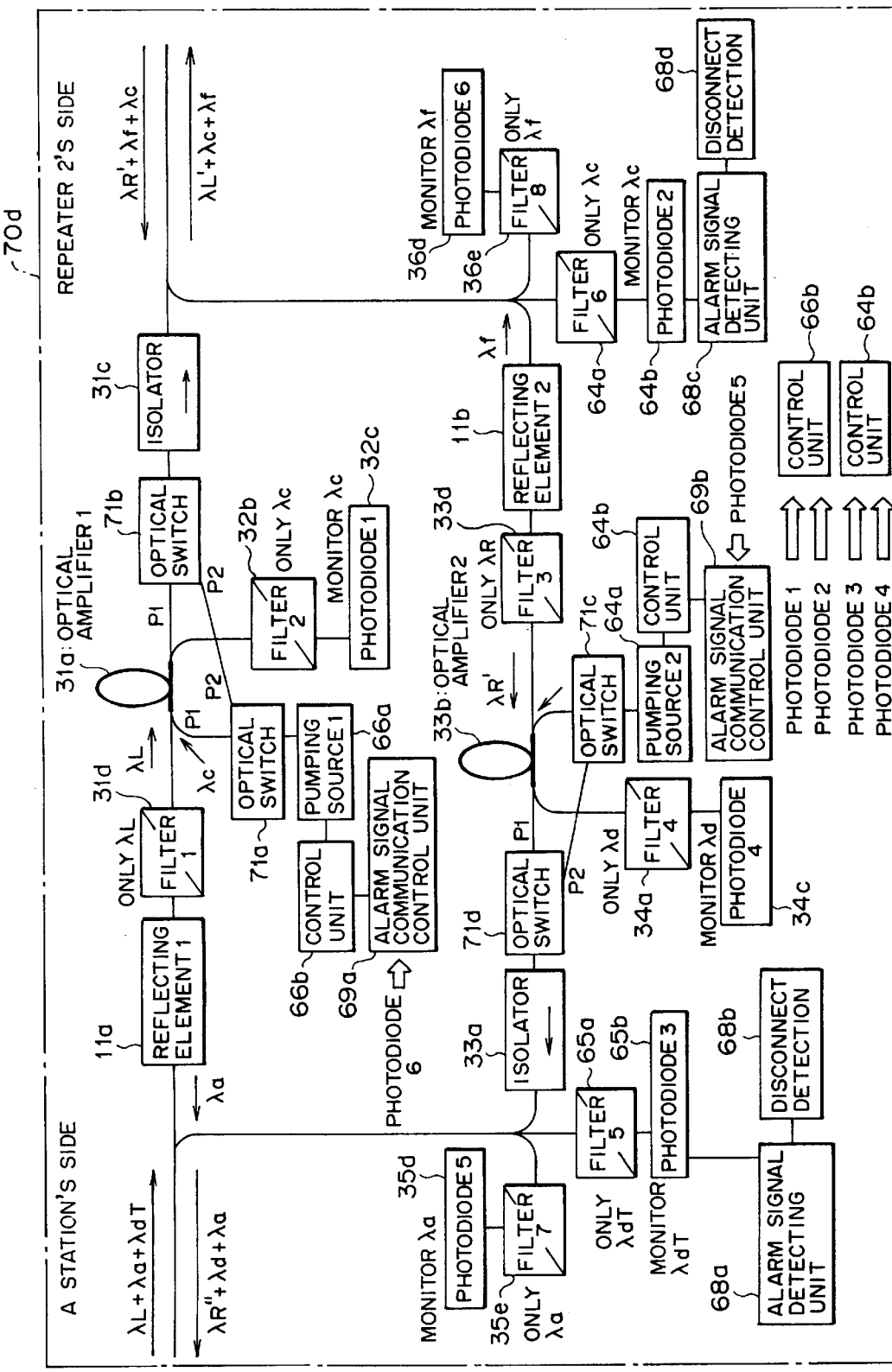
FIG. 46 is a diagram showing an internal structure of a first repeating station according to the fourth modification of the third embodiment of this invention.
Figure 47:
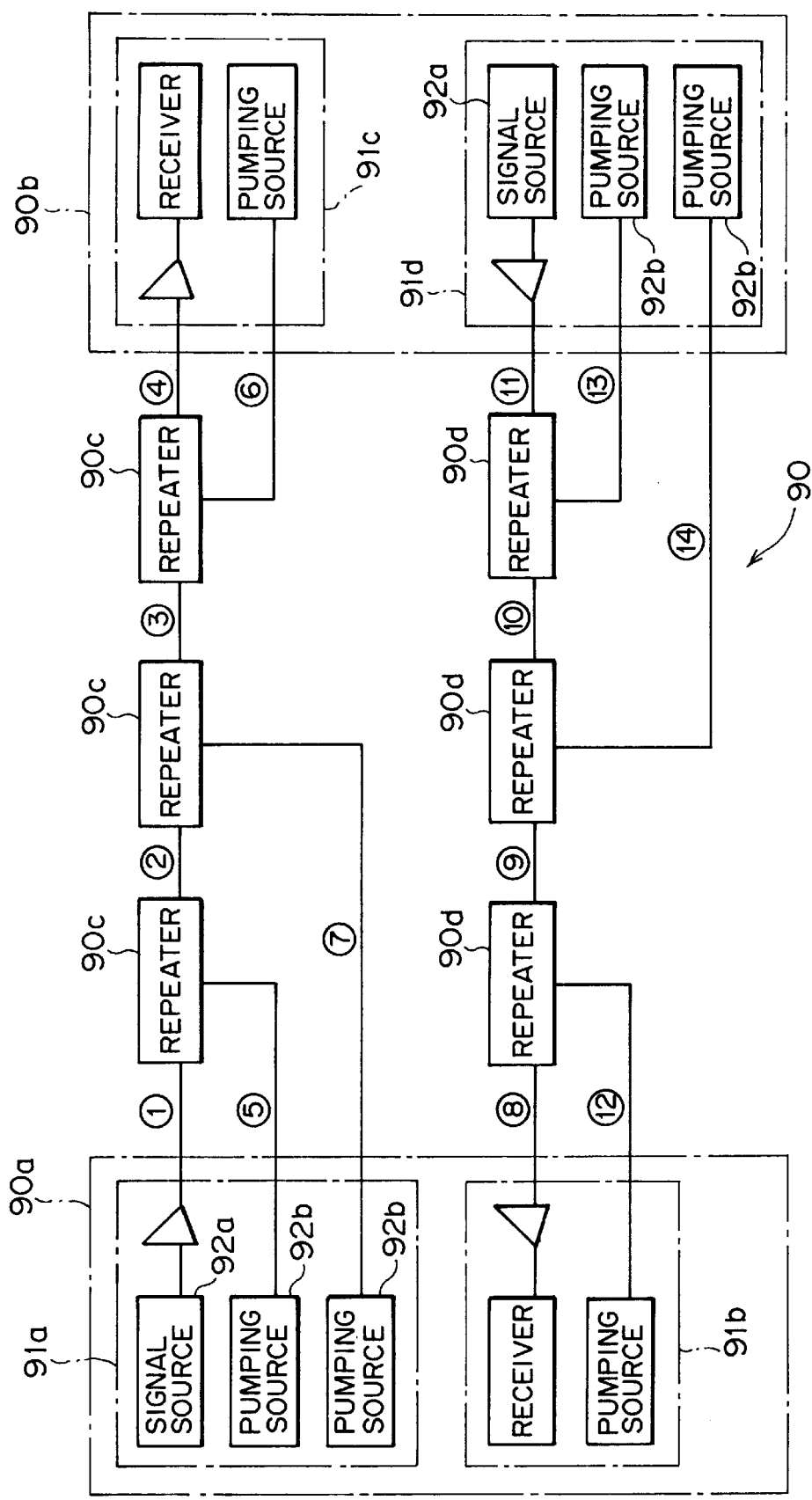
FIG. 47 is a diagram showing an example of optical communication system using a remote pumping light optical amplification system.

FIG. 45 is a diagram showing a structure of an optical system according to a fourth modification of the third embodiment of this invention. An optical system 10r shown in FIG. 45 is in the multiple wavelength collective amplification system, which comprises a transmitting station 20n, a first repeating station 70d, a second repeating station 70d' and a receiving station 40n. FIG. 46 is a diagram showing an internal structure of the first repeating station 70d according to the fourth modification of the third embodiment of this invention. The first repeating station 70d and the second repeating station 70d' are almost the same as those described in the second modification (refer to FIG. 33) of the second embodiment, where a controlling method using an alarm signal is added. In FIGS. 45 and 46, parts designated by like reference characters have like or corresponding functions described above, further descriptions of which are thus omitted.

A first optical detector 32c is disposed on the output's side of a first optical amplifier 31a to detect a level of first pumping light ($\lambda$c) outputted from the first optical amplifier 31a. A second alarm signal detecting means 68c detects first pumping light ($\lambda$c), on which a modulation signal has been superimposed, outputted from the optical receiving apparatus's side (receiving station 40n), and outputs a first alarm signal to the outside. A fourth optical detector 34c is disposed on the output's side of a second optical amplifier 33c to detect a level of second pumping light ($\lambda$d) outputted from the second optical amplifier 33c.

Further, a first alarm signal detecting means 68a detects the second pumping light ($\lambda$d), on which a modulation signal has been superimposed, sent from the optical transmitting apparatus's side (transmitting station 20n in FIG. 45), and outputs a second alarm signal to the outside. The first alarm signal communication controlling means 69a outputs a port switching signal when detecting that first residual pumping light ($\lambda$f) sent from the optical receiving apparatus's side is not inputted in order to superimpose a modulation signal on a first pumping source 66a and input it. Second optical switches 71a and 71b are connected to the first pumping source 66a to be able to select whether the first pumping light ($\lambda$c) from the first pumping source 66a is led to the input's side of the first optical amplifier 31a or the first pumping light ($\lambda$c), on which the modulation signal has been superimposed, is led to the output's side of the first optical amplifier 31a according to the port switching signal outputted from the first alarm signal communication controlling means 69a.

A second alarm signal communication controlling means 69b outputs a port switching signal when detecting that a second residual pumping light ($\lambda$d) sent from the transmitting station 20n is not inputted in order to superimpose a modulation signal on a second pumping source 64a and output it. First optical switches 71c and 71d are connected to the second pumping source 64a to be able to select whether the second pumping light ($\lambda$d) from the second pumping source 64a is led to the input's side of the second optical amplifier 33c or the second pumping light ($\lambda$d), on which the modulation signal has been superimposed, is led to the output's side of the second optical amplifier 33c according to the port switching signal outputted from the second alarm signal communication controlling means (69b).

With the above structure, the transmitting station 20n shown in FIG. 45 detects a difference in reception optical level between a first optical detector 23b and a second optical detector 24b in the normal state, calculates an actual transmission loss between the transmitting station 20n and the first repeating station 70b. A controlling means 25 controls a first pumping source 22d so as to yield the optimum optical amplified output. The reception level of a fifth optical detector 26b is monitored.

When the reception level of the fifth optical detector 26b is constant, namely, while cut is not detected, the above operation is performed. When the reception level of the fifth optical detector 26b falls (while cut is detected), an alarm signal communication control unit 13 controls optical switches 12a and 12b to switch a route ① in the normal state to a route ②, modulates the first pumping source 22d, and transmits an alarm signal in a specific pattern to the first repeating station 70d along the route ②.

An alarm signal detecting unit 26d monitors whether the alarm signal is inputted to the second optical detector 26b. When the optical cable is cut, the alarm signal obtained by modulating the pumping light is reflected by the cross section and returned to its own station. After detection of the alarm signal is confirmed, cut of the optical cable is determined.

The first repeating station 70d shown in FIG. 46 is similar. Inputted light ($\lambda$L+$\lambda$a+$\lambda$d) from the transmitting station 20n is branched into three directions; toward a reflecting means 11a, a fifth filter 65a and a seventh filter 35e, by an optical coupler 50 (not shown) disposed on the entrance's side. The reflecting means 11a reflects only $\lambda$a, thus only ($\lambda$L+$\lambda$d) components are inputted to a first filter 31d. Only an optical signal component $\lambda$1L is extracted by the first filter 31d, multiplexed with pumping light $\lambda$c, inputted to the first optical amplifier 31a, and transmitted along with residual pumping light to the second repeating station 70d'.

A first loopback filter 32b extracts only a $\lambda$c component, and the first optical detector 32c monitors a level of $\lambda$c. A first pumping light controlling means 66b calculates an actual transmission loss between the first repeating station 70d and the second repeating station 70d' on the basis of a difference between this level and a level of the returned pumping light $\lambda$c (monitored by a second optical detector 64b) from the second repeating station 70b', and so controls the first pumping source 66a as to yield the optimum output.

The fifth filter 65a extracts residual pumping light $\lambda$d reflected by the reflecting means 11a in the transmitting station 20n, and a third optical detector 65b monitors its input level. A second pumping light controlling means 64b calculates an actual transmission loss between the transmitting station 20n and the first repeating station 70d, and controls so that an output of the second pumping source 64a becomes optimum.

And the more, in the direction from the first repeating station 70d to the transmitting station 20n, only residual pumping light $\lambda$a of the transmitting station 20n is extracted by the seventh filter 35e, and its input is monitored by a fifth optical detector 35d. When the input dies out, the alarm signal communication control unit 69b controls the optical switches 71c and 71d, switches a port P1 in the normal state to a port P2, modulates the second pumping source 64a, and transmits an alarm signal in a specific pattern to the transmitting station 20n from the port P2. An alarm signal detecting unit 68a monitors whether the alarm signal is inputted to the third optical detector (photodiode 3) 65b. When the optical cable is cut, the alarm signal obtained by modulating the pumping light is reflected by the cross section, and returned to its own station. After detection of the alarm signal is confirmed, cut of the optical cable is determined.

As this, an accurate control becomes possible, and a more precise operation becomes possible. Further, communication is performed among the stations using only the optical cables in one system, and the output level of the pumping source is automatically controlled in each of the stations, which allows the optimum communication.

As this, the installation cost and maintenance cost of the optical cables are largely decreased, and each of the stations can detect cut of the optical cable. This remarkably improves reliability and safety of the optical system 10r.

(D) Others

As above-described, in the first embodiment, the second embodiment, the third embodiment and their modifications, the optical couplers 50 or the like are not shown in the drawings except FIG. 2. The multiplexing and demultiplexing are foregoing realized by using an optical fiber of a fusion type, but another element may be used.

Further, it is possible to combine the detection modes and the control modes in the embodiments and modifications. In concrete, they may be combined in consideration of many variations such as (t1) to (t6) below. Note that the superiority of the present invention is not spoiled even when a way of combining these is changed.

(t1) the number of stages of the repeating stations;

(t2) with respect to adjustment of the output level of the pumping source in the transmitting station or the receiving station, presence/absence of the adjusting control or the controlling mode;

(t3) with respect to adjustment of the output level of the pumping source in the repeating station, presence/absence of the adjusting control or the controlling mode;

(t4) with respect to adjustment of the output level of EDFA in the repeating station, presence/absence of the adjusting control or the controlling mode;

(t5) with respect to the disconnect detecting method in the transmitting station or the receiving station, presence/absence of it or the controlling mode; and (t6) with respect to the disconnect detecting method in the repeating station, presence/absence of it or the controlling mode.

In FIG. 4, the second repeating station 30c' has a similar structure to the first repeating station 30c, excepting differences in subscript of the optical wavelengths, for example, between λ1R and λ1R', λ1R' and λ1R", and the like.

The inside of the second repeating station 30b' shown in FIG. 7 is similar to that of the first repeating station 30b shown in FIG. 8.

INDUSTRIAL APPLICABILITY

As above, according to this invention, transmission light and reception light can be transmitted through optical fiber cables in one system, thus the installation cost and maintenance cost of the optical cable cost can be decreased. Detection of cut of the optical cables is performed using the monitoring function with pumping light and residual pumping light in two-way transmission, which remarkably improves reliability and safety of the system. Further, adjustment of the optical output level in the repeating station is most suitably set according to an actual transmission distance, which allows an efficient system operation.

What is claimed is:

1. An optical transmitting apparatus comprising:

an optical transmitting means for multiplexing and amplifying first transmission light (λ1L) and first pumping light (λ2PL) to thereby amplify the first transmission light (λ1L), and outputting an amplified optical signal to an internal optical fiber;

a level monitoring means connected to said optical transmitting means for detecting a level of the optical signal outputted from said optical transmitting means;

an optical multiplexing means connected to said internal optical fiber for transmitting an optical signal in said internal optical fiber to a first optical fiber connected to an external optical repeating apparatus, and also being operable to receive an optical signal having a predetermined wavelength in transmission light transmitted from said external optical repeating apparatus through said first optical fiber, and split the optical signal into a plurality of directions, and output split optical signal; and a loopback light detecting means connected to said optical multiplexing means for receiving an optical monitoring signal transmitted from said external optical repeating apparatus.

2. The optical transmitting apparatus according to claim 1 further comprising a controlling means, connected to said optical transmitting means, said level monitoring means and said loopback light detecting means, for controlling an output level of the first pumping light (λ2PL) on the basis of a reception level of the optical monitoring signal (λ2PL') from said loopback light detecting means.

3. The optical transmitting apparatus according to claim 2 further comprising a disconnect detecting means disposed at an entrance leading to said external optical repeating apparatus for detecting that a fault occurs in said first optical fiber;

said disconnect detecting means comprising:

a first transmitting side filter for extracting residual pumping light (λ3PR') from a received optical signal, and outputting the residual pumping light (λ3PR');

a first transmitting side monitoring means for detecting the residual pumping light (λ3PR') from said first transmitting filter; and a first transmitting side disconnect detection outputting means for monitoring an operation of said first transmitting side monitoring means to output information relating to presence/absence of the residual pumping light (λ3PR').

4. An optical repeating apparatus comprising:

a first optical transmitting means for receiving first transmission light (λ1L) and first pumping light (λ2PL) transmitted from an optical transmitting apparatus through a first optical fiber, amplifying the first transmission light (λ1L) and the first pumping light (λ2PL), and outputting second transmission light (λ1L') and second pumping light (λ2PL');

a first loopback means, connected to said first optical transmitting means, for extracting the second pumping light (λ2PL') from the optical signal amplified by said first optical transmitting means, and outputting the second pumping light (λ2PL');

a second optical transmitting means for receiving third transmission light (λ1R) and third pumping light (λ3PR) transmitted from an optical receiving apparatus through said second optical fiber, amplifying the third transmission light (λ1R) and the third pumping light (λ3PR), and outputting fourth transmission light (λ1R');

a second loopback means, connected to said second optical transmitting means, for extracting fourth pumping light (λ3PR') from the optical signal amplified by said second optical transmitting means, and outputting the fourth pumping light (λ3PR');

a first optical coupler, disposed on an output's side of said first optical transmitting means, for outputting the second transmission light (λ1L') and the second pumping light (λ2PL') toward the side of said optical receiving apparatus, while outputting the third transmission light ($\lambda$1R) and the third pumping light ($\lambda$3PR) from the side of said optical receiving apparatus; and a second optical coupler, disposed on an output's side of said second optical transmitting means, for outputting the optical signal from said first loopback means and the optical signal from said second optical transmitting means toward a side of said optical transmitting apparatus, while outputting the first transmission light ($\lambda$1L) and the first pumping light ($\lambda$2PL) from a side of said optical transmitting apparatus.

5. The optical repeating apparatus according to claim 4, wherein said first optical transmitting means receives the first transmission light ($\lambda$1L) and the first pumping light ($\lambda$2PL) transmitted from said optical transmitting apparatus through said first optical fiber, changes either a level of the first transmission light ($\lambda$1L) or a level of the first pumping light ($\lambda$2PL) to a necessary level, amplifies changed first transmission light ($\lambda$1L) and first pumping light ($\lambda$2PL), and outputs the second transmission light ($\lambda$1L') and the second pumping light ($\lambda$2PL');

said second optical transmitting means receives the third transmission light ($\lambda$1R) and the third pumping light ($\lambda$3PR) transmitted from said optical receiving apparatus through said second optical fiber, changes either a level of the third transmission light ($\lambda$1R) or a level of the third pumping light ($\lambda$3PR) to a necessary level, amplifies changed third transmission light ($\lambda$1R) or third pumping light ($\lambda$3PR), and outputs the fourth transmission light ($\lambda$1R').

6. The optical repeating apparatus according to claim 5, wherein said first optical transmitting means comprises:

a first pumping light adjusting means for splitting the first transmission light ($\lambda$1L) and the first pumping light ($\lambda$2PL), attenuating a level of the pumping light ($\lambda$2PL) by a necessary level, and outputting the first transmission light ($\lambda$1L) and the first pumping light ($\lambda$2PL); and said second optical transmitting means comprises:

a second pumping light adjusting means for splitting the third transmission light ($\lambda$1R) and the third pumping light ($\lambda$3PR), attenuating a level of the pumping light ($\lambda$3PR) by a necessary level, and outputting the third transmission light ($\lambda$1R) and the third pumping light ($\lambda$3PR).

7. The optical repeating apparatus according to claim 6, wherein said first loopback means comprises a first optical detector for detecting a level of the pumping light ($\lambda$2PL') outputted from said first optical amplifying means to control an attenuation quantity of said first pumping light adjusting means on the basis of a level value detected by said first optical detector; and said second loopback means comprises a fourth optical detector for detecting a level of the pumping light ($\lambda$3PR") outputted from said second optical amplifying means to control an attenuation quantity of said second pumping light adjusting means on the basis of a level value detected by said fourth optical detector.

8. The optical repeating apparatus according to claim 7 further comprising:

a second alarm signal communication controlling means for outputting a port switching signal when detecting that the residual pumping light ($\lambda$2PL) is not inputted to said fifth optical detector, to superimpose a modulation signal on second pumping source and output superimposed pumping light;

a first optical switch connected to said second pumping source to be operable to select according to the port switching signal outputted from said second alarm signal communication controlling means whether the second pumping light ($\lambda$5PT) from said second pumping source is led to an input's side of said second optical amplifying means or the second pumping light ($\lambda$5PT) on which the modulation signal has been superimposed is led to an output's side of said second optical amplifying means;

a first alarm signal detecting means, connected to said third optical detector, for detecting the second pumping light ($\lambda$5PT), on which the modulation signal has been superimposed, looped back and inputted from said optical transmitting apparatus, and outputting a first alarm signal to an outside;

a second disconnect detecting means for detecting that the first alarm signal is outputted from said first alarm signal detecting means;

a second alarm signal communication controlling means for outputting a port switching signal when detecting that the residual pumping light ($\lambda$7PT) is not inputted to said sixth optical detector, to superimpose a modulation signal on said first pumping source and output superimposed pumping light;

a second optical switch connected to a first pumping source to be operable to select according to the port switching signal outputted from said second alarm signal communication controlling means whether first pumping light ($\lambda$4PT) from said first pumping source is led to an input's side of said first optical amplifying means or the first pumping light ($\lambda$4PT) on which the modulation signal has been superimposed is led to an output's side of said first optical amplifying means;

a second alarm signal detecting means, connected to said second optical detector, for detecting the first pumping light ($\lambda$4PT), on which the modulation signal has been superimposed, returned and inputted from said optical receiving apparatus, and outputting a second alarm signal to the outside; and a fourth disconnect detecting means for detecting that the second alarm signal is outputted from said second alarm signal detecting means.

9. The optical repeating apparatus according to claim 8 further comprising:

a second filter disposed on an output's side of said first optical amplifying means to extract the first pumping light ($\lambda$4PT) outputted from said first optical amplifying means;

a first optical detector for detecting a level of the first pumping light ($\lambda$4PT) outputted from said second filter;

a fourth filter, disposed on an output's side of said second optical amplifying means, for extracting second pumping light ($\lambda$5PT) outputted from said second optical amplifying means; and a fourth optical detector for detecting a level of the second pumping light ($\lambda$5PT) outputted from said fourth filter.

10. The optical repeating apparatus according to claim 7 further comprising:

a first optical detector, disposed on an output's side of said first optical amplifying means, for detecting a level of first pumping light ($\lambda$c) outputted from said first optical amplifying means;

a second alarm signal detecting means for detecting the first pumping light ($\lambda$c), on which a modulation signal has been superimposed, sent from a side of said optical receiving apparatus, and outputting a first alarm signal to an outside;

a fourth optical detector, disposed on an output's side of said second optical amplifying means, for detecting a level of second pumping light (λd) outputted from second optical amplifying means;

a first alarm signal detecting means for detecting the second pumping light (λd), on which a modulation signal has been superimposed, sent from a side of said optical transmitting apparatus, and outputting a second alarm signal to the outside;

a first alarm signal communication controlling means for outputting a port switching signal when detecting that first residual pumping light (λf) sent from said optical receiving apparatus is not inputted, to superimpose a modulation signal on first pumping source and output it;

a second optical switch connected to said first pumping source to be operable to select according to the port switching signal outputted from said first alarm signal communication controlling means whether the first pumping light (λc) from said first pumping source is led to an input's side of said first optical amplifying means or the first pumping light (λc) on which the modulation signal has been superimposed is led to an output's side of said first optical amplifying means;

a second alarm signal communication controlling means for outputting a port switching signal when detecting that second residual pumping light (λdT) sent from a side of said optical transmitting apparatus is not inputted, in order to superimpose a modulation signal on second pumping source and output superimposed pumping light; and a first optical switch connected to said second pumping source to be operable to select according to the port switching signal outputted from said second alarm signal communication controlling means whether the second pumping light (λd) from said second pumping source is led to an input's side of said second optical amplifying means or the second pumping light (λd) on which the modulation signal has been superimposed is led to an output's side of said second optical amplifying means.

11. The optical repeating apparatus according to claim 6 further comprising a first reception light monitoring means, disposed on an entrance's side of said second optical fiber, for detecting a level of a transmitted optical signal;

said first reception light monitoring means comprising:
a sixth filter for extracting the residual pumping light (λ2PL") from the transmitted optical signal, and outputting the residual pumping light (λ2PL"); and
a second optical detector for detecting a level of the residual pumping light (λ2PL") outputted from said sixth filter, wherein an attenuation quantity of said first pumping light adjusting means being controlled on the basis of a difference between the level detected by said second optical detector and a level beforehand prepared; and a second reception light monitoring means, disposed on an entrance's side of said first optical fiber, for detecting a level of a transmitted optical signal;

said second reception light monitoring means comprising:
a fifth filter for extracting the residual pumping light (λ3PR") from the transmitted optical signal and outputting the residual pumping light (λ3PR"); and
a third optical detector for detecting a level of the residual pumping light (λ3PR") outputted from said fifth filter, wherein an attenuation quantity of said second pumping light adjusting means being controlled on the basis of a difference between the level detected by said third optical detector and a level beforehand prepared.

12. The optical repeating apparatus according to claim 11, wherein said first pumping light controlling means comprises a first level monitoring means, disposed on an output's side of said second filter, for detecting a level of the second pumping light (λ2PL) outputted from said second filter, and controlling an output optical level of said first pumping source on the basis of the level detected by said first level monitoring means and a reception light level detected by said first reception light monitoring means; and said second pumping light controlling means comprises a fourth optical detector, disposed on an output's side of said fourth filter, for detecting a level of the third pumping light (λ3PR) outputted from said fourth filter, and controlling an output optical level of said second pumping source on the basis of the level value detected by said fourth optical detector and a reception light level detected by said second reception light monitoring means.

13. The optical repeating apparatus according to claim 11 further comprising:

a second filter disposed on an output's side of said first optical amplifying means, for extracting first pumping light (λ4PT) outputted from said first optical amplifying means; a first optical detector for detecting a level of first pumping light (λ4PT) outputted from said second filter; an eighth filter for extracting the residual pumping light (λ7PT) from a received optical signal and outputting the residual pumping light (λ7PT); and a sixth optical detector for detecting the residual pumping light (λ7PT) from said eighth filter, wherein an output level of said first optical amplifying means being controlled on the basis of a detected level of said first optical detector, a detected level of said second optical detector and a detected level of said sixth optical detector;

a fourth filter, disposed on an output's side of said second optical amplifying means, for extracting the second pumping light (λ5PT) outputted from said second optical amplifying means; a fourth optical detector for detecting a level of the second pumping light (λ5PT) outputted from said fourth filter; a seventh filter for extracting the residual pumping light (λ2PL) from a received optical signal and outputting the residual pumping light (λ2PL); and a fifth optical detector for detecting the residual pumping light (λ2PL) from said seventh filter, wherein an output level of said second optical amplifying means being controlled on the basis of a detected level of said fourth optical detector, a detected level of said third optical detector and a detected level of said fifth optical detector.

14. The optical repeating apparatus according to claim 5, wherein said first optical transmitting means comprises:

a first displaying means having control data relating to a first transmission loss value of an optical signal loss on a transmission path, and being operable to output the control data; and a first pumping light controlling means for controlling an output level of a first pumping source of its own station on the basis of the control data of said first displaying means;

said second optical transmitting means comprises:
a second displaying means having control data relating to a second transmission loss value of an optical signal loss on a transmission path, and being operable to output the control data; and a second pumping light controlling means for controlling an output level of said second pumping source of its own station on the basis of the control data of said second displaying means.

15. The optical repeating apparatus according to claim 14, wherein said first pumping light controlling means controls an output of said first pumping source on the basis of a level of the first pumping light ($\lambda$2PL) and a level of the residual pumping light ($\lambda$7PL) from said optical receiving apparatus; and said second pumping light controlling means controls an output of said second pumping source on the basis of a level of the second pumping light ($\lambda$2PR) and a level of the residual pumping light ($\lambda$2PL) from a side of said optical transmitting apparatus.

16. The optical repeating apparatus according to claim 5, wherein said first optical transmitting means comprises a first filter disposed on an input's side of said first optical amplifying means to remove the residual pumping light component ($\lambda$3PR") from a received optical signal; and said second optical transmitting means comprises a third filter, disposed on an input's side of said second optical amplifying means, for removing the residual pumping light component ($\lambda$2PL") from a received optical signal.

17. The optical repeating apparatus according to claim 4 further comprising a first disconnect detecting means, disposed on an entrance's side of said first optical fiber for detecting disconnect of said first optical fiber, and a second disconnect detecting means, disposed on an entrance's side of said second optical fiber, for detecting disconnect of said second optical fiber;

said first disconnect detecting means comprising:
a seventh filter for extracting residual pumping light ($\lambda$2PL') from a received optical signal and outputting the residual pumping light ($\lambda$2PL');
a fifth optical detector for detecting the residual pumping light ($\lambda$2PL') from said seventh filter;
a first disconnect detection outputting means for monitoring an operation of said fifth optical detector to output information relating to presence/absence of the residual pumping light ($\lambda$2PL');

said second disconnect detecting means comprising:
an eighth filter for extracting the residual pumping light ($\lambda$7PT) from a received optical signal, and outputting the residual pumping light ($\lambda$7PT)
a sixth optical detector for detecting the residual pumping light ($\lambda$7PT) from said eighth filter; and
a second disconnect detection outputting means for monitoring the operation of said sixth optical detector to output information relating to presence/absence of the residual pumping light ($\lambda$7PT).

18. The optical repeating apparatus according to claim 17 further comprising:

a reflecting means, disposed on an input's side of said first optical amplifying means, for reflecting an optical signal ($\lambda$2PL) at a specific wavelength contained in a received optical signal;

a first reflected light receiving means, disposed on an input's side of said first optical amplifying means for detecting residual pumping light ($\lambda$5PT) contained in a received optical signal, and detecting a level of the residual pumping light ($\lambda$5PT);

a reflecting means, disposed on an input's side of said second optical amplifying means, for reflecting an optical signal ($\lambda$7PT) at a specific wavelength contained in a received optical signal; and a second reflected light receiving means, disposed on an input's side of said second optical amplifying means, for detecting residual pumping light ($\lambda$4PL) contained in a received optical signal, and detecting a level of the residual pumping light ($\lambda$4PT).

19. The optical repeating apparatus according to claim 18 further comprising:

a reflecting means, disposed on an input's side of said first filter, for reflecting light at a specific wavelength contained in a received optical signal;

a fifth filter for extracting the residual pumping light ($\lambda$5PT) from an optical signal from a side of said optical transmitting apparatus, and outputting the residual pumping light ($\lambda$5PT);

a third optical detector for detecting the residual pumping light ($\lambda$5PT) from said fifth filter;

a seventh filter for extracting the residual pumping light ($\lambda$2PL) from an optical signal from a side of said optical transmitting apparatus, and outputting the residual pumping light ($\lambda$2PL);

a fifth optical detector for detecting the residual pumping light ($\lambda$2PL) outputted from said seventh filter;

a reflecting means, disposed on an input's side of said third filter, for reflecting light having a specific wavelength;

a sixth filter for extracting the residual pumping light ($\lambda$4PT) from an optical signal from a side of said optical receiving apparatus, and outputting the residual pumping light ($\lambda$4PT);

a second optical detector for detecting the residual pumping light ($\lambda$4PT) from said sixth filter;

an eighth filter for extracting the residual pumping light ($\lambda$7PT) from an optical signal from a side of said optical receiving apparatus, and outputting the residual pumping light ($\lambda$7PT); and a sixth optical detector for detecting the residual pumping light ($\lambda$7PT) outputted from said eighth filter.

20. The optical repeating apparatus according to claim 19 further comprising:

a second filter, disposed on an output's side of said first optical amplifying means, for extracting the first pumping light ($\lambda$4PT) outputted from said first optical amplifying means;

a first optical detector for detecting a level of the first pumping light ($\lambda$4PT) outputted from said second filter;

a fourth filter, disposed on an output's side of said second optical amplifying means, for extracting the second pumping light ($\lambda$5PT) outputted from said second optical amplifying means; and a fourth optical detector for detecting a level of the second pumping light ($\lambda$5PT) outputted from said fourth filter.

21. The optical repeating apparatus according to claim 18 further comprising:

a second filter, disposed on an output's side of said first optical amplifying means, for extracting the first pumping light ($\lambda$4PT), and outputting the first pumping light ($\lambda$4PT);

a first optical detector for displaying a level of the first transmission light ($\lambda$4PT) outputted from said second filter;

a fourth filter, disposed on an output's side of said second optical amplifying means, for extracting the second pumping light (λ5PT), and outputting the second pumping light (λ5PT); and a fourth optical detector for displaying a level of the second transmission light (λ5PT) extracted by said fourth filter.

22. An optical transmitting apparatus comprising:

an optical transmitter multiplexing first transmission light and first pumping light and thereby amplifying the first transmission light, and outputting an amplified optical signal to an internal optical fiber;

a level monitor, connected to said optical transmitter, detecting a level of the optical signal outputted from said optical transmitter;

an optical multiplexer, connected to said internal optical fiber, transmitting an optical signal in said internal optical fiber to a first optical fiber connected to an external optical repeating apparatus, and also being operable to receive an optical signal having a predetermined wavelength in transmission light transmitted from said external optical repeating apparatus through said first optical fiber, and splitting the optical signal into a plurality of directions, and outputting a split optical signal; and a loopback light detector, connected to said optical multiplexer, receiving an optical monitoring signal transmitted from said external optical repeating apparatus.

23. The optical transmitting apparatus according to claim 22, further comprising a controller, connected to said optical transmitter, said level monitor and said loopback light detector, controlling an output level of the first pumping light on the basis of a reception level of the optical monitoring signal from said loopback light detector.

24. The optical transmitting apparatus according to claim 23, further comprising a disconnect detector, disposed at an entrance leading to said external optical repeating apparatus, detecting that a fault occurs in said first optical fiber, said disconnect detector comprising:

a first transmitting side filter extracting residual pumping light from a received optical signal, and outputting the residual pumping light;

a first transmitting side monitor detecting the residual pumping light from said first transmitting side filter; and a first transmitting side disconnect detection outputting device monitoring an operation of said first transmitting side monitor to output information relating to presence/absence of the residual pumping light.

25. An optical repeating apparatus comprising:

a first optical transmitter receiving first transmission light and first pumping light transmitted from an optical transmitting apparatus through a first optical fiber, amplifying the first transmission light and the first pumping light, and outputting second transmission light and second pumping light;

a first loopback device, connected to said first optical transmitter, extracting the second pumping light from the optical signal amplified by said first optical transmitter, and outputting the second pumping light;

a second optical transmitter receiving third transmission light and third pumping light transmitted from an optical receiving apparatus through a second optical fiber, amplifying the third transmission light and the third pumping light, and outputting fourth transmission light;

a second loopback device, connected to said second optical transmitter, extracting fourth pumping light from the optical signal amplified by said second optical transmitter, and outputting the fourth pumping light;

a first optical coupler, disposed on an output's side of said first optical transmitter, outputting the second transmission light and the second pumping light toward the side of said optical receiving apparatus, while outputting the third transmission light and the third pumping light from the side of said optical receiving apparatus; and a second optical coupler, disposed on an output's side of said second optical transmitter, outputting the optical signal from said first loopback device and the optical signal from said second optical transmitter toward a side of said optical transmitting apparatus, while outputting the first transmission light and the first pumping light from a side of said optical transmitting apparatus.

26. The optical repeating apparatus according to claim 25, wherein said first optical transmitter receives the first transmission light and the first pumping light transmitted from said optical transmitting apparatus through said first optical fiber, changes either a level of the first transmission light or a level of the first pumping light to a necessary level, amplifies changed first transmission light and first pumping light, and outputs the second transmission light and the second pumping light;

said second optical transmitter receives the third transmission light and the third pumping light transmitted from said optical receiving apparatus through said second optical fiber, changes either a level of the third transmission light or a level of the third pumping light to a necessary level, amplifies changed third transmission light or third pumping light, and outputs the fourth transmission light.

27. The optical repeating apparatus according to claim 26, wherein said first optical transmitter comprises a first pumping light adjustor splitting the first transmission light and the first pumping light, attenuating a level of pumping light by a necessary level, and outputting the first transmission light and the first pumping light; and said second optical transmitter comprises a second pumping light adjustor splitting the third transmission light and the third pumping light, attenuating a level of pumping light by a necessary level, and outputting the third transmission light and the third pumping light.

28. The optical repeating apparatus according to claim 27, wherein said first loopback device comprises a first optical detector detecting a level of the pumping light outputted from said first optical amplifier to control an attenuation quantity of said first pumping light adjustor on the basis of a level value detected by said first optical detector; and said second loopback device comprises a fourth optical detector detecting a level of the pumping light outputted from said second optical amplifier to control an attenuation quantity of said second pumping light adjustor on the basis of a level value detected by said fourth optical detector.

29. The optical repeating apparatus according to claim 28, further comprising:

a second alarm signal communication controller outputting a port switching signal when detecting that the residual pumping light is not inputted to said fifth optical detector, to superimpose a modulation signal or, second pumping source and output superimposed pumping light;

a first optical switch connected to said second pumping source to be operable to select according to the port switching signal outputted from said second alarm signal communication controller whether the second pumping light from said second pumping source is led to an input's side of said second optical amplifier or the second pumping light on which the modulation signal has been superimposed is led to an output's side of said second optical amplifier;

a first alarm signal detector, connected to said third optical detector, detecting the second pumping light, on which the modulation signal has been superimposed, looped back and inputted from said optical transmitting apparatus, and outputting a first alarm signal to an outside;

a second disconnect detector detecting that the first alarm signal is outputted from said first alarm signal detector;

a second alarm signal communication controller outputting a port switching signal when detecting that the residual pumping light is not inputted to said sixth optical detector, to superimpose a modulation signal on said first pumping source and output superimposed pumping light;

a second optical switch connected to a first pumping source to be operable to select according to the port switching signal outputted from said second alarm signal communication controller whether first pumping light from said first pumping source is led to an input's side of said first optical amplifier or the first pumping light on which the modulation signal has been superimposed is led to an output's side of said first optical amplifier;

a second alarm signal detector, connected to said second optical detector, detecting the first pumping light, on which the modulation signal has been superimposed, returned and inputted from said optical receiving apparatus, and outputting a second alarm signal to the outside; and a fourth disconnect detector detecting that the second alarm signal is outputted from said second alarm signal detector.

30. The optical repeating apparatus according to claim 29, further comprising:

a second filter disposed on an output's side of said first optical amplifier to extract the first pumping light outputted from said first optical amplifier;

a first optical detector detecting a level of the first pumping light outputted from said second filter;

a fourth filter, disposed on an output's side of said second optical amplifier, extracting second pumping light outputted from said second optical amplifier; and a fourth optical detector detecting a level of the second pumping light outputted from said fourth filter.

31. The optical repeating apparatus according to claim 27, further comprising:

a first reception light monitor, disposed on an entrance's side of said second optical fiber, detecting a level of a transmitted optical signal, said first reception light monitor comprising a sixth filter extracting the residual pumping light from the transmitted optical signal, and outputting the residual pumping light, and a second optical detector detecting a level of the residual pumping light outputted from said sixth filter, wherein an attenuation quantity of said first pumping light adjustor is controlled on the basis of a difference between the level detected by said second optical detector and a level beforehand prepared; and a second reception light monitor, disposed on an entrance's side of said first optical fiber, detecting a level of a transmitted optical signal, said second reception light monitor comprising a fifth filter extracting the residual pumping light from the transmitted optical signal and outputting the residual pumping light, and a third optical detector detecting a level of the residual pumping light outputted from said fifth filter, wherein an attenuation quantity of said second pumping light adjustor are controlled on the basis of a difference between the level detected by said third optical detector and a level beforehand prepared.

32. The optical repeating apparatus according to claim 31, further comprising:

a second filter disposed on an output's side of said first optical amplifier, extracting first pumping light outputted from said first optical amplifier a first optical detector detecting a level of first pumping light outputted from said second filter; an eighth filter extracting the residual pumping light from a received optical signal and outputting the residual pumping light: and a sixth optical detector detecting the residual pumping light from said eighth filter, wherein an output level of said first optical amplifier is controlled on the basis of a detected level of said first optical detector, a detected level of said second optical detector and a detected level of said sixth optical detector;

a fourth filter, disposed on an output's side of said second optical amplifier, extracting the second pumping light outputted from said second optical amplifier, a fourth optical detector detecting a level of the second pumping light outputted from said fourth filter; a seventh filter extracting the residual pumping light from a received optical signal and outputting the residual pumping light; and a fifth optical detector detecting the residual pumping light from said seventh filter, wherein an output level of said second optical amplifier is controlled on the basis of a detected level of said fourth optical detector, a detected level of said third optical detector and a detected level of said fifth optical detector.

33. The optical repeating apparatus according to claim 30, wherein said first pumping light controller comprises a first level monitor, disposed on an output's side of said second filter, detecting a level of the second pumping light outputted from said second filter, and controlling an output optical level of said first pumping source on the basis of the level detected by said first level monitor and a reception light level detected by said first reception light monitor; and said second pumping light controller comprises a fourth optical detector disposed on an output's side of said fourth filter, detecting a level of the third pumping light outputted from said fourth filter, and controlling an output optical level of said second pumping source on the basis of the level value detected by said fourth optical detector and a reception light level detected by said second reception light monitor.

34. The optical repeating apparatus according to claim 26, wherein said first optical transmitter comprises a first display device having control data relating to a first transmission loss value of an optical signal loss on a transmission path, and being operable to output the control data, and a first pumping light controller controlling an output level of a first pumping source of its own station on the basis of the control data of said first displaying device; and said second optical transmitter comprises a second displaying device having control data relating to a second transmission loss value of an optical signal loss on a transmission path, and being operable to output the control data, and a second pumping light controller controlling an output level of said second pumping source of its own station on the basis of the control data of said second displaying device.

35. The optical repeating apparatus according to claim 34, wherein said first pumping light controller controls an output of said first pumping source on the basis of a level of the first pumping light and a level of the residual pumping light from said optical receiving apparatus; and said second pumping light controller controls an output of said second pumping source on the basis of a level of the second pumping light and a level of the residual pumping light from a side of said optical transmitting apparatus.

36. The optical repeating apparatus according to claim 26, wherein said first optical transmitter comprises a first filter disposed on an input's side of said first optical amplifier to remove the residual pumping light component from a received optical signal; and said second optical transmitter comprises a third filter, disposed on an input's side of said second optical amplifier, removing the residual pumping light component from a received optical signal.

37. The optical repeating apparatus according to claim 25, further comprising a first disconnect detector, disposed on an entrance's side of said first optical fiber, detecting disconnect of said first optical fiber, and a second disconnect detector, disposed on an entrance's side of said second optical fiber, detecting disconnect of said second optical fiber, said first disconnect detector comprising:
  a seventh filter extracting residual pumping light from a received optical signal and outputting the residual pumping light;
  a fifth optical detector detecting the residual pumping light from said seventh filter;
  a first disconnect detector outputting device monitoring an operation of said fifth optical detector to output information relating to presence/absence of the residual pumping light;

said second disconnect detector comprising:
  an eighth filter extracting the residual pumping light from a received optical signal, and outputting the residual pumping light:
  a sixth optical detector detecting the residual pumping light from said eighth filter, and
  a second disconnect detection outputting device monitoring the operation of said sixth optical detector to output information relating to presence/absence of the residual pumping light.

38. The optical repeating apparatus according to claim 37 further comprising:
  a reflector, disposed on an input's side of said first optical amplifier, reflecting an optical signal at a specific wavelength contained in a received optical signal;
  a first reflected light receiver, disposed on an input's side of said first optical amplifier, detecting residual pumping light contained in a received optical signal, and detecting a level of the residual pumping light;
  a reflector, disposed on an input's side of said second optical amplifier, reflecting an optical signal at a specific wavelength contained in a received optical signal; and
  a second reflected light receiver, disposed on an input's side of said second optical amplifier, detecting residual pumping light contained in a received optical signal, and detecting a level of the residual pumping light.

39. The optical repeating apparatus according to claim 38, further comprising:
  a reflector, disposed on an input's side of said first filter, reflecting light at a specific wavelength contained in a received optical signal;
  a fifth filter extracting the residual pumping light from an optical signal from a side of said optical transmitting apparatus, and outputting the residual pumping light;
  a third optical detector detecting the residual pumping light from said fifth filter;
  a seventh filter extracting the residual pumping light from an optical signal from a side of said optical transmitting apparatus, and outputting the residual pumping light;
  a fifth optical detector detecting the residual pumping right outputted from said seventh filter;
  a reflector, disposed on an input's side of said third filter, reflecting light having a specific wavelength;
  a sixth filter extracting the residual pumping light from an optical signal from a side of said optical receiving apparatus, and outputting the residual pumping light:
  a second optical detector detecting the residual pumping light from said sixth filter;
  an eighth filter extracting the residual pumping light from an optical signal from a side of said optical receiving apparatus, and outputting the residual pumping light; and
  a sixth optical detector detecting the residual pumping light outputted from said eighth filter.

40. The optical repeating apparatus according to claim 39, further comprising:
  a second filter, disposed on an output's side of said first optical amplifier, extracting the first pumping light outputted from said first optical amplifier:
  a first optical detector detecting a level of the first pumping light outputted from said second filter;
  a fourth filter, disposed on an output's side of said second optical amplifier, extracting the second pumping light outputted from said second optical amplifier; and
  a fourth optical detector detecting a level of the second pumping light outputted from said fourth filter.

41. The optical repeating apparatus according to claim 38 further comprising:
  a second filter, disposed on an output's side of said first optical amplifier, extracting the first pumping light, and outputting the first pumping light;
  a first optical detector displaying a level of the first transmission light outputted from said second filter;
  a fourth filter, disposed on an output's side of said second optical amplifier, extracting the second pumping light, and outputting the second pumping light: and
  a fourth optical detector displaying a level of the second transmission light extracted by said fourth filter.

42. The optical repeating apparatus according to claim 28, further comprising:

a first optical detector, disposed on an output's side of said first optical amplifier, detecting a level of first pumping light outputted from said first optical amplifier;

a second alarm signal detector detecting the first pumping light, on which a modulation signal has been superimposed, sent from a side of said optical receiving apparatus, and outputting a first alarm signal to an outside:

a fourth optical detector, disposed on an output's side of said second optical amplifier, detecting a level of second pumping light outputted from the second optical amplifier;

a first alarm signal detector detecting the second pumping light, on which a modulation signal has been superimposed, sent from a side of said optical transmitting apparatus, and outputting a second alarm signal to the outside;

a first alarm signal communication controller outputting a port switching signal when detecting that first residual pumping light sent from said optical receiving apparatus is not inputted, to superimpose a modulation signal on the first pumping source and output it;

a second optical switch connected to said first pumping source to be operable to select according to the port switching signal outputted from said first alarm signal communication controller whether the first pumping light from said first pumping source is led to an input's side of said first optical amplifier or the first pumping light on which the modulation signal has been superimposed is led to an output's side of said first optical amplifier;

a second alarm signal communication controller outputting a port switching signal when detecting that second residual pumping light sent from a side of said optical transmitting apparatus is not inputted, in order to superimpose a modulation signal on the second pumping source and output superimposed pumping light: and a first optical switch connected to said second pumping source to be operable to select according to the port switching signal outputted from said second alarm signal communication controller whether the second pumping light from said second pumping source is led to an input's side of said second optical amplifier or the second pumping light on which the modulation signal has been superimposed is led to an output's side of said second optical amplifier.

\* \* \* \* \*

UNITED STATES PATENT AND TRADEMARK OFFICE
CERTIFICATE OF CORRECTION

PATENT NO. : 6,661,947 B2
DATED : December 9, 2003
INVENTOR(S) : Katsuhiro Shirai It is certified that error appears in the above-identified patent and that said Letters Patent is hereby corrected as shown below:

Column 70,
Line 67, change "or," to -- on --.

Column 71,
Line 48, change "to extract" to -- extracting --.

Signed and Sealed this

Thirteenth Day of April, 2004

JON W. DUDAS
*Acting Director of the United States Patent and Trademark Office*